US007664292B2

(12) United States Patent
van den Bergen et al.

(10) Patent No.: US 7,664,292 B2
(45) Date of Patent: Feb. 16, 2010

(54) MONITORING AN OUTPUT FROM A CAMERA

(75) Inventors: Mark Adrian van den Bergen, Ashwood (AU); David Alexander Tymon, Fitzroy (AU); Michael Anthony Henson, North Turramurra (AU); Gijsbert de Haan, Montreal (CA); Martin Blais, Dorion (CA)

(73) Assignee: Safehouse International, Inc., Las Vegas, NV (US)

( * ) Notice: Subject to any disclaimer, the term of this patent is extended or adjusted under 35 U.S.C. 154(b) by 686 days.

(21) Appl. No.: 11/002,446

(22) Filed: Dec. 2, 2004

(65) Prior Publication Data

US 2005/0163346 A1      Jul. 28, 2005

(30) Foreign Application Priority Data

Mar. 31, 2004   (GB)   ................................. 0407266.6
Mar. 31, 2004   (GB)   ................................. 0407276.5
Mar. 31, 2004   (GB)   ................................. 0407280.7

(51) Int. Cl.
*G06K 9/46*      (2006.01)
*G06K 9/68*      (2006.01)
*H04N 7/18*      (2006.01)

(52) U.S. Cl. .................. 382/103; 382/107; 382/194; 382/221; 348/152

(58) Field of Classification Search ................. 382/103, 382/107, 194, 221; 348/143, 152, 154, 155, 348/169
See application file for complete search history.

(56) References Cited

U.S. PATENT DOCUMENTS 4,630,110 A * 12/1986 Cotton et al. ............... 348/153

| | | | |
|---|---|---|---|
| 4,703,358 A | | 10/1987 | Flannaghan |
| 5,111,291 A | * | 5/1992 | Erickson et al. ............. 348/152 |
| 5,237,408 A | * | 8/1993 | Blum et al. .................. 348/154 |
| 5,243,418 A | * | 9/1993 | Kuno et al. .................. 348/155 |
| 5,635,982 A | * | 6/1997 | Zhang et al. ........... 348/231.99 |
| 5,654,772 A | | 8/1997 | Mester et al. |
| 5,666,157 A | | 9/1997 | Aviv |
| 5,731,832 A | | 3/1998 | Ng |

(Continued)

FOREIGN PATENT DOCUMENTS

| DE | 4128312 | 3/1993 |
|---|---|---|
| DE | 19603766 | 8/1997 |
| EP | 0690413 | 1/1996 |
| EP | 0 690 413 A3 | 7/1996 |
| EP | 0979009 | 2/2000 |

(Continued)

OTHER PUBLICATIONS

Shio, A.; Sklansky, J., Segmentation of People in Motion, 1991, IEEE Workshop on Visual Motion, pp. 325-332.*
International Search Report dated Aug. 12, 2004 from United Kingdom Patent Office relating to Application No. GB 0407266.6.
International Search Report dated Aug. 25, 2004 from United Kingdom Patent Office relating to Application No. GB 0407276.5.
International Search Report dated Aug. 24, 2004 from United Kingdom Patent Office relating to GB 0407280.7.

*Primary Examiner*—Brian P Werner
*Assistant Examiner*—Anthony Mackowey
(74) *Attorney, Agent, or Firm*—Harness, Dickey & Pierce, P.L.C.

(57) ABSTRACT

Output from a video camera is monitored. Input data is analyzed to produce a model of a background image and incoming image data is compared with said background model to identify images having a high level of activity created by the introduction of a foreground object. A period of activity, composed of a plurality of consecutive images having a high level of activity, is identified, and an exemplar image is generated.

14 Claims, 54 Drawing Sheets

U.S. PATENT DOCUMENTS

| | | | | |
|---|---|---|---|---|
| 5,764,283 | A * | 6/1998 | Pingali et al. | 348/169 |
| 5,787,199 | A * | 7/1998 | Lee | 382/203 |
| 5,862,508 | A * | 1/1999 | Nagaya et al. | 701/207 |
| 5,915,044 | A * | 6/1999 | Gardos et al. | 382/236 |
| 5,933,549 | A * | 8/1999 | Ide et al. | 382/309 |
| 5,953,055 | A * | 9/1999 | Huang et al. | 348/155 |
| 5,969,755 | A * | 10/1999 | Courtney | 348/143 |
| 6,005,493 | A * | 12/1999 | Taniguchi et al. | 340/990 |
| 6,028,626 | A * | 2/2000 | Aviv | 348/152 |
| 6,052,492 | A * | 4/2000 | Bruckhaus | 382/284 |
| 6,069,655 | A * | 5/2000 | Seeley et al. | 348/154 |
| 6,173,082 | B1 | 1/2001 | Ishida et al. | 382/254 |
| 6,195,121 | B1 * | 2/2001 | Huang et al. | 348/150 |
| 6,236,736 | B1 * | 5/2001 | Crabtree et al. | 382/103 |
| 6,252,975 | B1 * | 6/2001 | Bozdagi et al. | 382/107 |
| 6,271,892 | B1 * | 8/2001 | Gibbon et al. | 348/700 |
| 6,340,971 | B1 * | 1/2002 | Janse et al. | 715/721 |
| 6,342,904 | B1 * | 1/2002 | Vasudevan et al. | 715/723 |
| 6,393,054 | B1 * | 5/2002 | Altunbasak et al. | 375/240 |
| 6,411,209 | B1 * | 6/2002 | Lyons et al. | 340/541 |
| 6,434,271 | B1 * | 8/2002 | Christian et al. | 382/194 |
| 6,441,818 | B1 | 8/2002 | Kurose | |
| 6,452,615 | B1 | 9/2002 | Chiu et al. | |
| 6,456,320 | B2 * | 9/2002 | Kuwano et al. | 348/143 |
| 6,493,041 | B1 | 12/2002 | Hanko et al. | |
| 6,496,228 | B1 * | 12/2002 | McGee et al. | 348/700 |
| 6,549,643 | B1 * | 4/2003 | Toklu et al. | 382/107 |
| 6,618,074 | B1 * | 9/2003 | Seeley et al. | 348/143 |
| 6,628,303 | B1 | 9/2003 | Foreman et al. | |
| 6,646,676 | B1 * | 11/2003 | DaGraca et al. | 348/155 |
| 6,665,423 | B1 * | 12/2003 | Mehrotra et al. | 382/107 |
| 6,678,413 | B1 * | 1/2004 | Liang et al. | 382/181 |
| 6,678,635 | B2 * | 1/2004 | Tovinkere et al. | 702/179 |
| 6,704,029 | B1 * | 3/2004 | Ikeda et al. | 715/723 |
| 6,711,587 | B1 * | 3/2004 | Dufaux | 707/104.1 |
| 6,731,805 | B2 * | 5/2004 | Brodsky et al. | 382/199 |
| 6,741,977 | B1 * | 5/2004 | Nagaya et al. | 707/1 |
| 6,754,367 | B1 * | 6/2004 | Ito et al. | 382/103 |
| 6,782,049 | B1 * | 8/2004 | Dufaux et al. | 375/240.01 |
| 6,791,603 | B2 * | 9/2004 | Lazo et al. | 348/169 |
| 6,798,909 | B2 * | 9/2004 | Miyatake et al. | 382/190 |
| 6,822,691 | B1 | 11/2004 | Kim et al. | |
| 6,954,225 | B2 * | 10/2005 | Chen | 348/207.99 |
| 6,961,954 | B1 * | 11/2005 | Maybury et al. | 725/53 |
| 6,963,378 | B2 * | 11/2005 | Li et al. | 348/700 |
| 6,988,244 | B1 * | 1/2006 | Honda et al. | 715/721 |
| 6,989,745 | B1 * | 1/2006 | Milinusic et al. | 340/541 |
| 6,999,600 | B2 * | 2/2006 | Venetianer et al. | 382/103 |
| 6,999,620 | B1 * | 2/2006 | Harville | 382/173 |
| 7,003,135 | B2 * | 2/2006 | Hsieh et al. | 382/103 |
| 7,027,513 | B2 * | 4/2006 | Zhang et al. | 375/240.16 |
| 7,035,430 | B2 * | 4/2006 | Ito et al. | 382/103 |
| 7,035,431 | B2 * | 4/2006 | Blake et al. | 382/103 |
| 7,035,435 | B2 * | 4/2006 | Li et al. | 382/107 |
| 7,085,401 | B2 * | 8/2006 | Averbuch et al. | 382/103 |
| 7,120,873 | B2 * | 10/2006 | Li | 715/723 |
| 7,139,411 | B2 * | 11/2006 | Fujimura et al. | 382/103 |
| 7,139,429 | B2 * | 11/2006 | Shimura | 382/181 |
| 7,143,083 | B2 * | 11/2006 | Carlbom et al. | 707/3 |
| 7,149,325 | B2 * | 12/2006 | Pavlidis et al. | 382/103 |
| 7,149,974 | B2 * | 12/2006 | Girgensohn et al. | 715/723 |
| 7,167,191 | B2 * | 1/2007 | Hull et al. | 715/748 |
| 7,177,447 | B2 * | 2/2007 | Olson et al. | 382/103 |
| 7,184,100 | B1 * | 2/2007 | Wilf et al. | 348/700 |
| 7,203,620 | B2 * | 4/2007 | Li | 702/181 |
| 7,280,673 | B2 * | 10/2007 | Buehler et al. | 382/103 |
| 7,334,191 | B1 * | 2/2008 | Sivan et al. | 715/723 |
| 7,428,000 | B2 * | 9/2008 | Cutler et al. | 348/14.11 |
| 7,430,303 | B2 * | 9/2008 | Sefcik et al. | 382/103 |
| 7,460,685 | B2 * | 12/2008 | Buehler | 382/100 |
| 7,483,618 | B1 * | 1/2009 | Edwards et al. | 386/52 |
| 7,536,032 | B2 * | 5/2009 | Bell | 382/107 |
| 2001/0036356 | A1 | 11/2001 | Weaver et al. | |
| 2002/0008781 | A1 | 1/2002 | Corl et al. | |
| 2002/0018594 | A1 * | 2/2002 | Xu et al. | 382/190 |
| 2002/0097893 | A1 * | 7/2002 | Lee et al. | 382/103 |
| 2002/0118952 | A1 * | 8/2002 | Nakajima et al. | 386/69 |
| 2002/0163548 | A1 | 11/2002 | Chiu et al. | |
| 2002/0163577 | A1 | 11/2002 | Myers | |
| 2002/0175997 | A1 * | 11/2002 | Takata et al. | 348/143 |
| 2003/0023595 | A1 * | 1/2003 | Carlbom et al. | 707/7 |
| 2003/0025599 | A1 * | 2/2003 | Monroe | 340/531 |
| 2003/0025800 | A1 | 2/2003 | Hunter et al. | |
| 2003/0044045 | A1 * | 3/2003 | Schoepflin et al. | 382/103 |
| 2003/0058341 | A1 * | 3/2003 | Brodsky et al. | 348/169 |
| 2003/0081937 | A1 * | 5/2003 | Li | 386/52 |
| 2003/0189588 | A1 * | 10/2003 | Girgensohn et al. | 345/723 |
| 2003/0214600 | A1 * | 11/2003 | Kido | 348/362 |
| 2003/0218696 | A1 * | 11/2003 | Bagga et al. | 348/700 |
| 2004/0001612 | A1 * | 1/2004 | Gutta et al. | 382/107 |
| 2004/0041920 | A1 * | 3/2004 | Mizukami et al. | 348/222.1 |
| 2004/0088723 | A1 * | 5/2004 | Ma et al. | 725/19 |
| 2004/0125877 | A1 * | 7/2004 | Chang et al. | 375/240.28 |
| 2004/0131233 | A1 * | 7/2004 | Comaniciu et al. | 382/104 |
| 2004/0131249 | A1 * | 7/2004 | Sandrew | 382/162 |
| 2004/0136460 | A1 * | 7/2004 | Zhang et al. | 375/240.16 |
| 2004/0204919 | A1 * | 10/2004 | Li | 702/189 |
| 2005/0002452 | A1 * | 1/2005 | Dufaux et al. | 375/240.01 |
| 2005/0034057 | A1 * | 2/2005 | Hull et al. | 715/500.1 |
| 2007/0201746 | A1 * | 8/2007 | Kim | 382/190 |

FOREIGN PATENT DOCUMENTS

| | | |
|---|---|---|
| EP | 1026636 | 8/2000 |
| EP | 1326448 | 7/2003 |
| EP | 1 326 448 A3 | 12/2003 |
| EP | 1473668 | 11/2004 |
| EP | 1478187 | 11/2004 |
| GB | 1127742 | 9/1968 |
| GB | 2 392 033 A | 2/2004 |
| GB | 2392033 | 2/2004 |
| JP | 08102856 | 4/1996 |
| JP | 2000253199 | 9/2000 |
| JP | 200305886 | 11/2000 |
| JP | 2001-145091 | 5/2001 |
| WO | WO98/39927 | 9/1998 |
| WO | WO01/56471 | 8/2001 |
| WO | WO 01/56471 A1 | 8/2001 |
| WO | WO01/77880 | 10/2001 |
| WO | WO02/09085 | 1/2002 |
| WO | WO02/093525 | 11/2002 |

* cited by examiner

| 5201 | 5202 | 5203 | 5204 | 5205 | 5206 |
|---|---|---|---|---|---|
| 0000 - 0200 | 0200 - 0400 | 0400 - 0600 | 0600 - 0800 | 0800 - 1000 | 1000 - 1200 |

| 5207 | 5208 | 5209 | 5210 | 5211 | 5212 |
|---|---|---|---|---|---|
| 1200 - 1400 | 1400 - 1600 | 1600 - 1800 | 1800 - 2000 | 2000 - 2200 | 2200 - 2400 |

REPORT FOR 52/3

*Fig. 52*

MONITORING AN OUTPUT FROM A CAMERA

FIELD OF THE INVENTION

The present invention relates to processing output data from a video camera.

DESCRIPTION OF THE RELATED ART

Automated monitoring systems (possibly used for surveillance purposes) are shown in international patent publication WO 01/78397, assigned to the present applicant. A known system provides a plurality of cameras for monitoring one or more objects so as to detect predetermined characteristics and generate trigger signals. An event system receives events and determines whether an alarm condition exists and the system can be used to protect a number of objects, such as paintings and art works held in a number of locations, from theft or vandalism.

FIG. 1

A plan view of an art gallery is shown in FIG. 1, consisting of an entrance area 101, a central area 102, and a number of peripheral viewing galleries 103 to 111. Monitoring may also be provided in a car park area 112 adjacent to the gallery.

Viewing galleries to 103 to 111 all contain expensive works of art and are therefore protected by a plurality of cameras, including cameras 115 and 116 in room 103 and cameras 117, 118, 119 and 120 in room 109. A security guard sits in a security office 121 that includes many television monitors 122 configured to receive signals from the cameras, including cameras 115 to 120.

The cameras of the prior art include self-regulating controls for brightness and contrast, so as to compensate automatically when changes occur to the ambient room lighting.

FIG. 2

Gallery viewing room 109 is shown in detail in FIG. 2. In this example, a vandal has attacked a painting 201 with a knife and the vandal's actions have been caught by camera 117. However, there are a large number of cameras in the establishment, including camera 119 that is monitoring the activities of visitors viewing a second painting 202.

FIG. 3

A surveillance officer located in room 121 views the outputs from many video cameras, including cameras 118 to 120, via a bank of video monitors 301. The surveillance officer is presented with a large amount of visual data including an image of painting 201 being vandalised, on a monitor 302 and an image of visitors looking at painting 202 on a monitor 303. In this example, the surveillance officer is looking at the output from monitor 303 at a time when the vandalism is taking place such that, although being displayed, the officer is not made aware of the vandalism being depicted on monitor 302.

It is likely that the images displayed on monitor 302 will have been recorded on video tape, or similar media, such that it would be possible to take action after the event. However, it is far preferable to detect an event of interest (the vandalism of the picture say) at an early stage and preferably identify some other form of activity prior to the vandalism taking place which could allow the vandal to be apprehended before any damage is done.

It has been appreciated that there has been an increasing demand for security monitoring and surveillance operations to be conducted but the reliance on predominantly human activities often makes the task uneconomic. It would therefore be preferable to introduce technical solutions in order to provide technical monitoring with far less reliance on human observation.

BRIEF SUMMARY OF THE INVENTION

According to an aspect of the present invention there is provided a method of monitoring an output from a video camera, comprising the steps of analysing input data to produce a model of a background image; comparing incoming image data against said background. model to identify images having a high level of activity created by the introduction of a foreground object; identifying a period of activity composed of a plurality of consecutive images having a high level of activity; and generating an exemplar image from said period of activity.

BRIEF DESCRIPTION OF THE SEVERAL VIEWS OF THE DRAWINGS

FIG. 52 shows an example of a daily report;

The invention will now be described, by way of example only, with reference to the accompanying figures.

WRITTEN DESCRIPTION OF THE BEST MODE FOR CARRYING OUT THE INVENTION

FIG. 4

Figure 1:
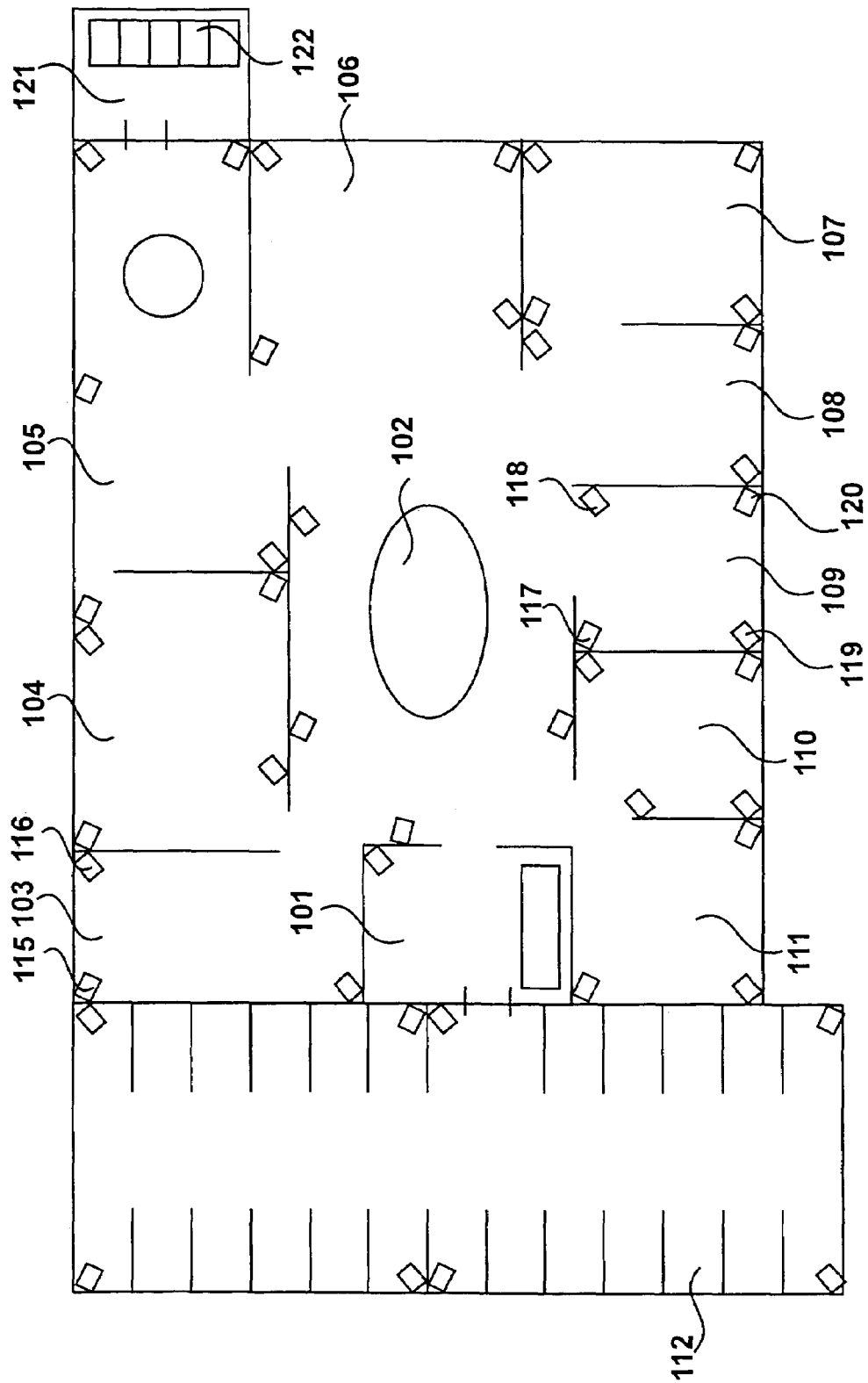
FIG. 1 shows a plan view of an art gallery of the prior art.
Figure 2:
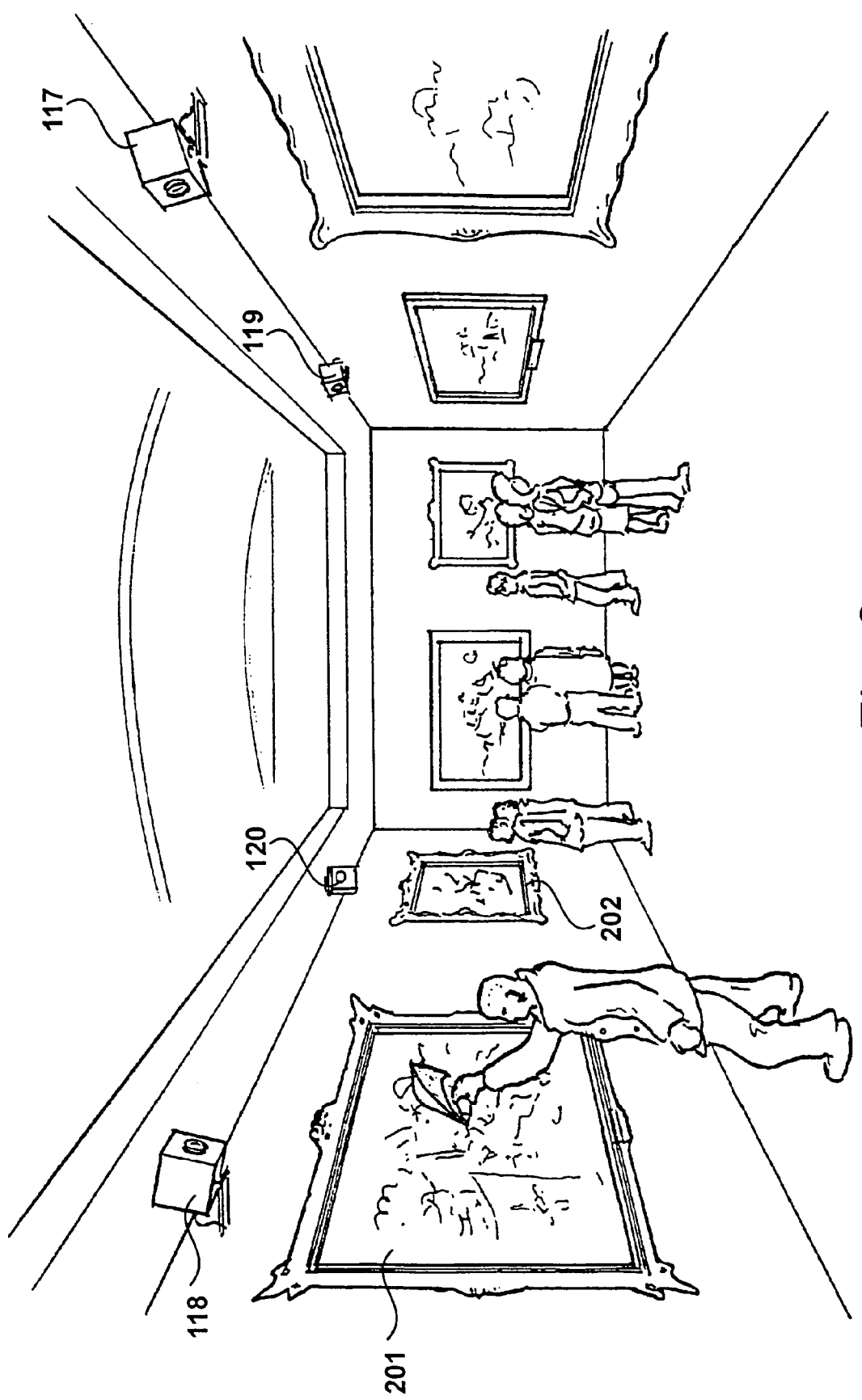
FIG. 2 shows a gallery viewing room of the prior art.
Figure 3:
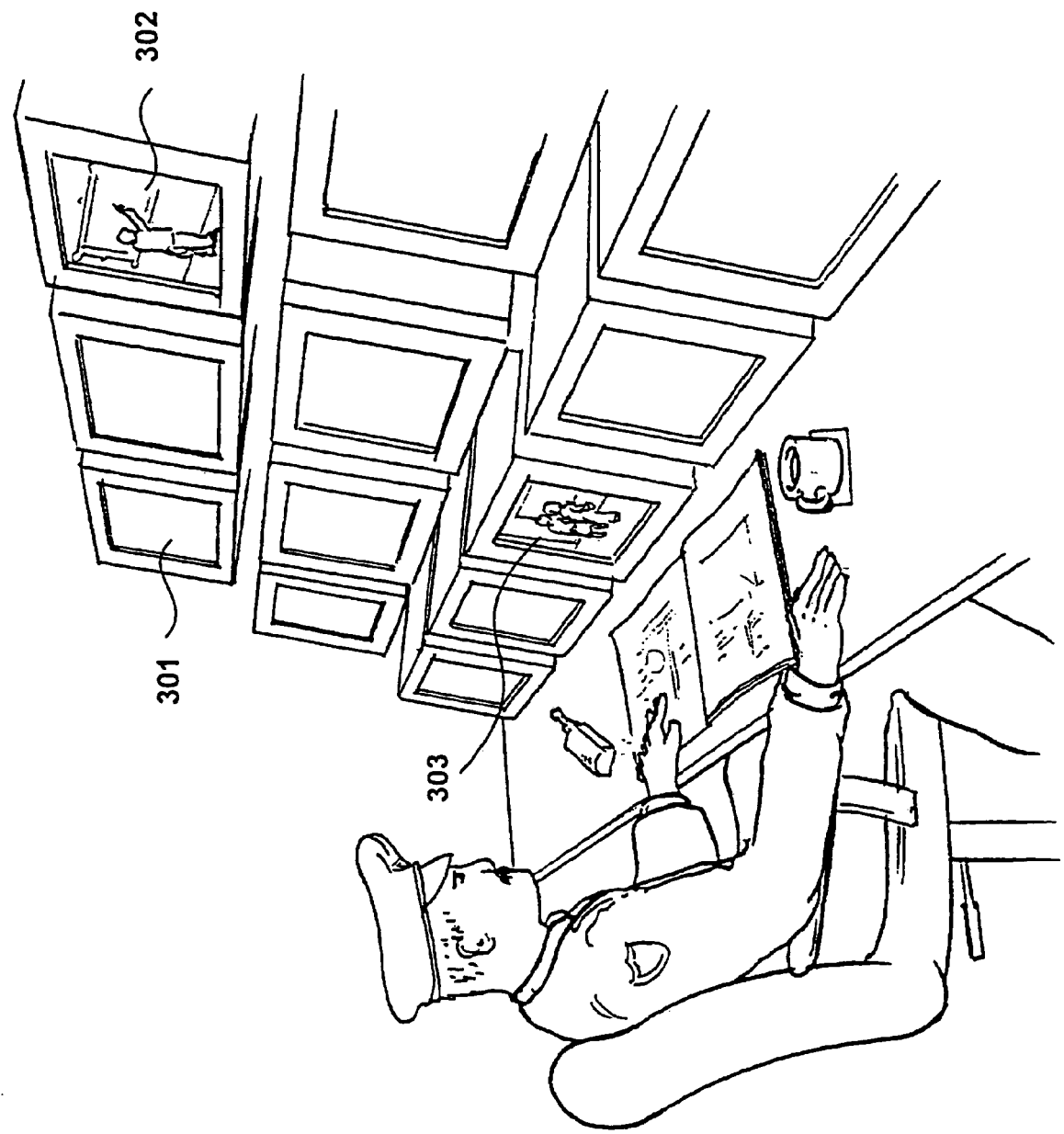
FIG. 3 shows a security room of the prior art.
Figure 4:
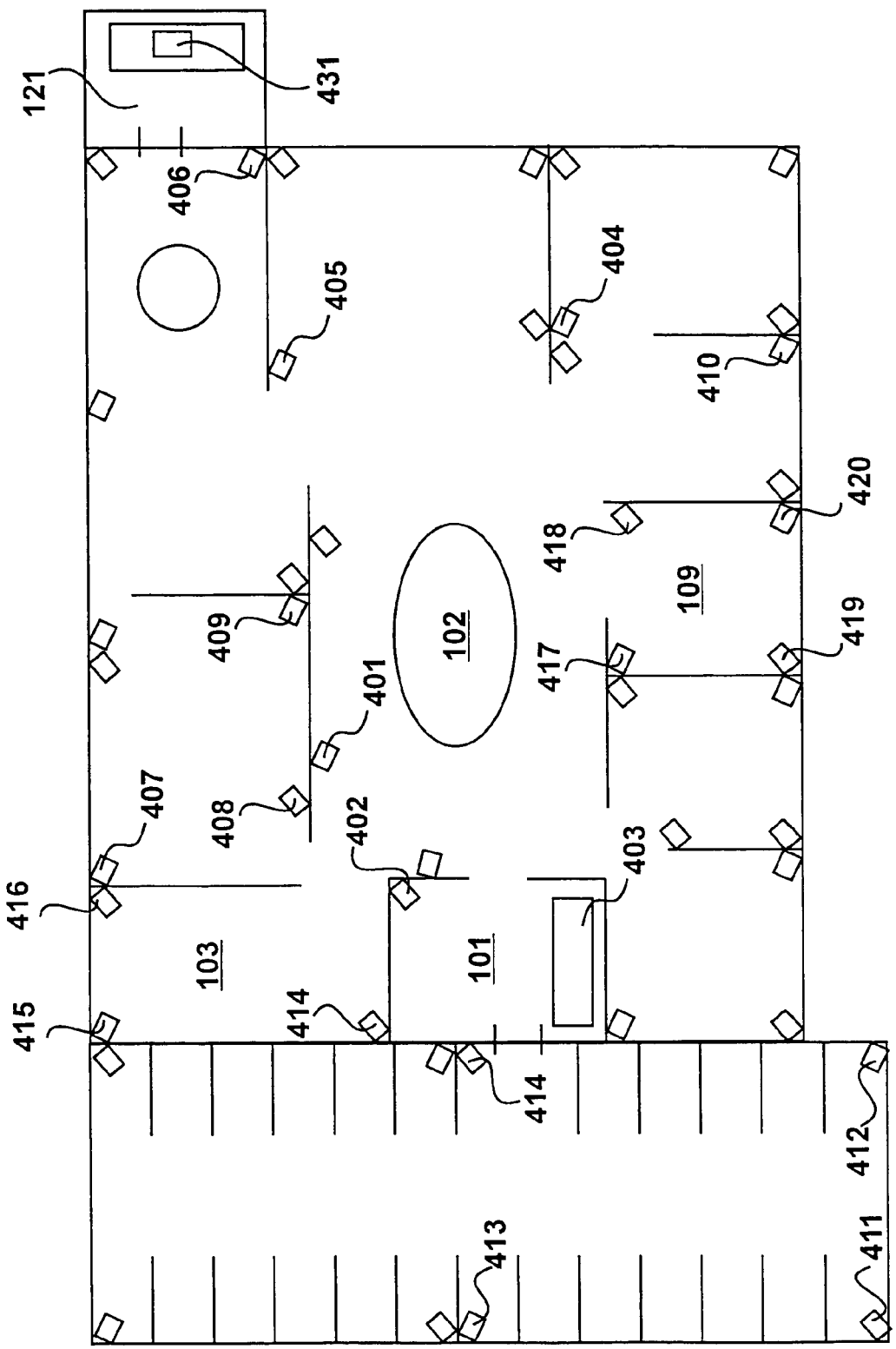
FIG. 4 shows a plan view of an art gallery substantially similar to that shown in FIG. 1 but incorporating an embodiment of the present invention.

A plan view of the art gallery identified in FIG. 1, is shown in FIG. 4 after modifications have been made to incorporate an embodiment of the present invention. Detection devices are in this example provided by digital monitoring cameras, such as cameras 401 to 420, that produce a digital video output signal for transmission over a data network. In addition, the cameras are also configured with digital input interfaces for receiving operational control signals.

It will be appreciated that the digital monitoring video cameras provide many advantages over traditional analogue video cameras. However, it will also be appreciated that many of the techniques described herein could also be applied to use of cameras of a more traditional design.

In surveillance office 121, the bank of video monitors 122 has been replaced by a single monitor 431. However, in an alternative embodiment, information may be processed locally and then transmitted to a remote site over a telecommunications link. The remote site could in theory be many miles away, possibly even in a different country. In addition, several environments such as the art gallery shown in FIG. 4 could be monitored using a shared facility.

FIG. 5

Figure 5:
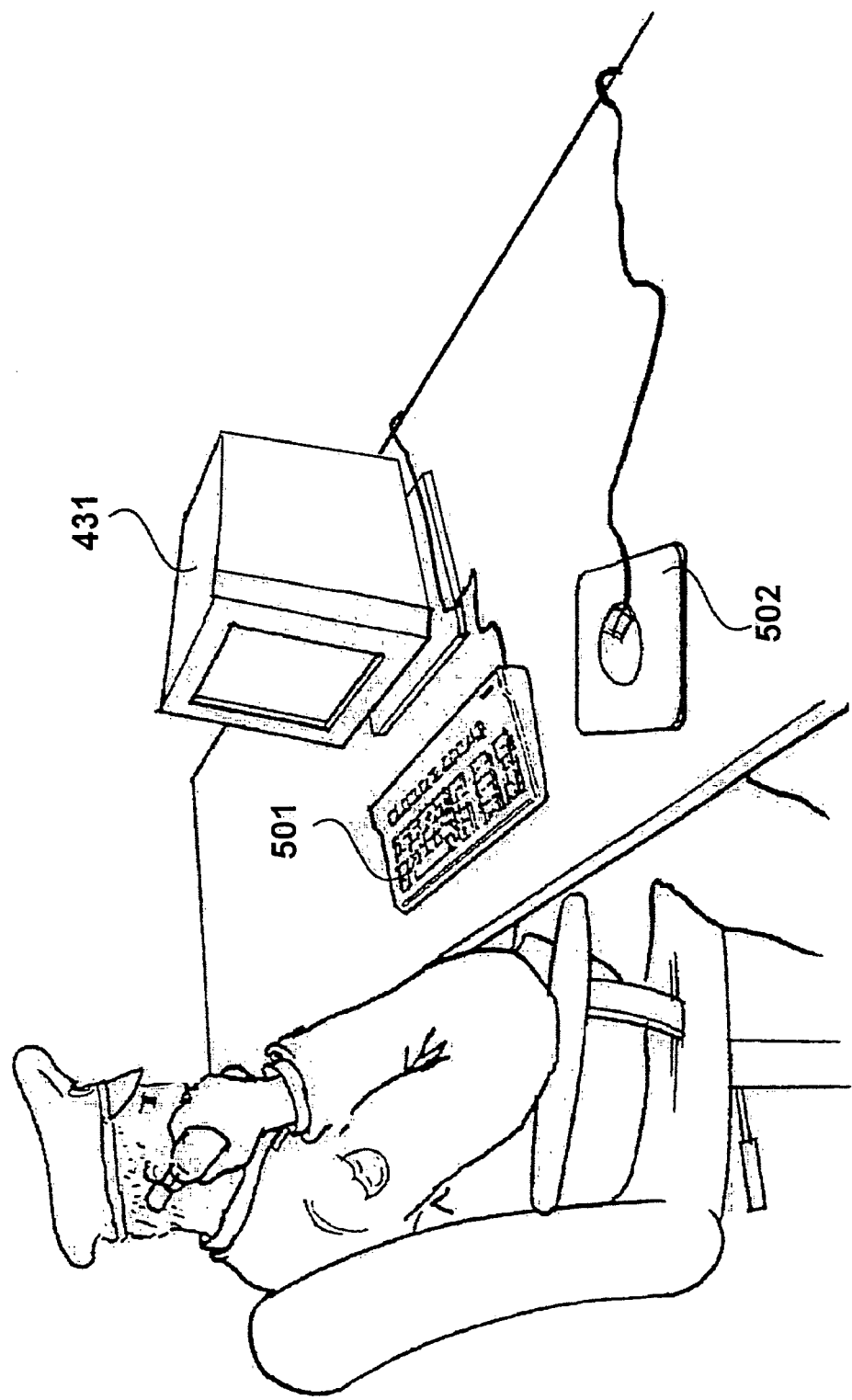
FIG. 5 shows a control room similar to that shown in FIG. 3 but embodying the present invention.

The security office 121 shown in FIG. 4 is detailed in FIG. 5. Monitor 431 is shown displaying images to the security officer (operator) such that said operator may make observations and then act upon these observations. The digital monitoring cameras shown in FIG. 4 (115 to 120 etc) supply input image data to a processing environment (shown in FIG. 7) such that the visual information is monitored by said processing environment. Thus, after performing a degree of technical monitoring, output image data is supplied to the monitor 431 for observations to be performed and actions to be taken by the operator. A local processing system is also configured to receive manual input data from the operator via a keyboard 501 and a mouse 502 or similar manually operable input devices.

The processing environment (possibly in the form of a plurality of networked computers) is configured to identify events of potential interest from an analysis of the image input data sources. The operator observes information displayed by monitor 431 but much of the monitoring exercise is performed by the system technology itself. Consequently, the amount of data displayed to the operator is reduced significantly but the information content is much higher. In this way, there is a greater likelihood of an event of interest being observed by the operator (thereby allowing it to be acted upon) while the degree of human effort and attention is significantly reduced.

FIG. 6

With reference to the previously described scenario, the painting 201 is about to be attacked by a vandal. However, the activities of the vandal are now being captured by digital monitoring camera 417 and the resulting video images are being monitored by the processing system. In this way, it is possible for the monitoring system to identify unusual activities performed by the vandal, such as the vandal moving too close to the painting and raising an arm etc. Thus, these activities are detected by the monitoring system as being more likely to be of interest than the activities captured by camera 420, say. Activities identified in this way by the monitoring system are described herein as events of potential interest. Activities identified by the monitoring processes would then be observed by an operator to determine whether they were of real interest.

Figure 6:
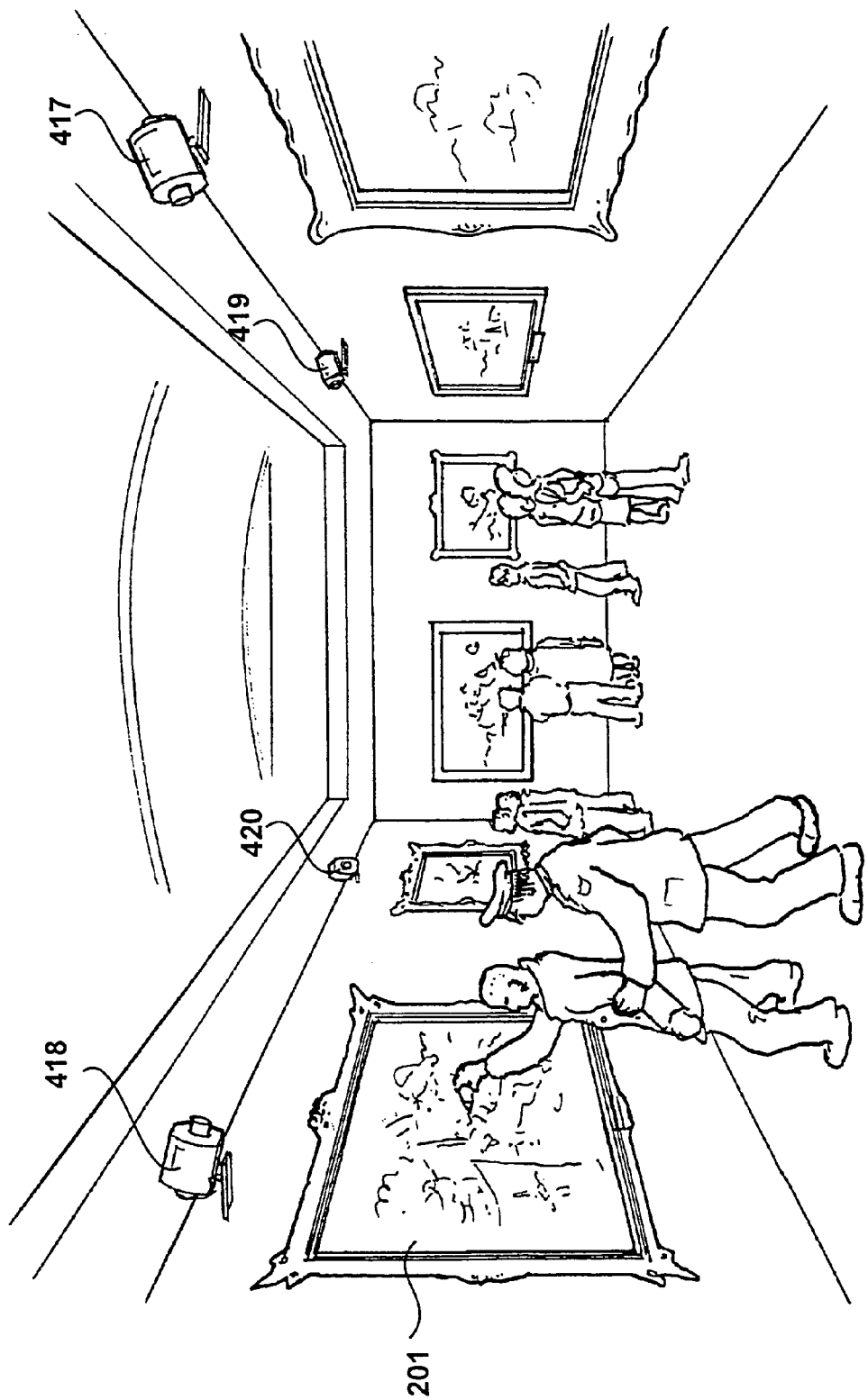
FIG. 6 shows a gallery viewing room incorporating an embodiment of the present invention.

Upon the vandal's activities being monitored and detected by the processing system, the image is brought to the attention of the operator shown in FIG. 5 by being displayed prominently on monitor 431. The operator is then in a position to radio a colleague who can apprehend the vandal, as shown in FIG. 6, prior to any actual damage taking place. It is also possible for information to be sent to patrolling guards via portable devices, such as radio enable hand-held computers.

This could be instigated by an operator (after observing) or an image could be sent automatically by the monitoring system.

The sophistication of the digital monitoring cameras shown in FIG. 6, in combination with the processing environment for monitoring input signals, allows a further degree of sophistication to be introduced. Thus, for example, it is desirable for the digital monitoring cameras to be appropriately maintained; so as to ensure the reception of optimum signals while at the same time avoiding unnecessary periods when the cameras are placed offline while avoiding the unnecessary expense of performing maintenance functions that are not actually required. Consequently, in a preferred embodiment, a servicing schedule for the cameras is generated by analysing background images to produce a background model. The background model data is processed in combination with the incoming data to ascertain an extent of degradation experienced by the cameras. The extents of degradation are reviewed automatically for a plurality of cameras so as to automatically generate a servicing schedule.

It is possible for other characteristics to be monitored over time that measure camera quality or health, from which it is possible to estimate future health in order to determine an optimum time for carrying out maintenance. Thus camera health could be considered with reference to degradation of focus and/or degradation of contrast, for example.

Furthermore, as previously described, the digital monitoring cameras include an input interface for receiving operational control signals. In this way, it is possible for input signals to be generated that alter the characteristics of the camera so as to optimise and further enhance monitoring functions of the processing environment. Thus, in this example, the operating characteristics of camera 417 have been adjusted in order to obtain better contrast and clarification of the image data that that includes the captured image of the vandal. This in turn facilitates the monitoring operation which determines whether activities of potential interest are being carried out. These activities of potential interest (detected by the monitoring system) are then presented to the operator allowing the operator to observe the activities directly and act upon them appropriately. Thus, in this scenario, the activities of potential interest have been observed and the human operator has then reached a decision to the effect that the activities are of real interest and must be acted upon.

FIG. 7

Figure 7:
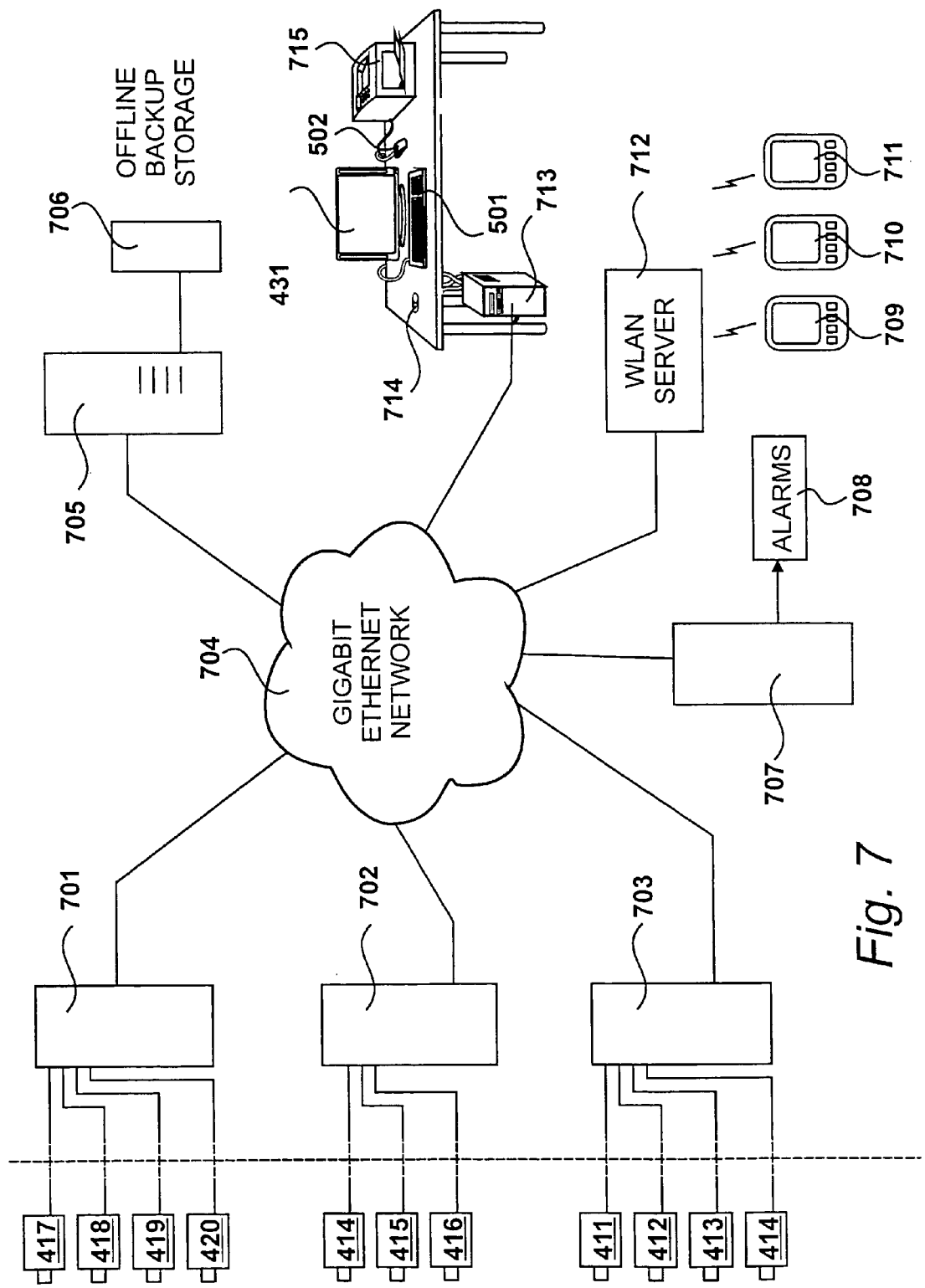
FIG. 7 shows an overview of monitoring apparatus.

The network of cameras illustrated in FIG. 4 in combination with the local processing environment shown in FIG. 5 forms part of an overall monitoring apparatus, as illustrated in FIG. 7. Image data processing systems 701, 702 and 703 communicate via a high speed ethernet network 704. Processing system 701 receives input image data from digital monitoring cameras 417 to 420. The processing system 701 may also receive other sensor input data from other types of detector, such as pressure detectors and infra-red detectors etc. Similarly, processing system 702 receives input image data from monitoring cameras 414 to 416 and processing system 703 receives input image data from monitoring cameras 411 to 414.

At each processing system 701 to 703 image data processing is performed which results in decisions being made such as to whether particular input images are to be stored, processed more intensively and/or possibly used in order to adjust operating characteristics of the image capturing process.

Image processing system 705 provides a data store for images, along with other data generated by analytical processes or in response to inputs received from an operator.

In the environment shown in FIG. 4, all of the digital monitoring cameras are interfaced to processing systems similar to processing system 701. These additional processing systems are also connected to the ethernet network 704, thereby allowing all image data produced within the environment to be analysed and stored to an extent considered appropriate by the monitoring system.

Data store processing system 705 communicates with a high capacity offline backup storage unit 706 to allow for image data to be duplicated onto removable data media, such as digital video tape, magnetic or optical disks etc.

Remote processing system 707 is available to provide remote analysis of incoming video data in situations where additional processing capacity is required or is considered desirable. In addition, remote processing system 707 also communicates with a plurality of output alarm generating devices 708 which, in response to potential activities of interest being monitored, will result in appropriate alarm triggers being generated such that appropriate action may be taken.

It is also possible for information to be transmitted to handheld radio devices, such as devices 709, 710 and 711 taking the form of wireless equipped handheld computers or processing enabled mobile phones etc. Communication to these devices is provided by a wireless local area network server 712, which in turn receives signals from the processing systems via the network 704.

The local processing system or workstation described with reference to FIG. 5 is shown communicating with the network 704 via a processing system 713. Operating instructions for the processing system 713 are, in an embodiment, loaded from an instruction-carrying medium such as a CD-ROM 714 receivable within a CD-ROM player. Alternatively, operating instructions may be received from a server via the network 704. These possibilities and others exist for other processing systems within the overall apparatus.

The provision of a network connection to the local workstation enables the workstation to view analysis results generated from captured input data, thereby allowing monitored activities to be observed by the operator. In addition, the network connection also facilitates the replay and examination of recorded material, including images and results of analyses performed by the monitoring infrastructure. Recorded images may also be retrieved from the storage system 705/706.

The operator's workstation also includes a printing device 715 configured to produce daily reports in eye-readable form, in addition to similar reports being generated electronically and possibly distributed over the network 704. The printing device 715 is also available to produce hard copies of maintenance schedules that are generated in response to analysing the incoming video data and determining the extent to which degradation has taken place so that the maintenance activities may be scheduled to obtain optimised results at minimised cost.

FIG. 8

Figure 8:
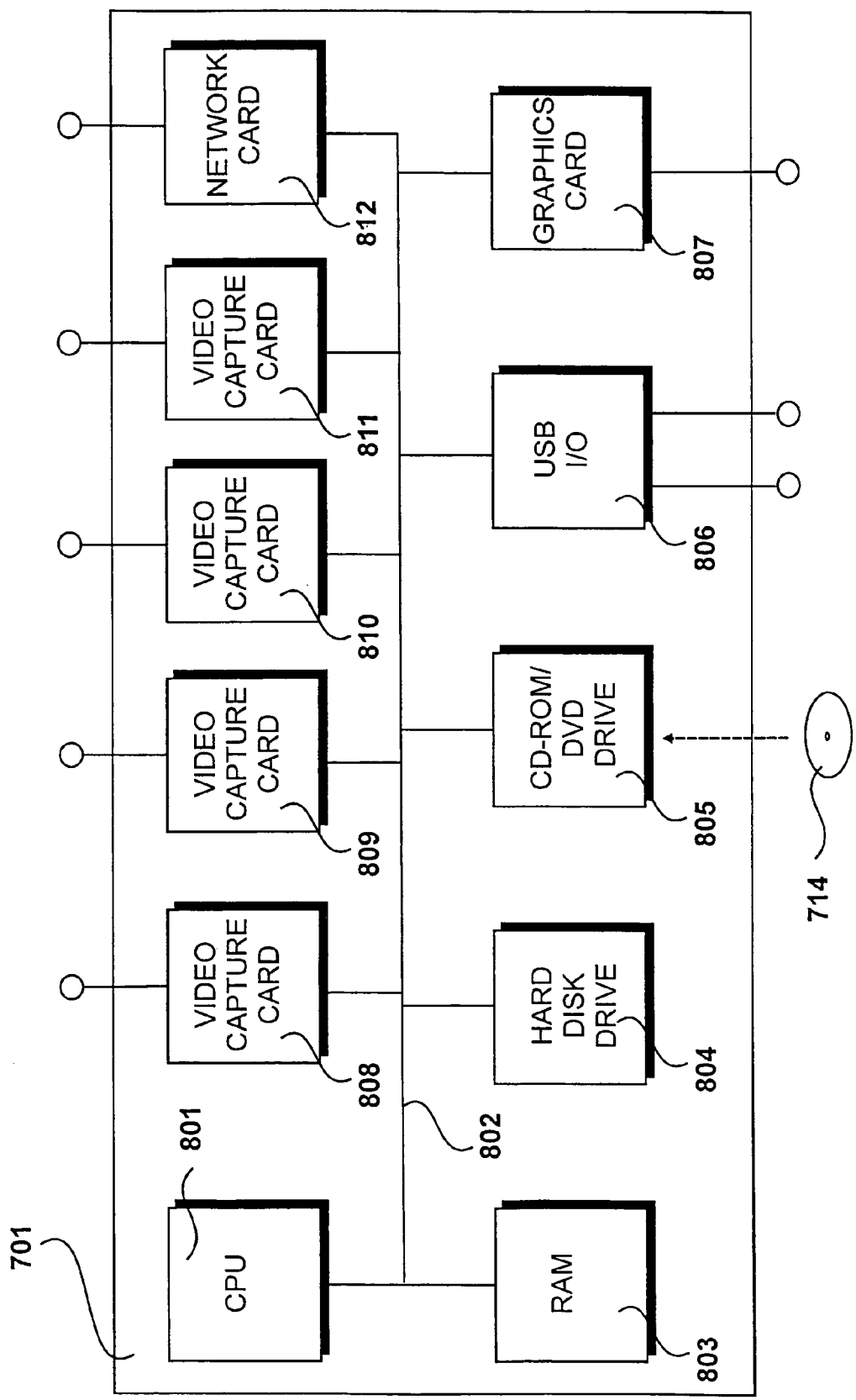
FIG. 8 details the processing systems shown in FIG. 7.

The processing systems shown in FIG. 7 are all substantially similar, and are illustrated in FIG. 8. In a preferred embodiment, each of the processing systems is based substantially upon a standard PC constructed from general purpose "off the shelf" components. However it will be appreciated that many other types of processing platform may be adopted in order to optimise price/performance considerations.

A processor is provided by a Pentium® 4 central processing unit 801 running at a clock speed of 3 gigahertz. Internal communication within the system occurs over a system bus 802 facilitating, for example, communication with two gigabytes of dynamic random access memory 803, available for storing executable instructions, and pre-processed and post-processed data.

Non-volatile storage is provided by a hard disk drive 804, for the storage of instructions and for the storage of large quantities of data. In some configurations, such as that for the data store, the hard disk drive 804 may take the form of a redundant array of independent disks (RAID) providing a total capacity in excess of one terabyte. In other processing systems a storage capacity of 90 gigabytes is generally available.

As previously described, program instructions are received from a CD-ROM 714 via a CD-ROM/DVD drive 805. In a preferred embodiment, instructions are installed within the local system 713, whereafter these instructions can be installed on other processing systems via the network such that, after installation, these processing systems may be configured remotely so as to perform their specialised operations.

System 713 also includes a universal serial bus (USB) input/output interface 806 for providing connectivity with the input devices 501 and 502 and with the output printing device 715. The graphics card 807 receives rendering instructions and data from the processing unit 801 so as to display an interface and camera images to the display monitor 431.

Processing systems 701 to 703 connected to digital monitoring cameras (as shown in FIG. 7) may include video capture cards 808 to 811, one for each of the video inputs. The video capture cards 808 to 811 receive real time digital video signals from the digital monitoring cameras to which they are connected. The cards in turn provide output data in the form of addressable image frames that can be accessed by the central processing unit to facilitate local analysis, transmission for remote analysis, real time monitoring or storage. Communication to the network 704 is facilitated by the provision of a network card 812.

In an alternative embodiment (not shown), the digital monitoring cameras have their own digital interface with an internet protocol facility.

FIG. 9

Figure 9:
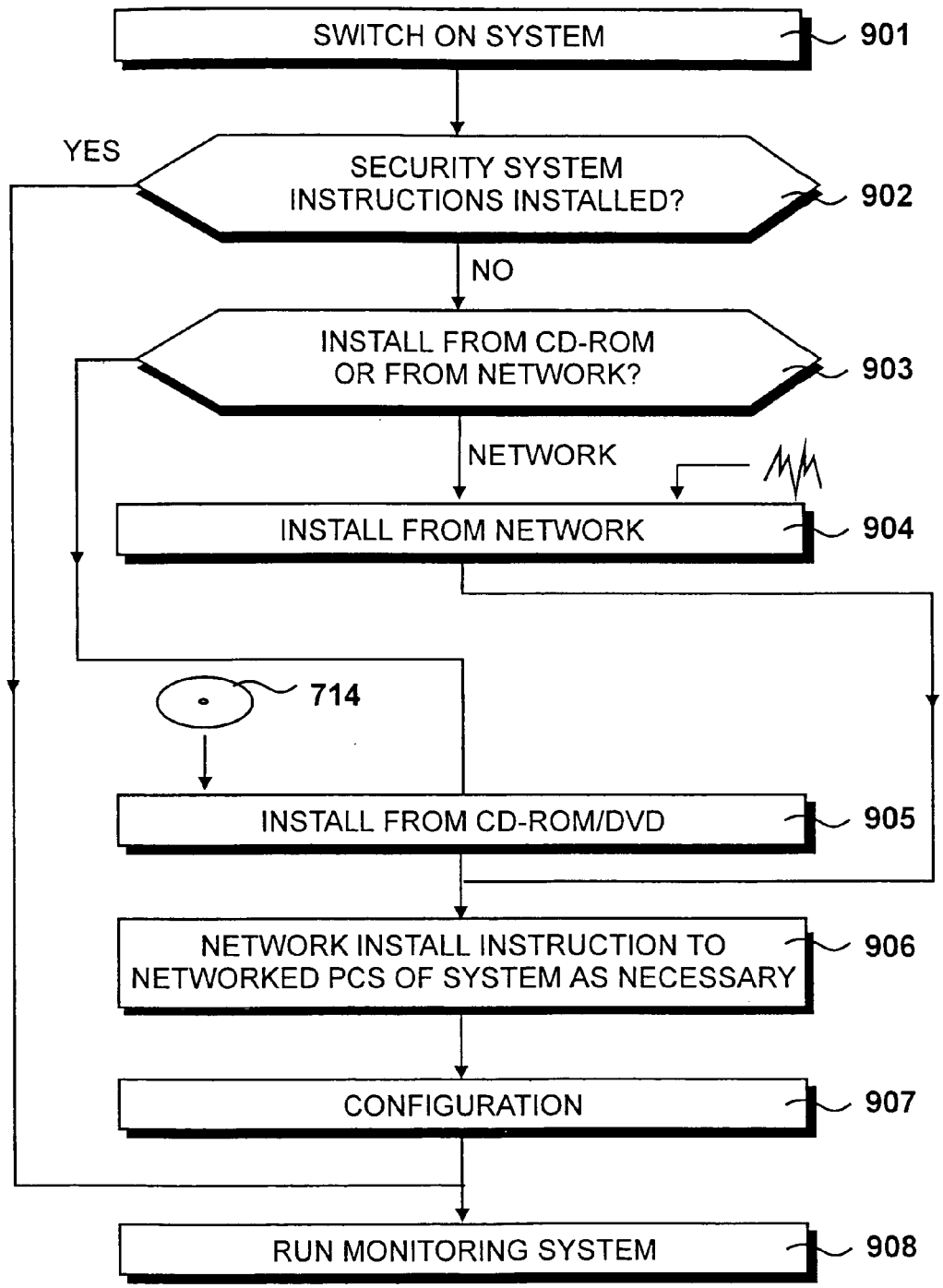
FIG. 9 shows the steps of installation, configuration and operation of the system.

After constructing the apparatus as shown in FIG. 7, installation, configuration and operation are performed as shown in FIG. 9. At step 901 the security system is switched on. At step 902 a question is asked as to whether monitoring systems are already installed. If so, control is directed to step 908 whereupon the monitoring system is operated. Alternatively, control is directed to step 903, where a question is asked as to whether installation should be performed from a CD-ROM/DVD disk or from a network. If the system is not configured to operate in this way, installation may be completed with reference to written instructions.

If installation is to be performed via a network, control is directed to step 904, whereupon installation is performed via the network 704, possibly via a secure connection to a site on the internet. Security instructions can also be installed from the CD-ROM disk 714, as performed at step 905. Thereafter control is directed to step 906. Having installed monitoring instructions on processing system 713 shown in FIG. 8, network installation to other processing systems may be performed at step 906 via the network 704.

Similar or identical instructions may be installed on each of the processing systems, and the relevant functionality is activated in response to a configuration script running on the first processing system upon which the instructions were installed. This usually requires some input from a person overseeing the configuration process. At step 907 this configuration script is executed, resulting in configuration of the various processing modules upon the various processing systems. Thereafter, at step 908 the monitoring system instructions are activated.

FIG. 10

Figure 10:
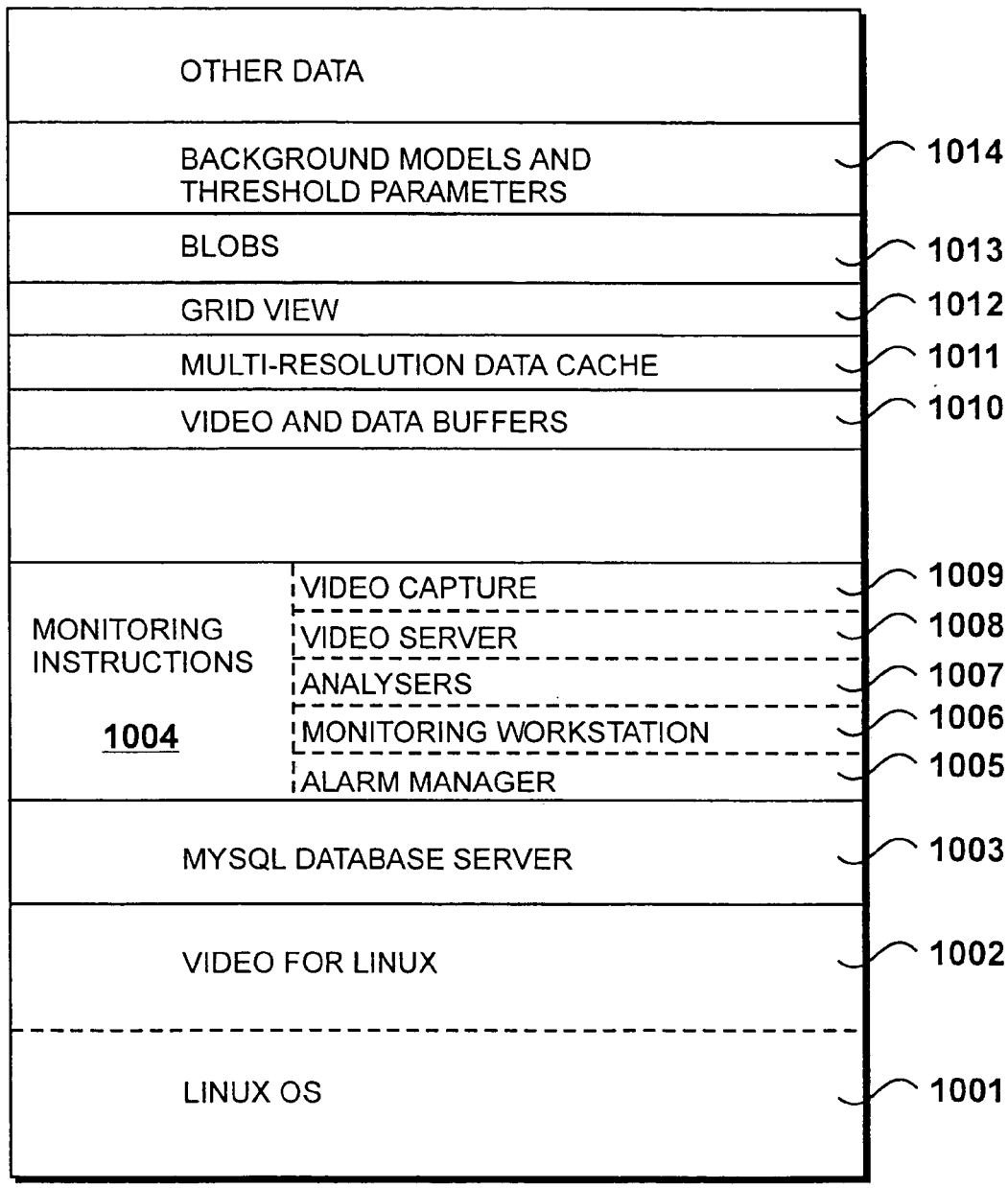
FIG. 10 shows a summary of the memory contents for each processing system shown in FIG. 7.

A summary of the contents of main memory 803 for each processing system illustrated in FIG. 7 (when running the monitoring system as shown at step 908) are illustrated in FIG. 10. Each of the processing systems will store slightly different contents in memory and FIG. 10 illustrates the contents that will be found at least somewhere in the monitoring system in order to perform the various monitoring functions.

A Linux operating system 1001 provides basic functionality for each processing platform, including video for Linux instructions 1002 to facilitate video hardware device abstraction, thereby allowing the digital monitoring cameras to communicate with the video capture cards.

A suitable database server is provided at the data store 705 to facilitate non-linear data storage and retrieval of time based images and video analysis data. Monitoring instructions 1004 include alarm manager instructions 1005, monitoring workstation instructions 1006, analyser instructions 1007, video server instructions 1008 and video capture instructions 1009.

Video and data buffers are provided in several of the processing systems for facilitating various communication protocols, analyses and viewing. A multi-resolution data cache 1011 and grid view data 1012 are provided at the local workstation system 713. Binary large objects (blobs) 1013 are used by analysis instructions 1007. Background models and threshold parameters 1012 are also utilised by analysis instructions 1007.

FIG. 11

After system configuration at step 908, each of the processing systems 701 etc is configured to execute a certain subset of the instructions 1003 to 1009. This results in the instantiation of a number of objects (or modules) at various processing nodes on the system. In order to provide an understanding of the overall operation of the security system an illustration as to how these objects interact is provided in FIG. 11.

Cameras, such as cameras 405 to 410, are connected to video capture objects, such as video capture objects 1101 to 1106. The video capture objects are created as a result of the execution of video capture instructions 1009. Thereafter, each video capture object executes instructions for receiving and formatting images for a particular camera, such as camera 407. For example, the capture process typically reduces the camera frame rate from standard transmission rates of 25 or 30 frames per second (50 or 60 fields per second) to a lower rate acceptable for monitoring purposes such as 10 frames per second. However, these frame rates may be adjusted either as part of a set up procedure or dynamically in response to activities of interest being captured. The video capture objects 1101 to 1106 also facilitate the dynamic configuration of camera parameters, again in response to capturing an activity of potential interest.

In response to the execution of analyser instructions 1007, analyser objects 1107 to 1112 etc are created that in turn each receive video frames from a respective video capture object 1101 to 1106.

Digital monitoring camera 407 supplies a digital video signal to capture object 1101, that in turn supplies images to a first analyser 1107. Capture object 1101 and analyser object 1107 are (in a preferred embodiment) located within the same processing system 701. However, as an example of an alternative configuration, it is seen that capture object 1105 and analyser object 1111 are located on different processing systems and communicate via a network. In this example, an intervening video server 1113 is provided to enable the network to be used transparently. Video server objects are created as a result of executing video server instructions 1008.

The analysers 1107 to 1112 generate image data and text data outputs that may be monitored in real time by an alarm manager object 1115 or a monitoring workstation object 1116. These objects are created as a result of initially executing instructions 1005 and 1006 respectively. Outputs from the analysers are generally supplied to a data store object 1117. The data store object 1117 also facilitates playback of recorded image data and text data by the monitoring workstation object 1116. The data store object is created as a result of executing the database server instructions 1003.

Hand held radio devices 709 to 711 may connect to any of the objects, and monitoring browser instructions executed on the hand-held devices may be used to view images directly, as supplied to the output of the video server. The hand-held devices may receive alarm notifications directly and may review recorded data. This is a typical use for the hand-held devices in this environment, given that current hand-held designs do not contain sufficient processing capabilities to perform more complex monitoring and analysis operations. However, in the future hand-held devices may be able to perform more complex tasks and so could play a greater role in future embodiments.

Camera 407 supplies image data to analyser 1107 and the analyser object 1107 performs sophisticated analyses of the image frames that it receives. Depending upon the contents of these images, received typically at a rate of 10 frames per second, the analyser may supply image data and parameters to the data store 1117 and/or to the monitoring workstation 1116 and/or to the alarm manager 1115.

FIG. 12

Figure 11:
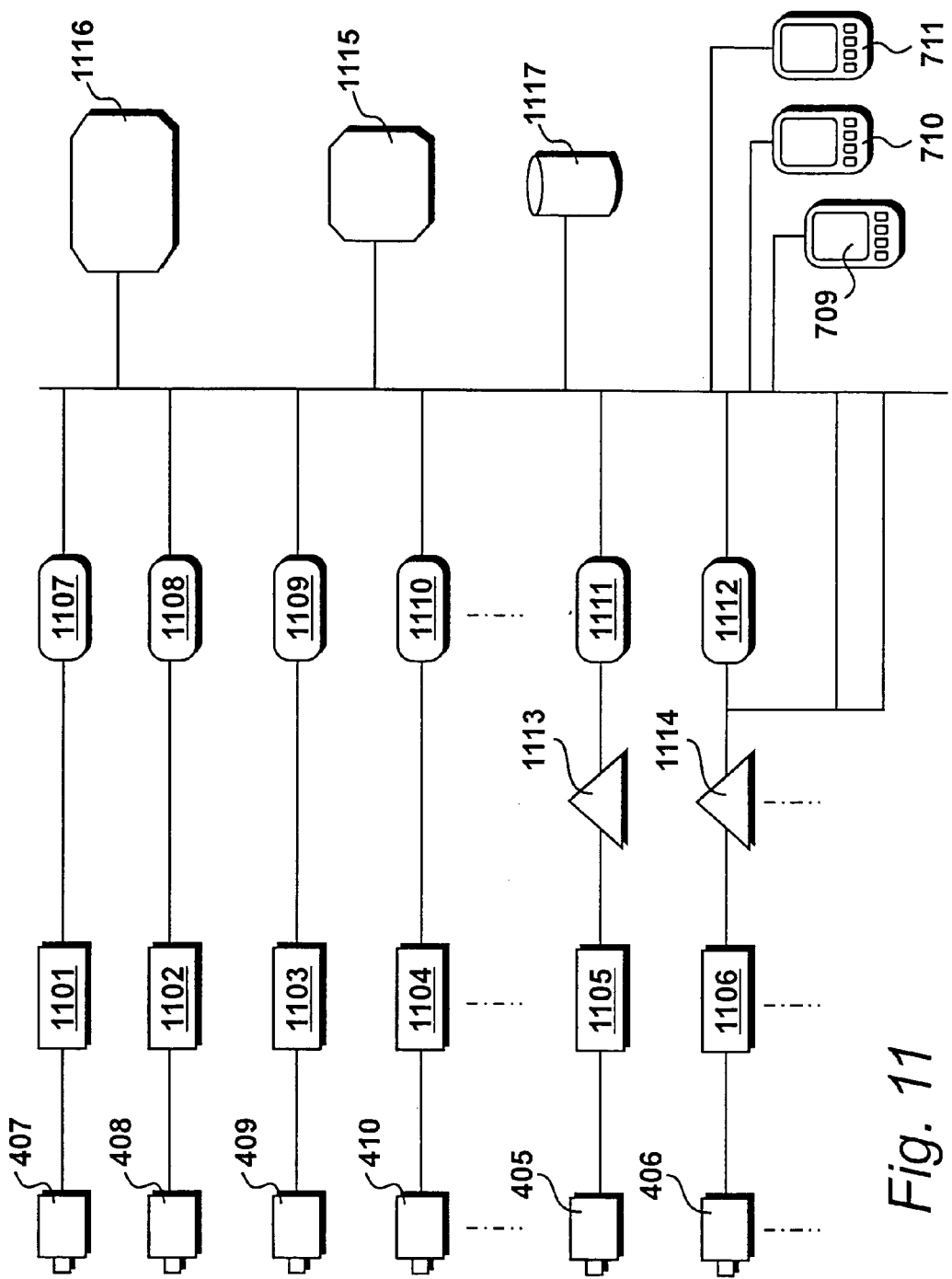
FIG. 11 shows the object interactions involved in operation of the system.
Figure 12:
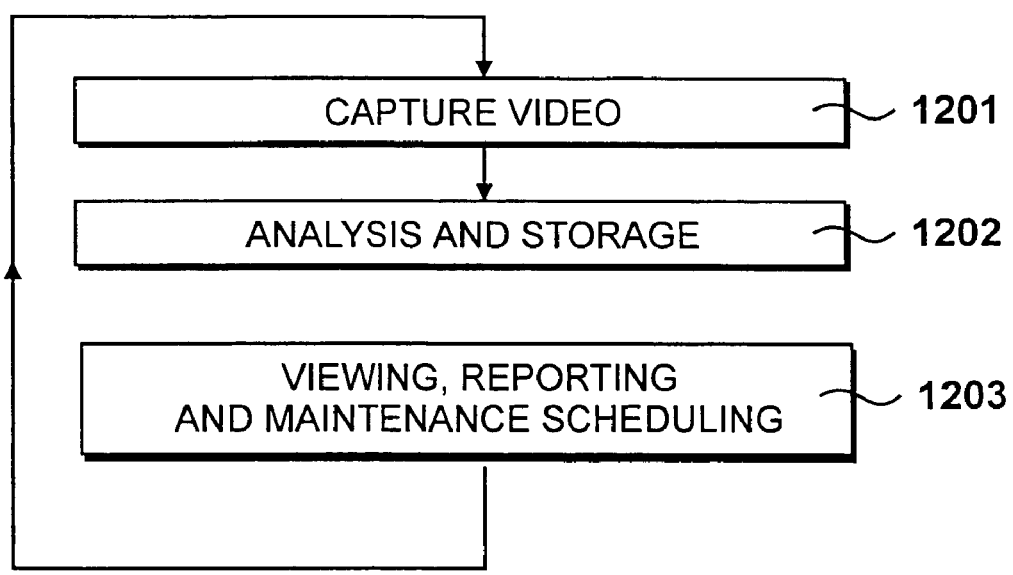
FIG. 12 shows an overall functionality of the system illustrated in FIG. 11.

Overall functionality of the system illustrated in FIG. 11 is summarised in FIG. 12. The structure of FIG. 12 shows the processes being executed serially although, in practice, it will be appreciated that these processes are interdependent and interact in complex ways. Furthermore, it should be appreciated that pipelining techniques may be invoked in order to achieve a high level of processing efficiency and the serial representation is presented as a means of gaining an appreciation of the available functionality.

At step 1201 video capture and serving is performed, this largely being a matter of moving and formatting data as performed by the video capture object 1101. However, operations of the camera itself must also be considered as part of this overall video capture process.

At step 1202 an analysis of the captured video is performed and, where appropriate, analysed signals are also stored.

At step 1203 the benefits of performing the analysis techniques are obtained. These include processes of viewing, reporting and assisting with maintenance scheduling.

FIG. 13

Figure 13:
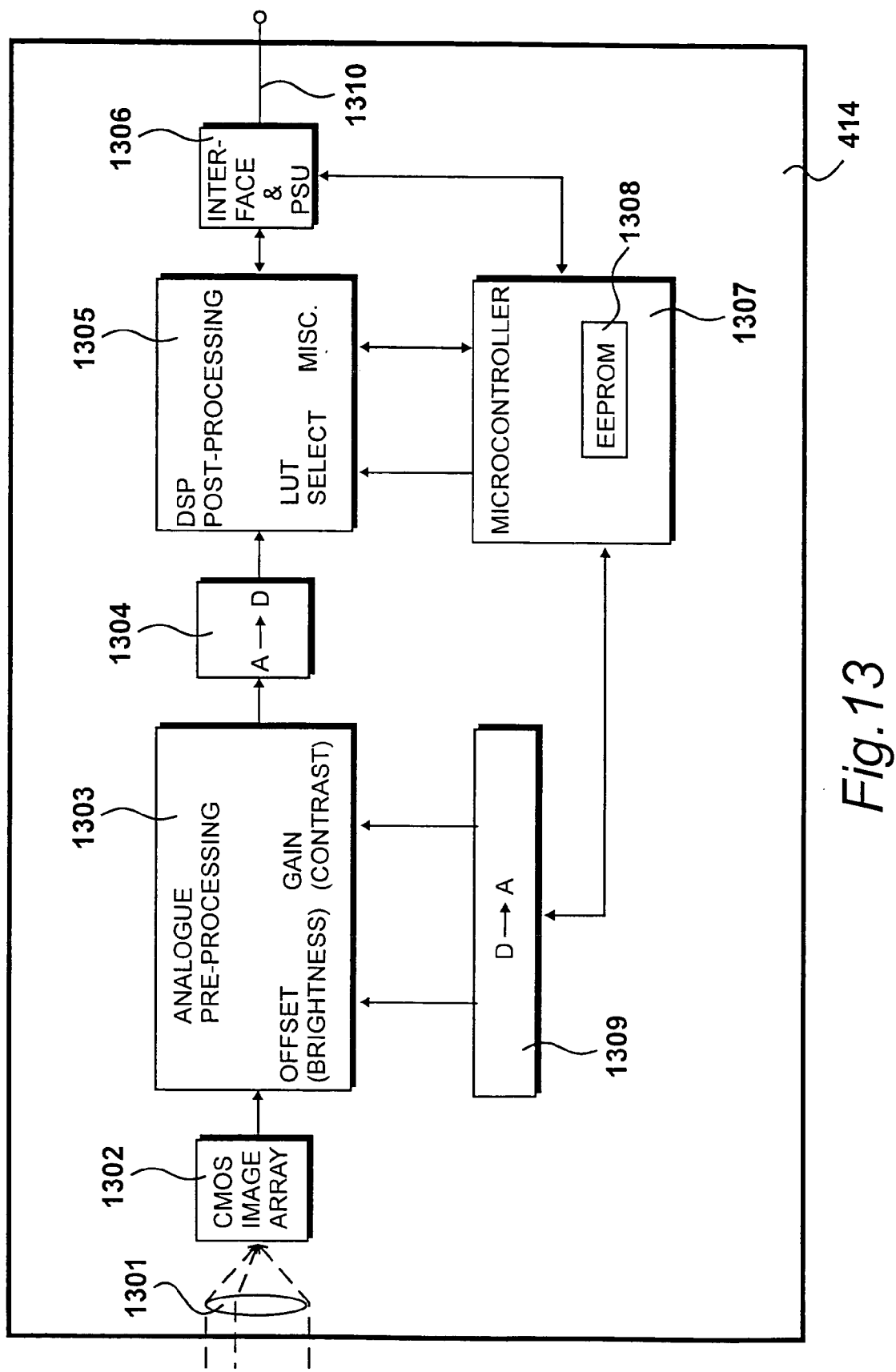
FIG. 13 shows a schematic representation of a digital monitoring camera shown in FIG. 4.

A schematic representation of digital monitoring camera 414 is illustrated in FIG. 13. A lens 1301 focuses an image onto a CMOS imaging array 1302. The imaging array 1302 generates an analogue signal that is processed by an analogue pre-processing circuit 1303. Circuit 1303 modifies the offset and gain of the red green and blue colour signals generated for each pixel, thereby adjusting brightness and contrast. Subsequently, an analogue to digital converter 1304 digitises the resulting red, green and blue analogue signals.

The CMOS image array 1302, the analogue pre-processing circuit 1303 and the analogue to digital converter 1304 each introduce a degree of uncorrelated pixel noise, that manifests itself in the form of pixel-size luminance variations in the resulting digital image. Measures may be taken in order to minimise the level of this noise but a level of noise is always present, even though it may not create visible degradation of the image to any noticeable degree.

A digital signal processor 1305 performs digital manipulation upon the red, green and blue pixel values and may include, for example, the use of look up tables to modify the gamma characteristic of the image signal. A CMOS image array has a particular set of characteristics that are different from film or other electronic sensors and these characteristics can be modified by the use of look up tables. Consequently, several lookup tables may be used, each programmed in advance in accordance with preferred operational characteristics.

Modification to image signals in the digital domain is limited due to the dynamic range of the analogue to digital converter 1304 which, in a preferred embodiment, provides 8 bits per pixel of colour. Digital post-processing circuit 1305 cannot improve the true brightness resolution and can only exaggerate existing pixel values. Analogue pre-processing can increase resolution but usually at the expense of saturating high or low brightness parts of an image.

An interface and power supply circuit 1306 connects the camera to its video capture card 808, with the camera connecting cable also including a power connection. The complexity and power consumption of the camera 407 are minimised so as to reduce cabling costs while increasing reliability.

The microcontroller 1307 receives data from interface circuit 1306 that is used to determine the operations carried out by processor 1305 and pre-processing circuit 1303. An electrically-erasable programmable read only memory device (EEPROM) 1308 stores microcontroller instructions. The digital to analogue converter 1309 converts digital parameters for offset and gain into analogue voltages, that are supplied to analogue pre-processing circuit 1303 to control the brightness and contrast of an image prior to its digitisation. This results in the available dynamic range of the analogue to digital converter 1304 being exploited to a higher degree when capturing images of potential interest.

Camera cable 1310 transmits and receives camera parameter data as well as image pixel data, thereby making the camera highly configurable. However, unlike many known monitoring and surveillance cameras, attempts to perform sophisticated gain adjustments automatically within the camera itself are avoided. Modifications of this type are controlled externally to the camera, elsewhere within the monitoring system.

FIG. 14

Figure 14:
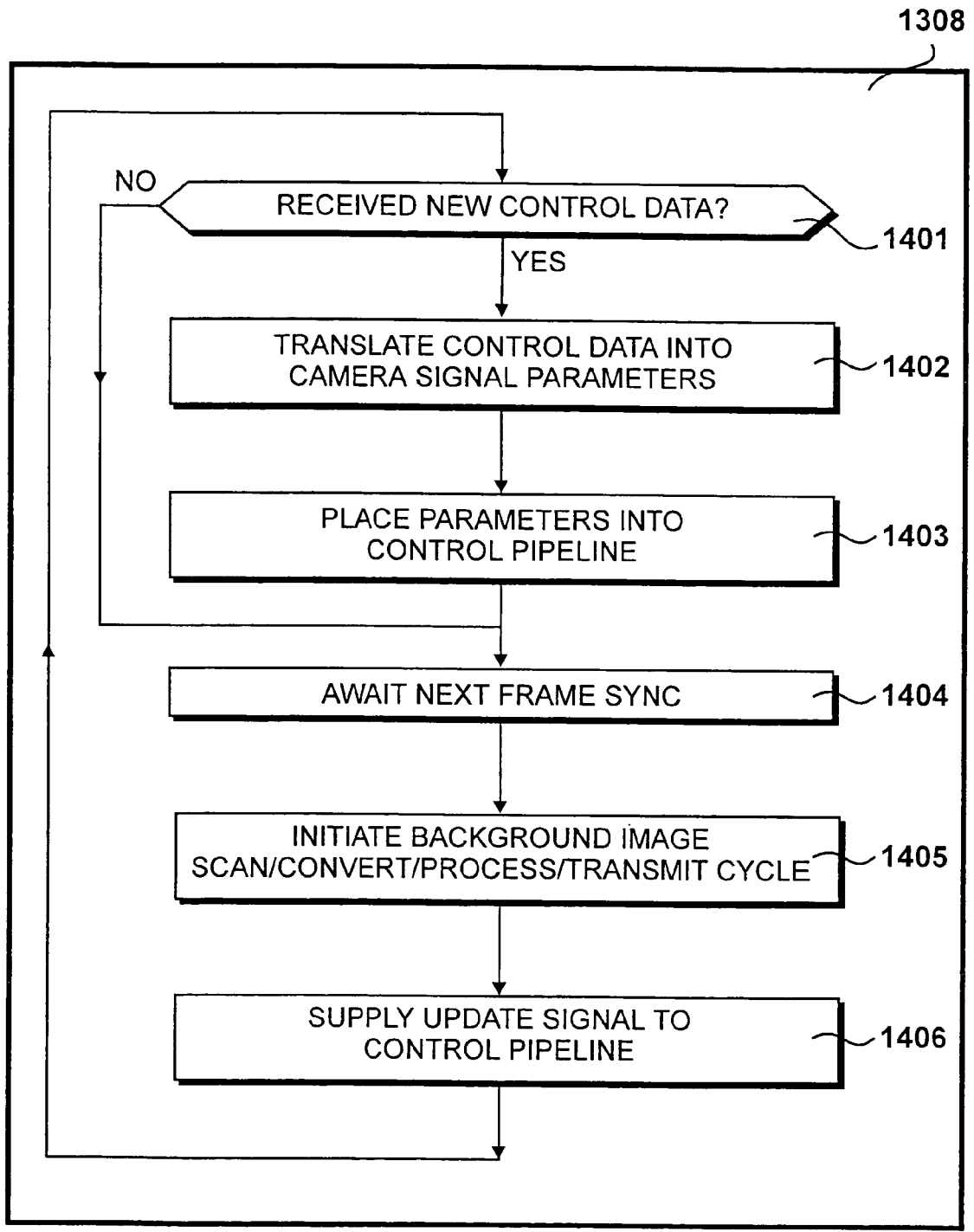
FIG. 14 details procedures performed by a microcontroller in FIG. 13.

Procedures performed by microcontroller 1307, following instructions read from EEPROM device 1308, so as to interface with analyser 1107 are shown in FIG. 14. At step 1401 a question is asked as to whether new control data has been received from the video capture process 1101. If no new control data has been received, the procedures jump to step 1404, to await the next frame synchronisation signal. Alternatively, if new control data has been received the question asked at step 1401 is answered in the affirmative, resulting in control being directed to step 1402.

At step 1402 received control data representing desired levels of brightness and/or contrast are translated into camera control parameters suitable for application to the digital to analogue converter 1309.

At step 1403 the control parameters are placed into a control pipeline so as to ensure that any changes required take place during frame intervals and do not take place during the transmission of an actual frame.

At step 1404 the controller waits for the next frame-synchronisation signal, whereafter at step 1405 the next scan/convert/process/transmit cycle is initiated.

At step 1406 an update signal is supplied to the control pipeline, resulting in the digital to analogue converter 1309 generating a new pair of analogue outputs for the analogue pre-processing circuit 1303, thereby affecting all pixels of the next image frame.

FIG. 15

Figure 15:
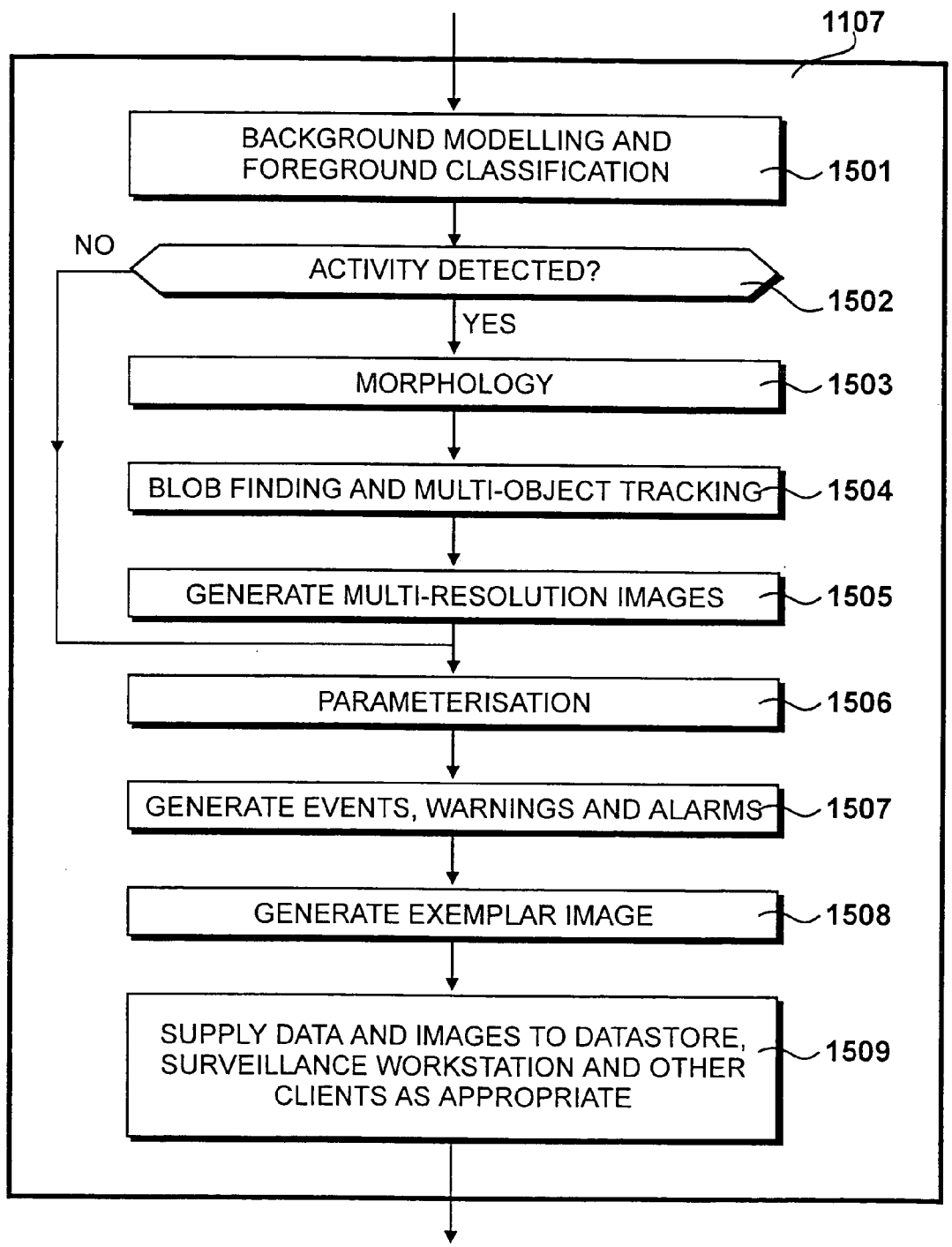
FIG. 15 details procedures implemented by analysing objects as shown in FIG. 11.

Procedures implemented by the analysing objects, such as object 1107 are detailed in FIG. 15. The analysis step 1202 identified in FIG. 12 is performed by several analysers operating in parallel.

At step 1501 background modelling and foreground classification is performed. Frames of input image data, arriving at 10 frames per second, have their individual pixels classified as being foreground or background. Reference to background is not identical to its use in, say, a compositing environment. Pixels identified as being in the "background" are derived from areas of the image where the received pixels are substantially equivalent to expected values. Thus, they are considered to represent portions of the image that have not changed. As used herein, foreground refers to areas of the image in which pixels have unexpected values, often caused by the movement of a person for example. Furthermore, an activity level is derived by measuring the proportion of pixels that have been classified as belonging to the foreground.

At step 1502 a question is asked as to whether activity has been detected; that is to say, whether the measured level of activity has exceeded a predetermined threshold. If the activity has not exceeded this threshold control is directed to step 1506, primarily to avoid making unnecessary use of the available processing facility.

If activity is detected at step 1502, morphology is performed at step 1503 so as to remove noise from the image and thereby facilitating a pixel classification process.

At step 1504 procedures are implemented in order to identify binary large objects (blobs) and multi-object tracking. Blobs are identified in each new frame and the movement of blobs from frame to frame is tracked which is often considered to be representing information likely to be of interest.

At step 1505 multi-resolution images (differing levels of compression) are generated in which foreground objects are encoded with low compression (to retain definition) whereas their background, being of less interest but also necessary in order to put the images in context, is encoded with higher levels of compression.

At step 1506 a parameterisation process is performed in order to calculate various parameters that result from the main analyser processing, possibly to provide feedback to the camera or to make other adjustments to the analysing processors themselves.

At step 1507 event data is generated including the creation of warnings and alarms. Each analyser 1107 to 1112 makes an assessment as to whether what it sees represents significant activity and possibly an event that is likely to be of interest.

Having detected activity and events that may be of interest, step 1508 generates an exemplar image that is subsequently stored and facilitates the identification of events of interest.

At step 1509 image data and other non-image data (such as alpha-numeric data) is supplied to the data store, monitoring workstation, the alarm manager and the video capture process.

FIG. 16

Figure 16:
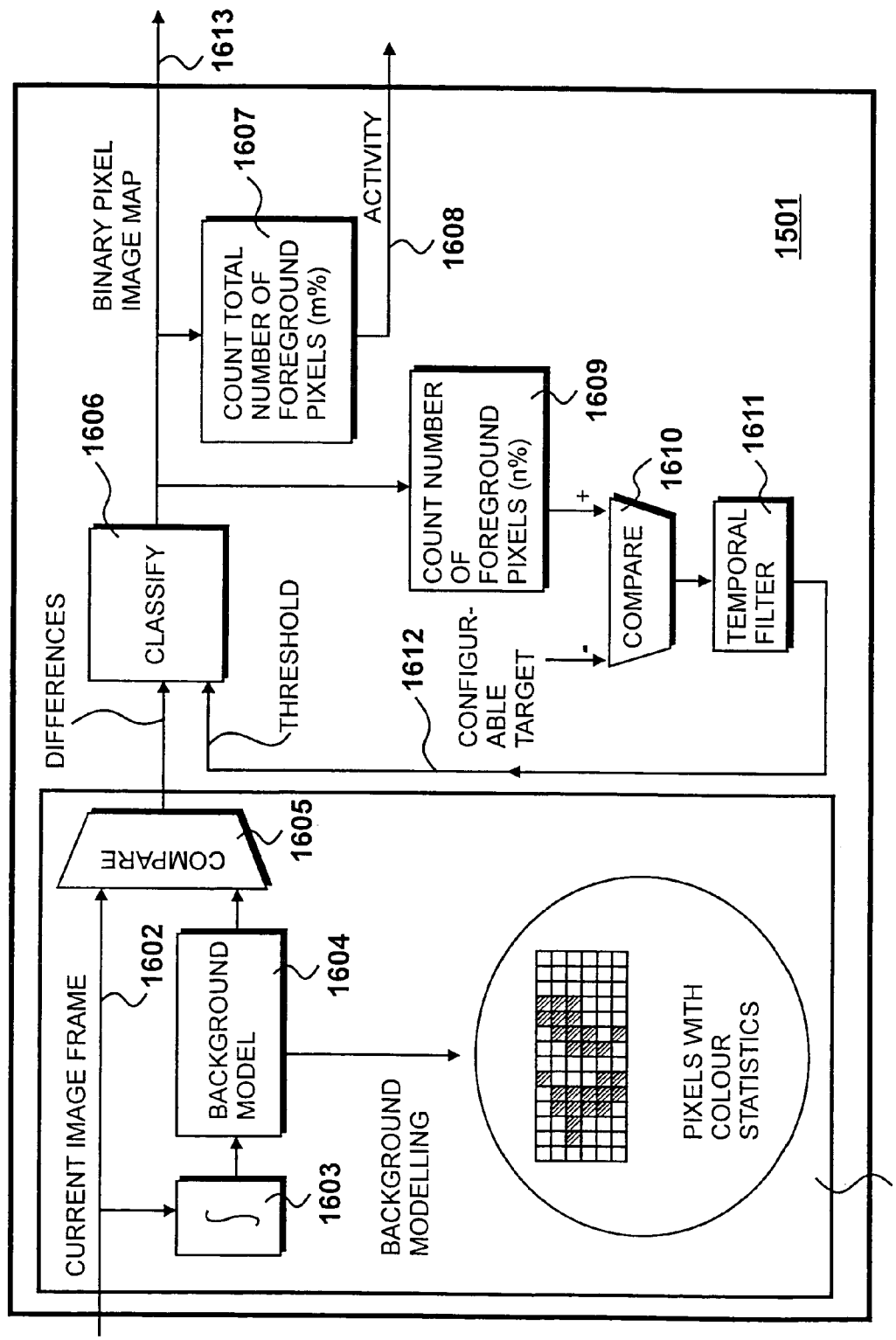
FIG. 16 shows a schematic representation of background modelling and foreground classification.

Procedures performed at step 1501 for background modelling and foreground classification are illustrated schematically in FIG. 16. In background modelling process 1601 a current image frame 1602 has been supplied to an integrating process 1603. The integrating process combines the current image frame with data from a large number of previous frames and updates a background model 1604. The background model 1604 includes a set of colour statistics for each pixel in the frame. Thus "background modelling" is also known as "background maintenance" and several sophisticated techniques have been developed to represent complex moving images (such as leaves and branches of trees) as part of a background model.

A comparison process 1605 compares the background model 1604 with the current image frame 1602 and generates a difference value for each pixel. The difference value for a pixel is in the range of zero to one and if the difference is large there is a higher probability that the pixel should be classified as belonging to the foreground, as previously described. Thus, a signal in the range of zero to one must be compared against a threshold value to determine whether (when the level exceeds this threshold) the pixel value should be classified as foreground. However, analysis has shown that it is preferable to adjust this threshold value in response to various phenomena, including systemic noise and global lighting variation.

It is known that providing a fixed threshold value produces results that are far from optimum. However, effecting procedures to adjust the threshold value automatically requires complex techniques. Thus, such known methods as histogram co-ordinate cornering and median statistics etc require an expensive processing overhead while producing results that tend to fall below theoretical optimums.

A classifier 1606 performs classification to determine whether a pixel belongs to the foreground or to the background. The output of the classifier 1606 is a binary pixel image map where each pixel has a value of either one or zero depending upon whether it is considered to be foreground or background respectively. Foreground pixels contain activity and the level of activity in an image is quantified by an activity measuring process 1607. The total number of foreground pixels is counted and this is expressed as a proportion of the total number of pixels in the image. This value 1608 is supplied to several subsequent stages of analyser processing and is also used in the monitoring workstation.

The output of the classifier 1606 is also used as an input to the noise measuring process 1609 in which the number of isolated foreground pixels is counted and then expressed as a percentage of the total number of background pixels. As previously stated, an isolated foreground pixel will tend to have been produced due to noise present within the camera circuitry, typically from the image array, the analogue pre-processing circuit or the analogue to digital converter.

The noise comparison process 1610 compares the proportion of isolated foreground pixels with a configurable target value of around 0.2%. If the proportion of isolated foreground pixels (due to noise) is below this target, the comparison process generates a negative output, thus lowering the threshold supplied to the classification process 1606. This results in a probable increase in the number of isolated foreground pixels when the next image frame is processed. If, alternatively, the proportion of isolated foreground pixels is higher than the configured target (around 0.2%) the threshold is increased, thereby reducing the number of isolated foreground pixels that are found in the next frame.

A filter 1611 provides strong low-pass filtering of the threshold value when the output of the comparison process fluctuates wildly. Preferably, the filter characteristic changes over time (it has a temporal characteristic) and a Kalman type filter may be adopted. Once the process converges to a stable value, the filter 1611 registers an increase in confidence in its input and reduces the level of filtering appropriately. The output of filter 1612 is used as the input to the classifier 1606. Thus, the threshold value supplied to the classifier 1606 is derived via a degree of adaptive filtering. This results in an improved foreground/background classification frame 1613 which is in turn supplied as an input to subsequent analysis processing.

FIG. 17

Figure 17:
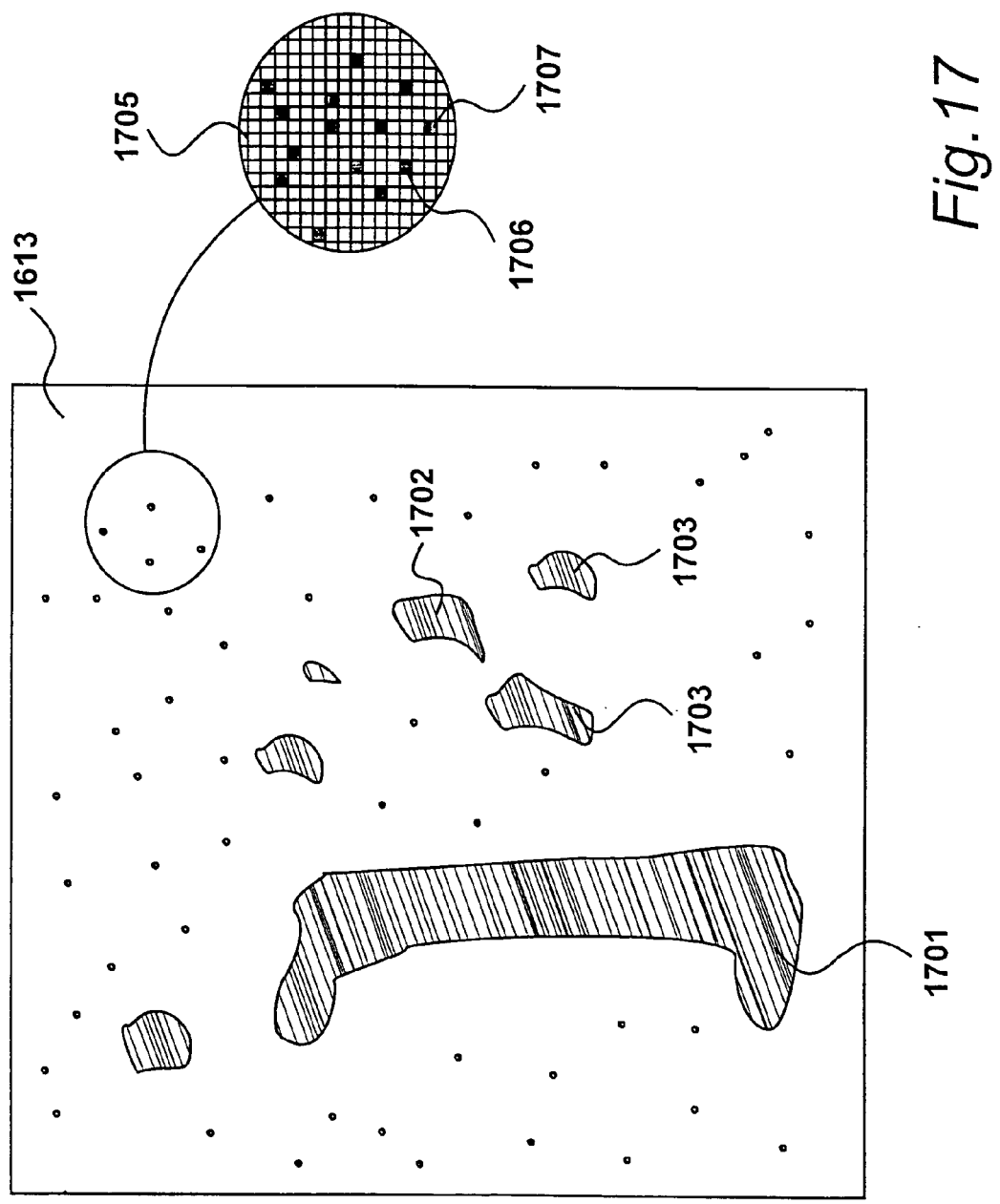
FIG. 17 shows the effect of the threshold for foreground/background classification being set too low.

The effect of threshold value 1612 being too low is illustrated in FIG. 17. A binary pixel image map 1613 is shown, in which a main foreground image 1701 bleeds outwards from the moving shape it is supposed to encompass. In addition, other regions 1702, 1703 and 1704 are incorrectly classified as foreground, possibly generated due to the presence of shadows or other lighting effects.

A background area is highlighted at 1705. As can be seen, this background area shows a high proportion of isolated foreground pixels, such as pixels 1706 and 1707.

FIG. 18

Figure 18:
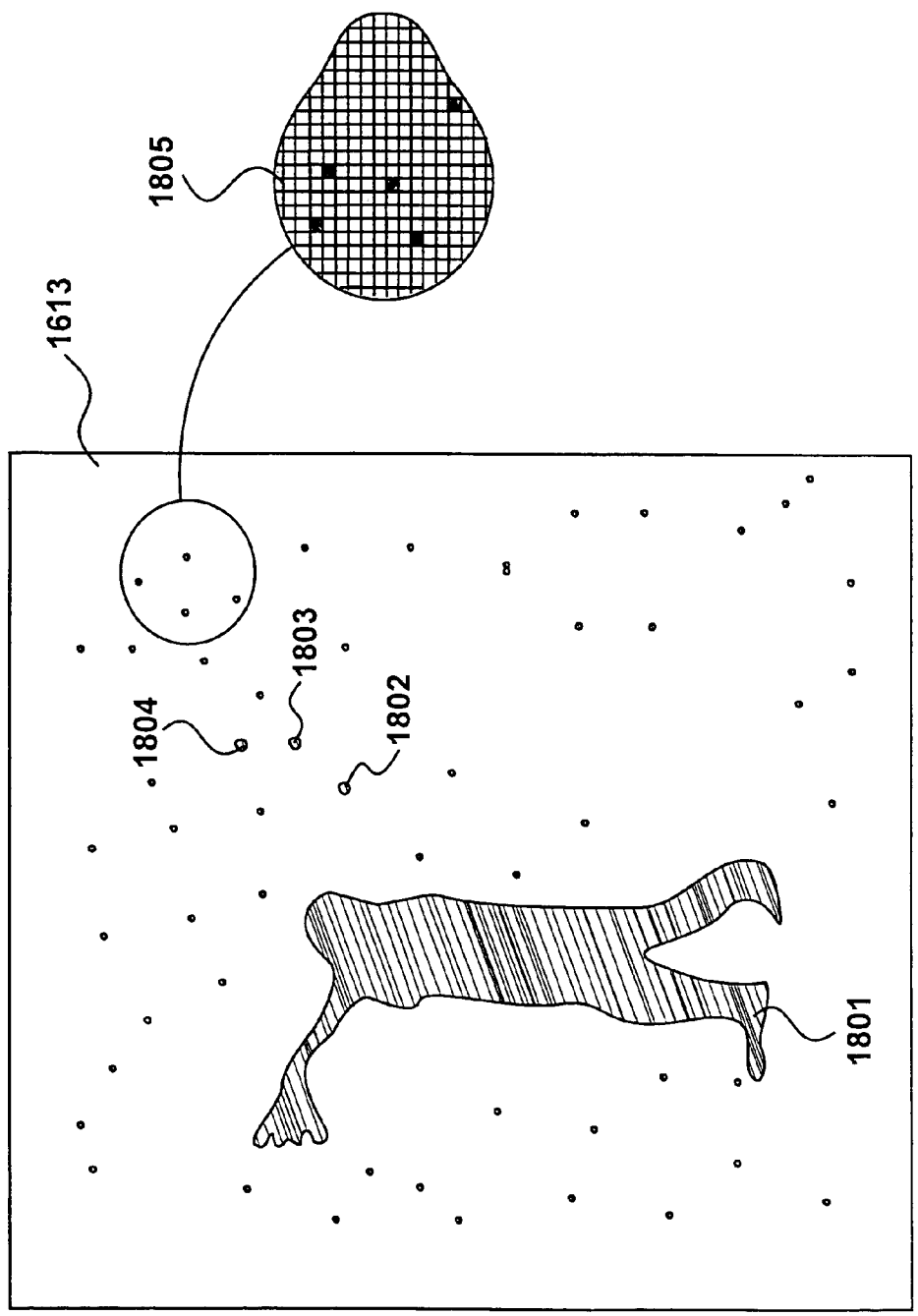
FIG. 18 shows the effect of the threshold for foreground/background classification being well adjusted.

Contrasting with FIG. 17, the effects of a well-adjusted threshold are illustrated in FIG. 18. In this example, a main foreground region 1801 provides a good representation of the moving object (the vandal attempting to damage the painting) viewed by camera 417. Although some incorrectly classified regions still exist, such as regions 1802, 1803 and 1804, these are much smaller in size and can therefore be dealt with by subsequent processing measures as described with respect to FIG. 19. Furthermore, a highlight 1805 on the background shows a much smaller proportion of isolated foreground pixels.

FIG. 19

Figure 19:
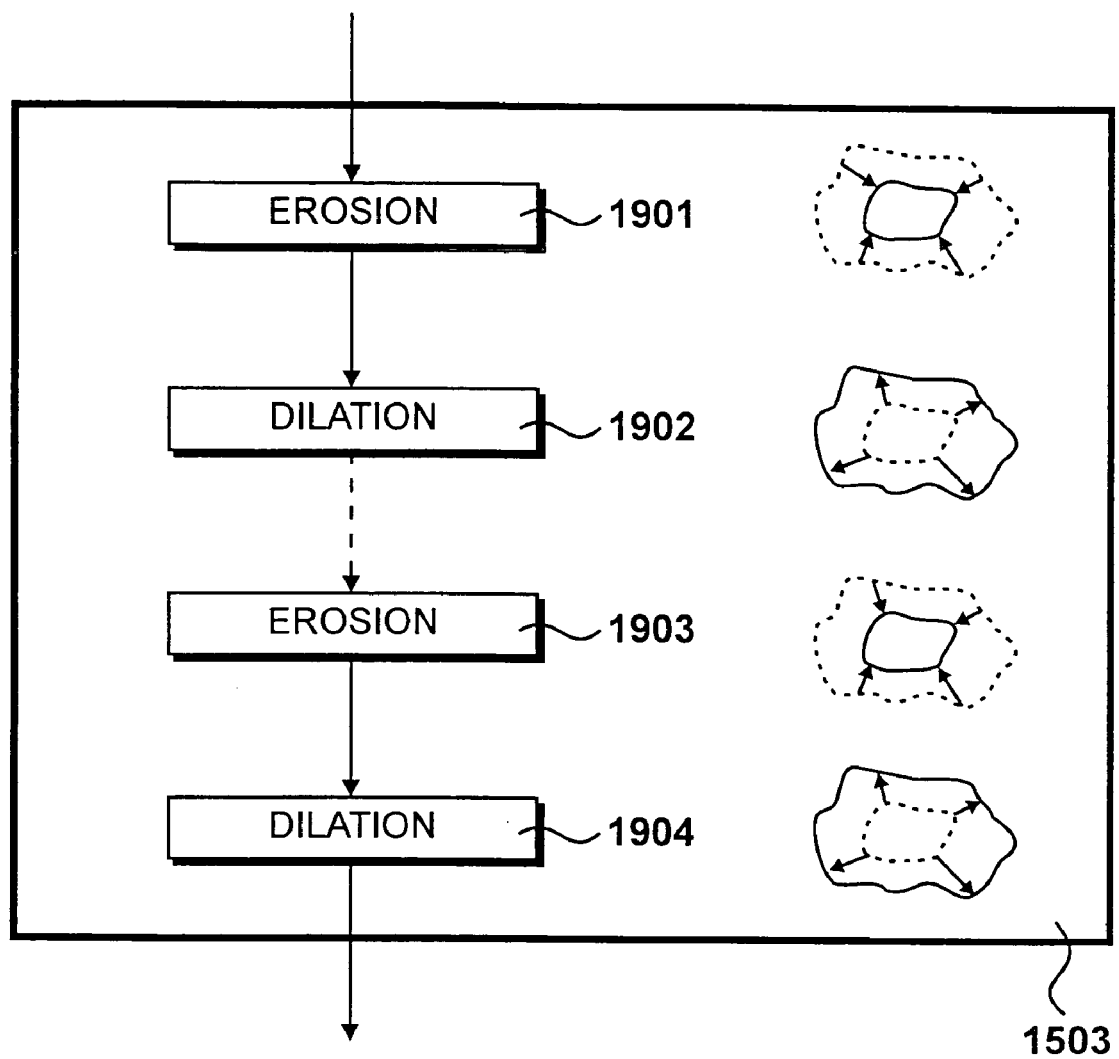
FIG. 19 details morphology processes.

Morphology processes identified at step 1503 are detailed in FIG. 19. Morphology is carried out in order to remove noise from the binary pixel image map 1613.

Morphology identifies groups of adjacent foreground pixels and performs operations upon them. The two most important operations performed upon the foreground pixels are those of erosion and dilation. These steps are performed repeatedly in an open technique to remove noise from an image. During erosion, step 1901, the outline of a group of foreground pixels is shrunk by a selected number of pixels, typically five. This is followed by process 1902 of dilation. During the dilation process, the former process is reversed; thus, pixels are added to the outer boundary of the foreground object. The effects of repeating these processes of erosion and dilation is to erode and then restore large group of foreground pixels but to shrink small groups of foreground pixels down to nothing such that, on the next stage, there is nothing to be restored by the dilation process. Thus, erosion and dilation continue at steps 1903 and 1904 for a pre-determined number of cycles.

In addition to removing isolated noise pixels, the processes of erosion and dilation will also have the effect of smoothing the outline of the foreground shape. Thus, isolated foreground pixels 1805 and the small foreground regions 1802, 1803 and 1804 shown in FIG. 4 are removed by morphology processing as illustrated in FIG. 20.

FIG. 20

Figure 20:
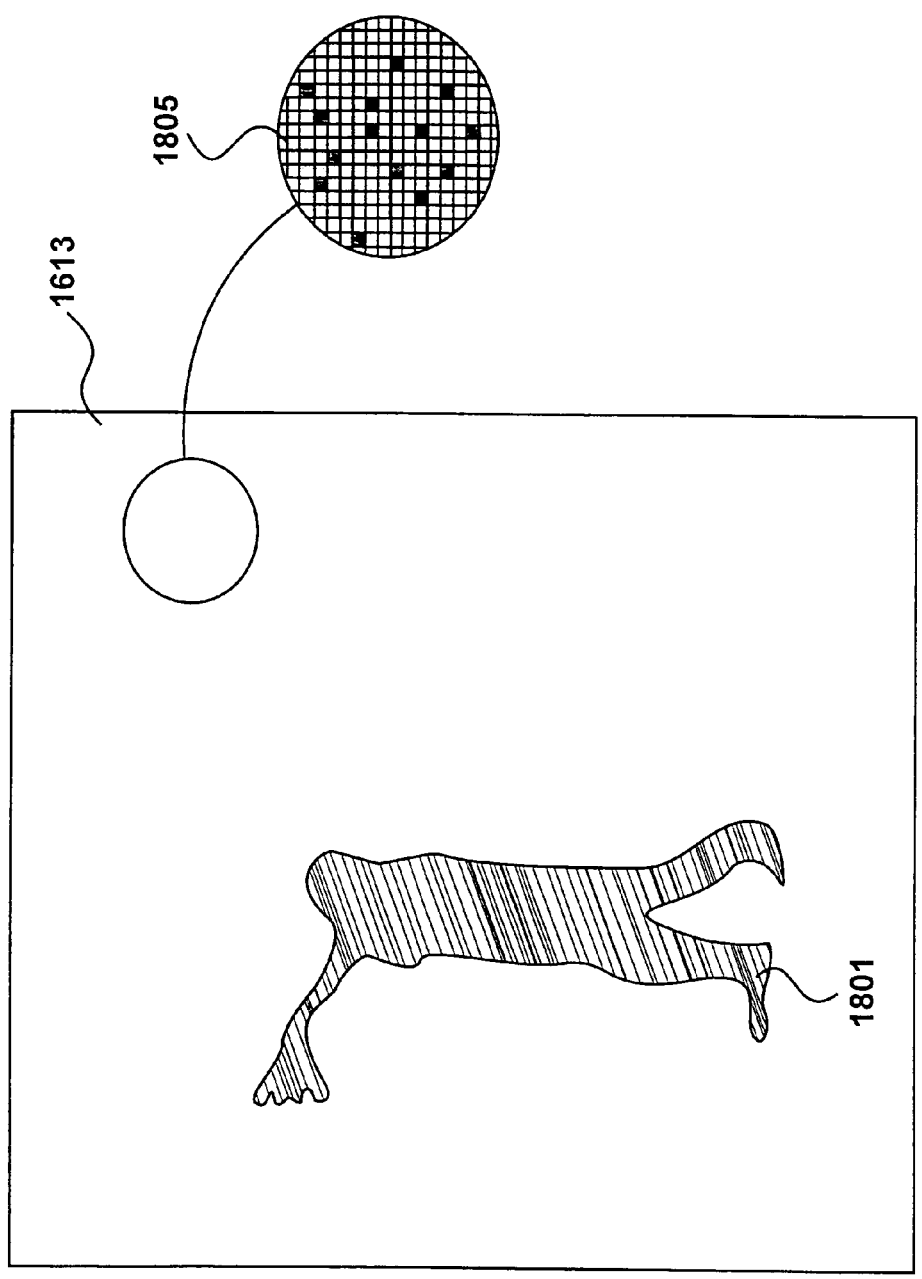
FIG. 20 shows the result of the morphology process shown in FIG. 19.

As stated above, FIG. 20 shows the results of performing the background modelling process to distinguish foreground pixels from background pixels, classifying the foreground pixels so as to produce a binary pixel image map and then performing morphology in order to remove noise components from the binary pixel image map.

A further morphology technique is known as a close, in which a dilation is followed by an erosion. This technique is deployed to close up gaps in objects. Changing the size of these techniques can also be used to good effect. Thus, in a preferred embodiment an "open small" technique is applied to remove noise. This is followed by a "close medium" technique to remove gaps. This is then followed by an "open large" technique to remove spurious small objects.

FIG. 21

As described with reference to FIG. 15, step 1504 consists of finding and identifying connected foreground pixels and then performing operations to track the position of these connected pixels on a frame by frame basis.

Clearly defined groups of foreground pixels are recorded in memory region 1013 of FIG. 10. An object of this type may include definitions of its centroid, defined by Cartesian co-ordinates and a bounding box in a way that is useful in subsequent processing operations. In order to track a plurality of objects (multi-object tracking) it is desirable to resolve ambiguity and match objects to observations. An object previously recognised may become unmatched because no relevant detection has been made in the next frame. Similarly a new observation may become unmatched if nothing in the preceding frame matches it. Thus tracks are established that are derived from a model of expected behaviour, which is updated from observation. In this way objects may continue to be tracked even when observations do not support their existence, such as when two objects overlap (in three space) which will be perceived as a collision in two space.

Figure 21:
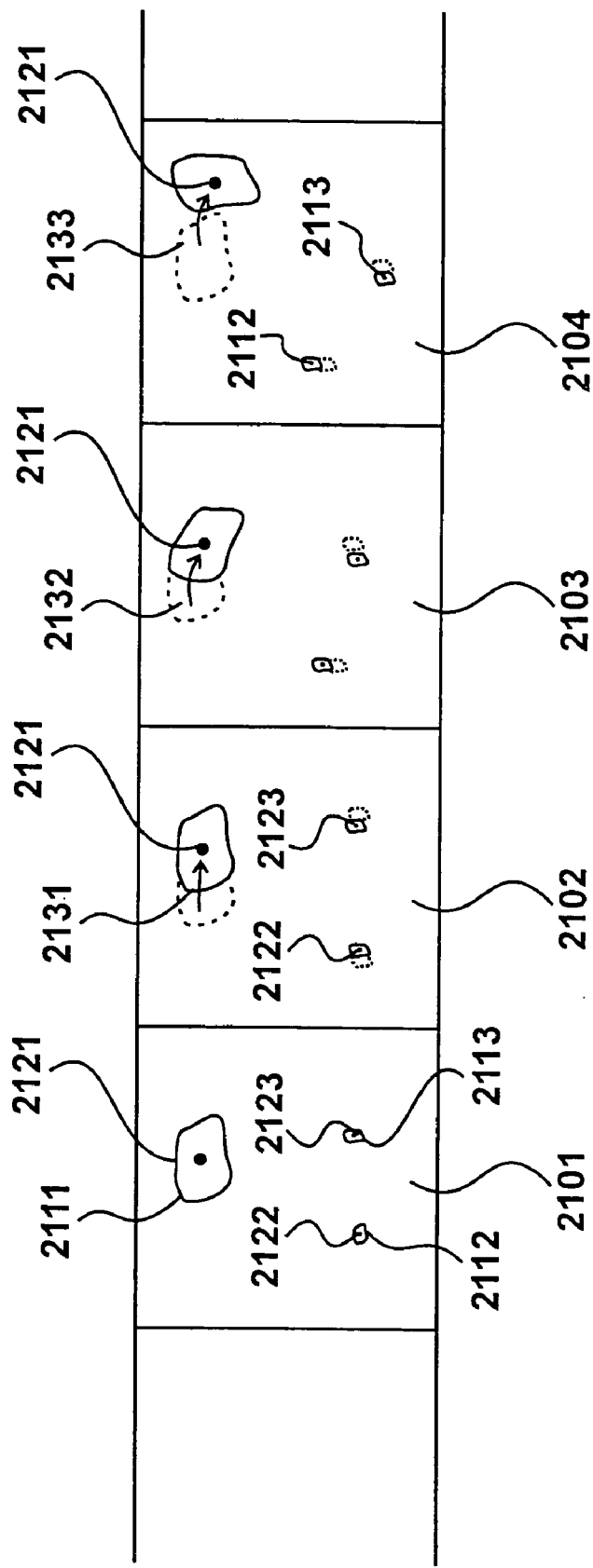
FIG. 21 shows several binary large objects being tracked in the same frame.

Subsequent processing of these tracks may make assumptions such that, for example, small incremental movements are very likely to be generated by movement of a single object rather than the sudden appearance of a completely different object of a similar size and location. Thus, conditions of this type allow it to be possible to track several groups of connected foreground pixels in the same image, as illustrated in FIG. 21.

In many situations, the group of connected foreground pixels identified may be generated by the presence of people within a viewed scene. Thus, by tracking objects in this way, it is possible to track the position of a plurality of people as they move through an environment. This is particularly useful for counting the number of people entering and leaving a room and from these totals it is possible to derive a figure for the number of people in a room at any particular time. Thus, by ensuring that all doors etc are within the field of view of at least one digital monitoring camera it is possible to count the number of people that have entered the environment and then subsequently left the environment. To facilitate the process of identifying the movement of people into and out of an environment, the monitoring system is preferably configured with guard regions in images where a doorway exists. Consequently, any binary large object identified that may be considered as being person-sized moving across this guard region results in that person being counted. Furthermore, the direction of movement across the guard region may also provide information as to whether the person is moving into the environment or out of the environment.

The tracking of a group of connected foreground pixels may also be used to determine a number of significant parameters that identify unusual behaviour. One such type of unusual behaviour is referred to as "upstreaming" which may be expressed as walking the wrong way down a gangway where flow is expected to occur in a certain direction. Fast movements such as running may also be unusual in many environments and again this may be identified by calculating the velocity of the tracked group as it moves on a frame by frame basis.

FIG. 22

Figure 22:
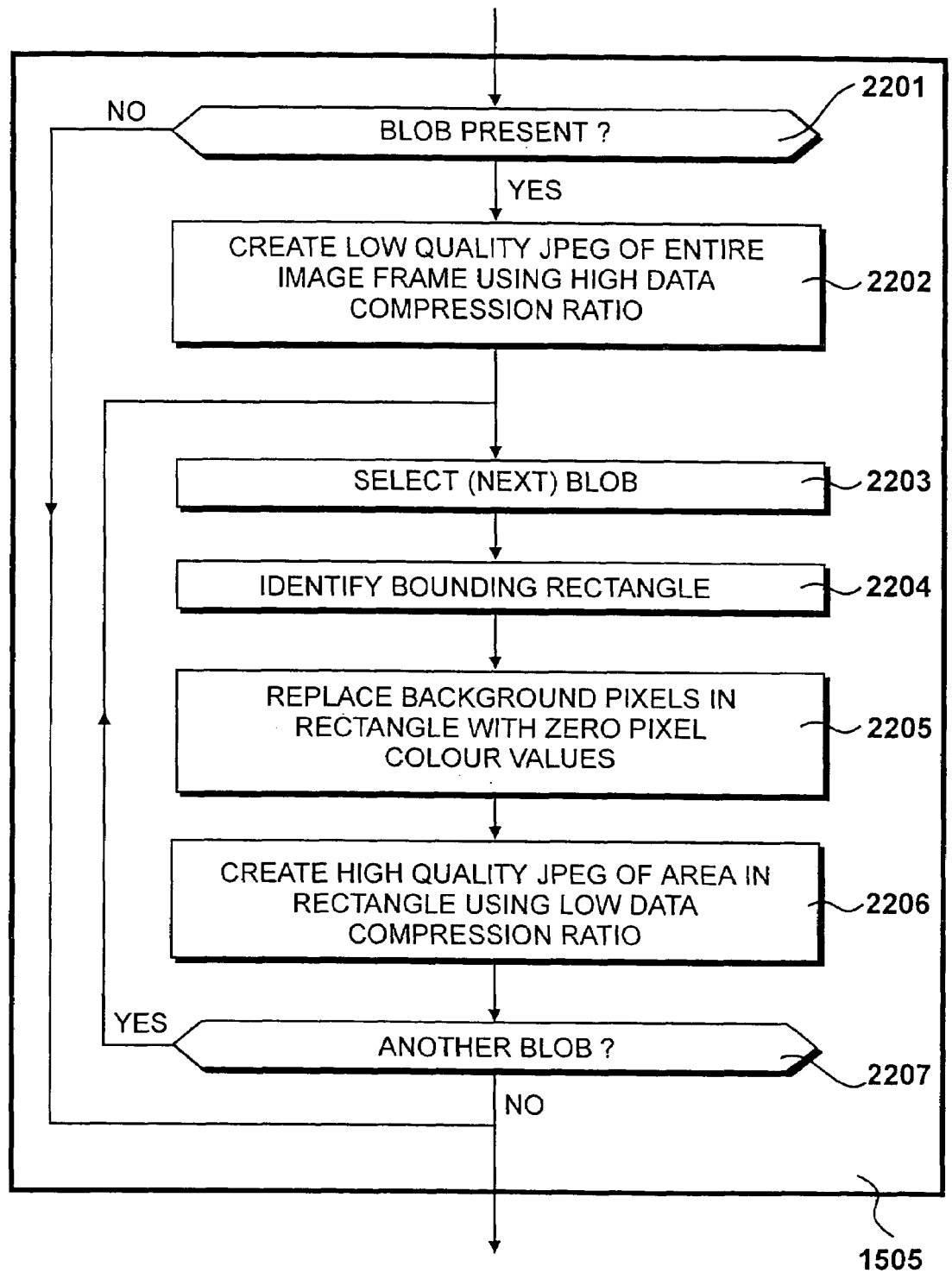
FIG. 22 details the generation of multi-resolution images.

Process 1505 for the generation of multi-resolution images is detailed in FIG. 22. At step 2201 the question is asked as to whether a binary large object is present and if this is answered in the negative no action is taken in order to generate multi-resolution images. In this way, the available processing resource is not wasted when there is nothing of interest being observed.

If an object is present and the question asked at step 2201 is answered in the affirmative a low quality compressed image of the entire image frame is created using a high data-compression ratio. In an embodiment, JPEG (Joint Picture Expert Group) compression is invoked although other compression types may be deployed where appropriate.

At step 2203 the first object is selected and at step 2204 a rectangle bounding the object identified at step 2203 is identified.

At step 2205 a distinction is made between foreground pixels in the bounding rectangle and background pixels within the bounding rectangle. Furthermore, background pixels in the bounding rectangle are set to zero value such that, if viewed, these background pixels would be seen as black.

At step 2206 high quality. image data of the area within the rectangle is created. Thus, the area of interest containing the object will have been generated to a high quality at step 2206. The remainder of the image, thereby placing the area of interest in context, will only have been recorded at low quality (high data compression) at step 2202. In this way, the total amount of data required to record the frame is minimised while at the same time the area of interest is retained at high spatial definition.

In an alternative embodiment, no background image is stored when activity is detected. A composite is then produced consisted of the detected foreground against a recently recorded background. Thus in order to implement this approach, it may be desirable to record empty background images on a regular basis. Thus the foreground activity could be composited against a low quality contemporaneous background, or against a previously recorded temporal (multi-frame) or still background at low or high quality.

At step 2207 a question is asked as to whether another object is present and if answered in the affirmative the next object is selected at step 2203. Consequently, all of the objects present are processed as described above until the question asked at step 2207 is answered in the negative.

Complex images will tend not to result in the loop consisting of processes 2203 to 2206 being executed many times. When such conditions exist, such as that provided by a crowded room for example, it is likely that much of the crowded scene will be processed as a single object. Consequently, all areas where activity is occurring will tend to be recorded at high definition with the background areas being recorded at lower definition. Upon re-playing the recorded images from a data store the high quality foreground images are composited against the low quality background images. Each foreground image will be placed upon top of the background image, the latter being the lower quality recorded JPEG. After decoding the JPEG images, the zero RGB pixels contained within the foreground are replaced by the background image pixels occupying similar positions. In this way, it is possible to combine pixel values of the foreground and the background without using a separate keying or alpha channel.

FIG. 23

Figure 23:
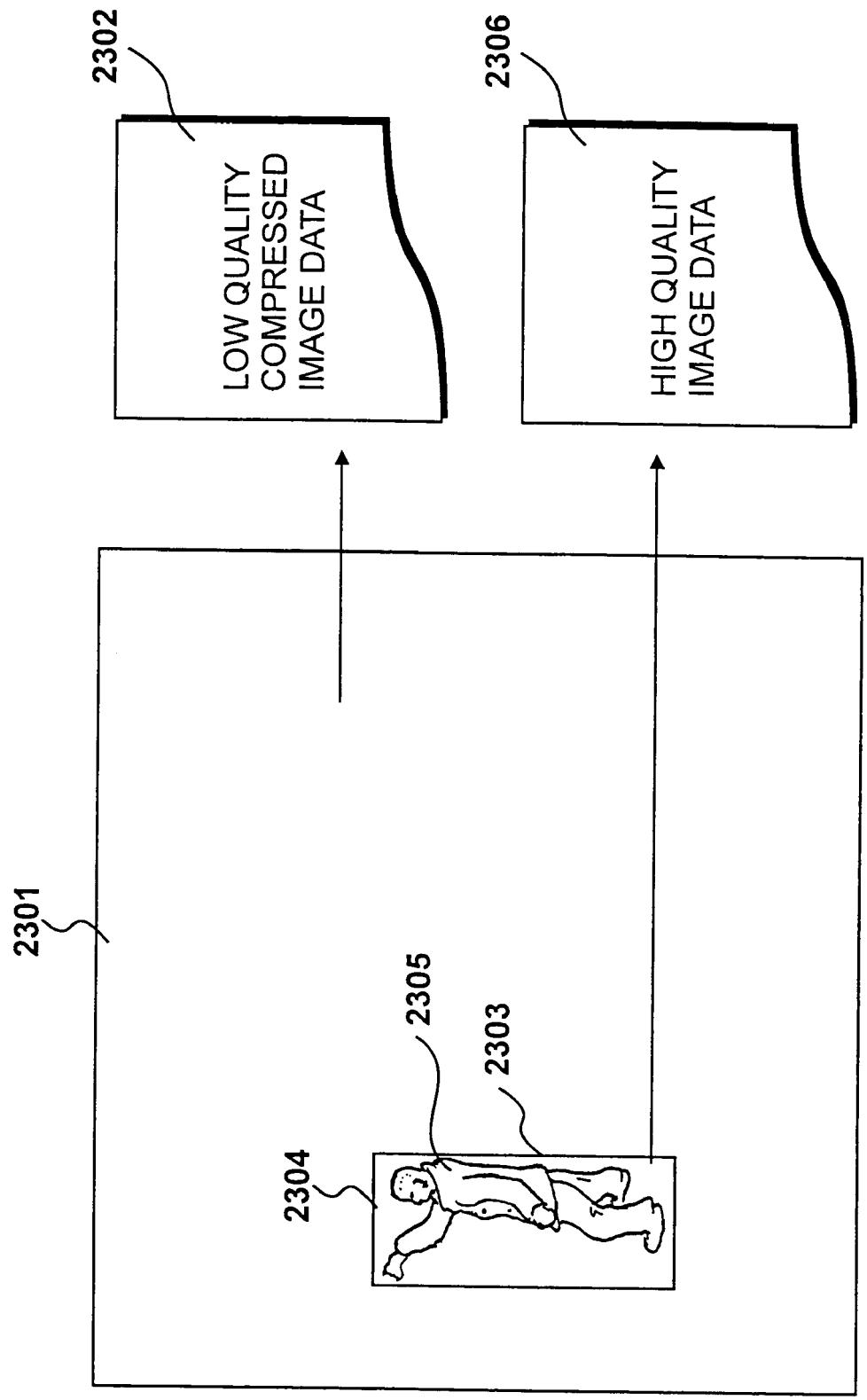
FIG. 23 shows an image with foreground stored at high quality and background at reduced quality.

An image frame 2301 in shown in FIG. 23 in which an object has been detected and high quality image data has been recorded.

An object has been detected due to the activities of the vandal as illustrated in FIG. 6. Following step 2202 low quality high JPEG compression image data for the whole frame is generated, shown schematically as 2302. At step 2204 a bounding rectangle 2303 has been placed around the object and at step 2205 background pixels in the rectangle 2304 are replaced with zero value pixels. Thereafter, at step 2206 a high quality (lightly compressed) image is created for all pixels within the rectangle 2303 (including those that have been set to zero) resulting in image data 2305 of the vandal being recorded at high quality as illustrated by high quality low JPEG compression image data 2306.

It can be appreciated from the illustration shown in FIG. 23 that the bounding rectangle 2303 represents a relatively small portion of the overall frame 2301. Consequently, it is possible for the image frame to be stored and remotely viewed, by being retrieved from the data store, without using unnecessary bandwidth.

In an alternative embodiment, only pixels in the area of a detected group are recorded at high definition, thereby reducing storage requirements further, where an appropriate compression technique, possibly using run length encoding, is adopted.

FIG. 24

As previously described, it is possible for a region of interest within a recorded frame to be stored at a higher spatial definition (with less compression) than the remaining background where very little of interest is occurring. It is also possible for the foreground group of pixels to be recorded at a higher frame rate than their associated background, given that most of the movement will be occurring in the foreground. It is therefore quite apparent that the background region is of little interest compared to the foreground area where the activity is occurring.

Conventional video recording cameras are known that include circuitry for enhancing the quality of images produced by the camera. In general, the camera will have automatic brightness and contrast controls so as to ensure that appropriate levels have been selected so as to give the best quality of picture overall. However, in accordance with the present embodiment, it has been appreciated that it would be preferable to adjust the camera controls in order to enhance the quality of regions of interest, such as region 2304, possibly at the expense of the background region. Consequently, in the preferred embodiment, the digital monitoring cameras do not include circuitry for making these modifications locally. In the preferred embodiment the input data signal is analysed to identify potential events of interest. Furthermore, upon detecting a potential event of interest, an output control signal is generated so as to modify a characteristic of the input data signal.

In the preferred embodiment, the digital monitoring cameras, such as camera 407, are physically connected to the processing environment via a network connection. However, logically, this network connection facilitates communication both of output video signals and of input control signals.

Figure 24:
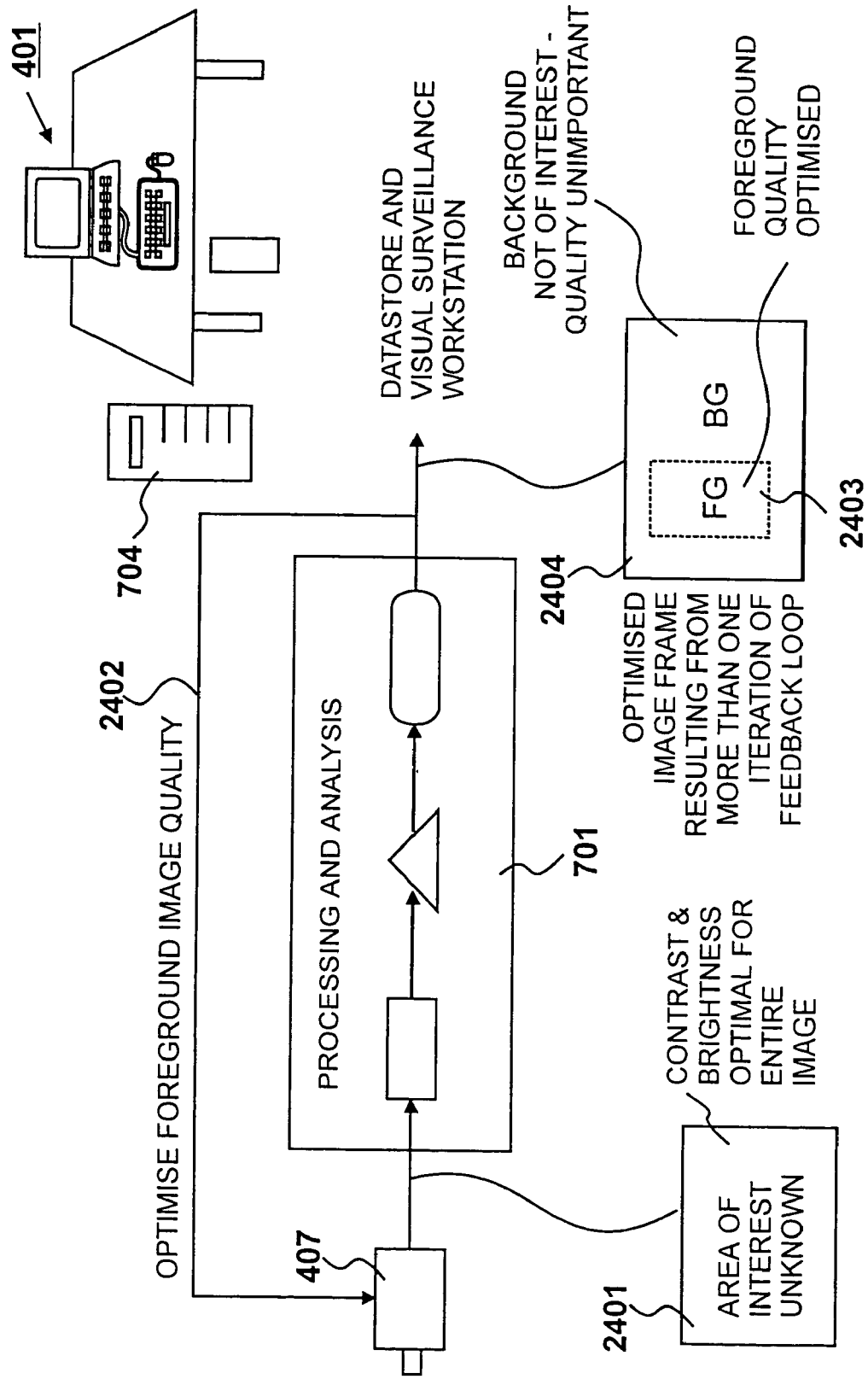
FIG. 24 shows a schematic representation of the optimisation of images for storage.

Referring to FIG. 24, the camera 407 will initially view an area in a condition where it is unknown as to whether an area of interest exists. Consequently, as illustrated by 2401 contrast and brightness settings for the camera are adjusted so as to provide an output video signal that is optimal for the entire image.

As previously described, the output video signal from camera 407 is processed by processor 701 such that the analysis and activities result in the determination being made as to whether a potential area of interest exists. If such an area is identified, it is possible to provide a feedback signal 2402 to the camera 407 so as to improve the contrast and brightness levels not for the image as a whole but for the particular area that has been identified as being of potential interest.

Considering the techniques that have previously been described, it can be appreciated that, having optimised the response of camera 407, the subsequent processing techniques will provide further enhancement of the area of potential interest; such that foreground area 2403 is recorded at enhanced quality at the expense of a background area 2404. In this way, images of improved quality are recorded on the data store 704 and are made available to the observing workstation 401.

FIG. 25

Figure 25:
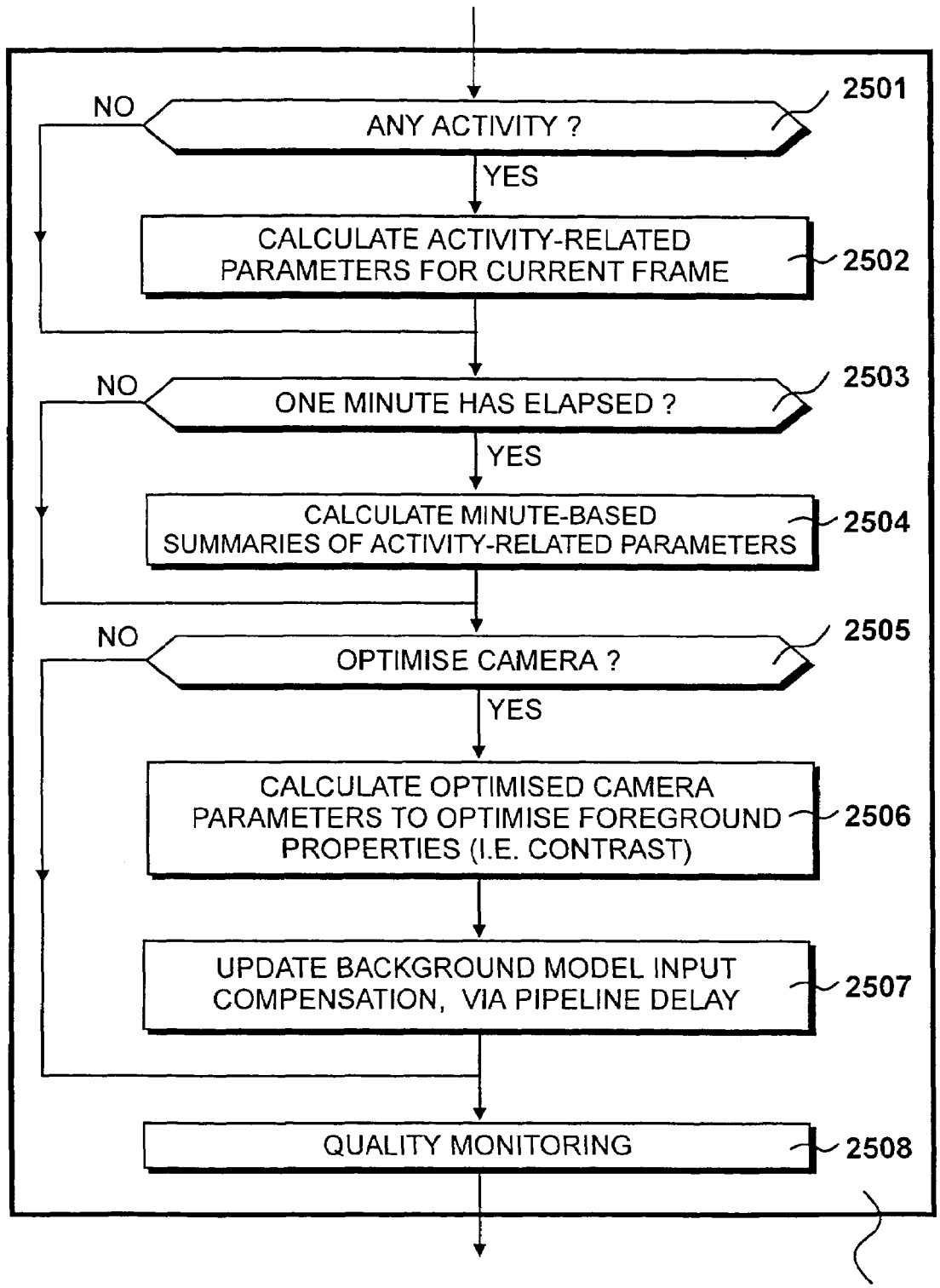
FIG. 25 shows the automatic generation of parameters.

Process 1506 for the automatic generation of parameters is detailed in FIG. 25. Parameters relating to aspects of identified activity are generated when activity is detected. Consequently, a question is asked at step 2501 as to whether there is any activity and if this question is answered in the affirmative, activity-related parameters for the current frame are calculated at step 2502. If the question asked at step 2501 is answered in the negative, step 2502 is bypassed.

After one minute of time has elapsed the question asked at 2503 is answered in the affirmative resulting in minute-based summaries being calculated of activity related parameters at step 2504. Thus, step 2504 results in one-minute summaries being generated for each of the parameters considered at step 2502.

At step 2505 a question is asked as to whether camera optimisation is required. If answered in the affirmative, camera parameters are calculated at step 2506 to enhance foreground properties. Thereafter, at step 2507 the background model input compensation data is updated via the pipeline delay. Step 2507 is required because if changes continue to be made to the contrast and brightness at the camera, the background modelling process needs to be compensated. Based upon the modifications required at the camera, it is possible to perform a division followed by a subtraction on all pixel values before they enter the background modelling process. It is then possible for the foreground/background classification to continue working as normal, with the image data in the areas of interest being enhanced. Given that pipeline delays exist, it is necessary to equalise these delays so as to ensure that only frames affected by the new camera brightness and/or contrast settings get compensated on their way to contribute towards the background model.

After step 2507, following a response to the question asked at step 2505 being answered in the negative, quality monitoring is performed at step 2508. In particular, information obtained as a result of analyser processing is used to identify the quality and/or performance of the individual digital monitoring cameras.

FIG. 26

Figure 26:
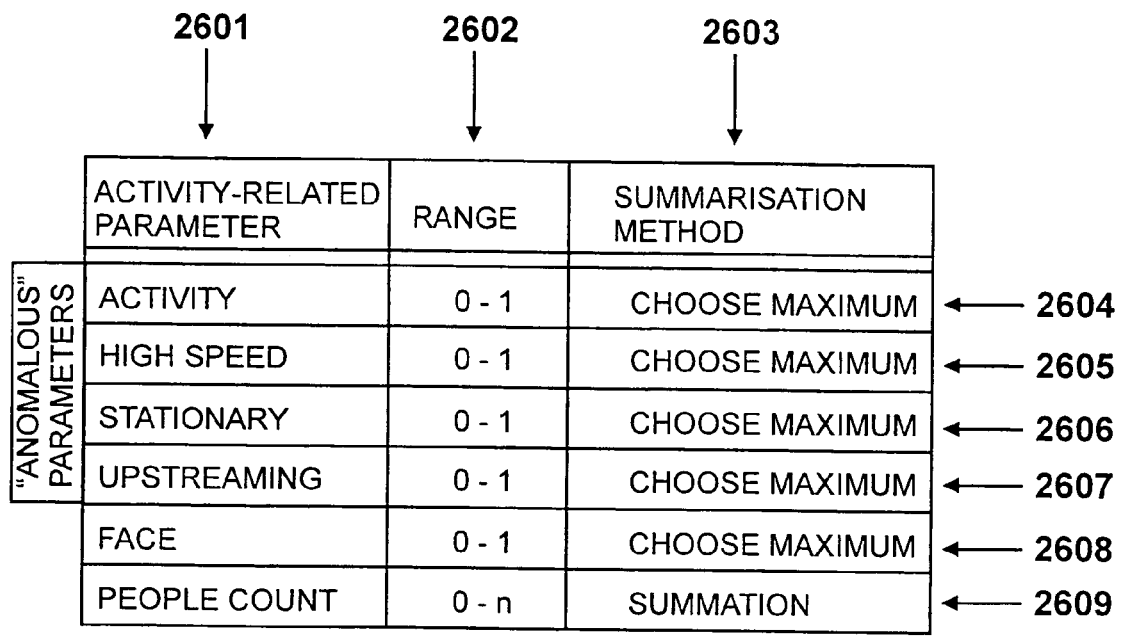
FIG. 26 shows a summary of parameters generated as shown in FIG. 25.

A summary of the parameters calculated, at step 2502, are presented in tabular form in FIG. 26. In the table, parameters are defined in column 2601, a range of values are specified in column 2602 and the summarisation method is defined in column 2603.

In this example, the particular parameters of concern or activity 2604, high speed movement of an object 2605, the detection of stationary objects 2606, the detection of upstreaming 2607, the detection of a face 2608 and a people count 2609. Parameters 2604 to 2608 all have a continuous numerical range (as shown in column 2602) of zero to one and are summarised by choosing the maximum value from the data set. The face value is effectively logical and provides a measure as to whether a face has been detected or not. People count 2409 takes an integer value from zero upwards and it counts the number of people going past a pre-defined position, such as a doorway or an entrance. It is summarised by adding all of the data observations together.

FIG. 27

Figure 27:
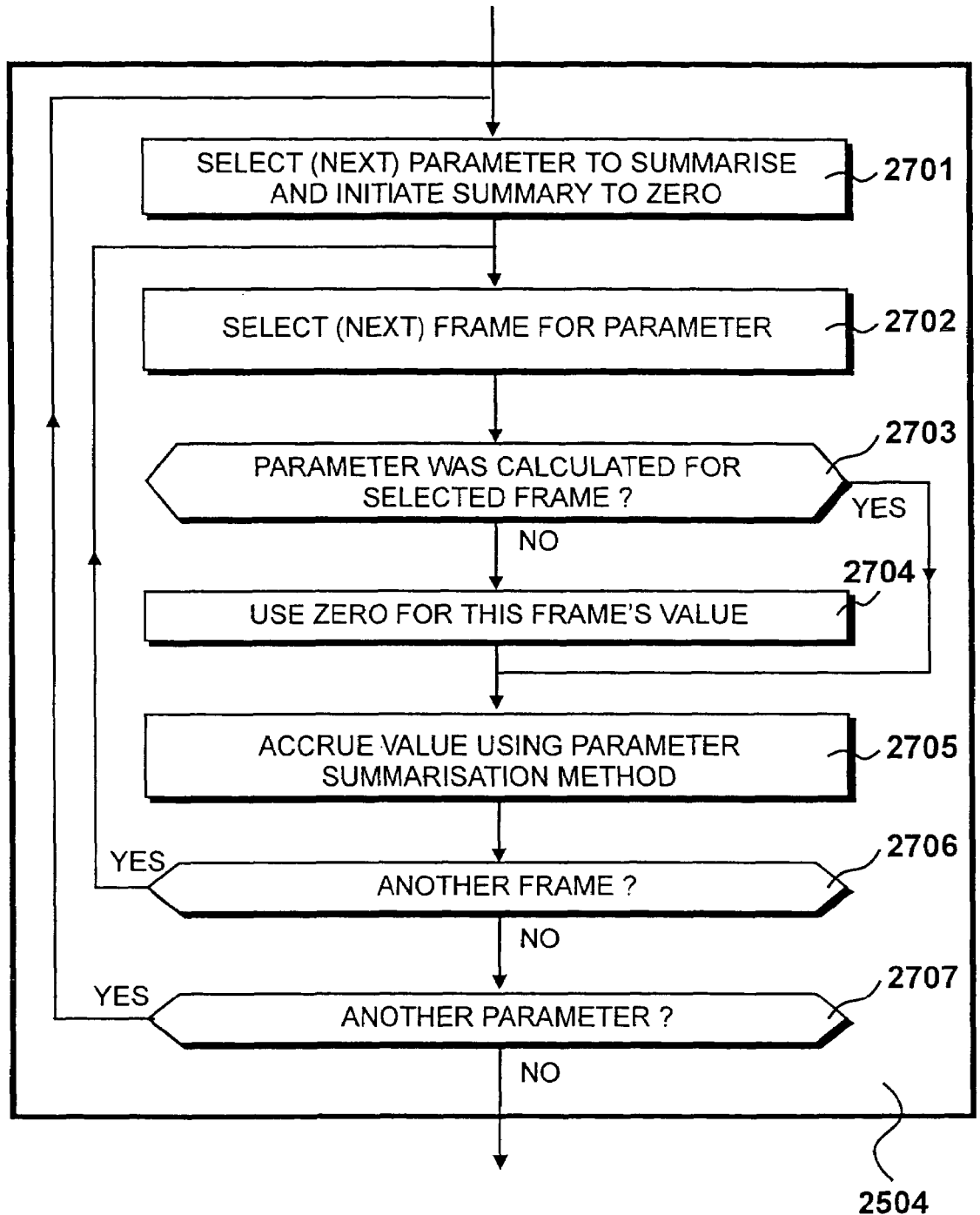
FIG. 27 details procedures for creating minute-based summaries as shown in FIG. 25.

Process 2504 for calculating minute-based summaries of activity related parameters detailed in FIG. 27. The procedure effectively takes each of the parameters shown in FIG. 26 and generates a summary for each minute during which activity is detected. In the preferred embodiment, data is generated at a rate of 10 frames per second and therefore a typical minute will consist of 600 frames, although this frame rate may be modified, possibly under automatic control, in response to data generated by the analyser.

At step 2701 the first parameter is selected to be summarised and therefore the value is initially set to zero.

At step 2702 the first frame is selected and at step 2703 a question is asked as to whether the parameter was calculated for the frame selected at step 2702.

If the question asked at step 2703 is answered in the negative, the zero value is entered for the frame's value at step 2704. Alternatively, if the question asked at step 2703 is answered in the affirmative, the value is accrued at step 2705 using the method specified in column 2603.

At step 2706 a question is asked as to whether another frame is to be considered and when answered in the affirmative control is returned to step 2702, where the next frame is selected, and so on until all of the frames have been considered.

When the question asked at step 2706 is answered in the negative, a question is asked at step 2707 as to whether another parameter is to be considered. Consequently, when answered in the affirmative, control is returned to step 2701 and the next parameter is selected. Thus, all of the frames are then considered for the next parameter and so on until all of the parameters have been considered and the question asked at step 2707 is answered in the negative.

FIG. 28

Figure 28:
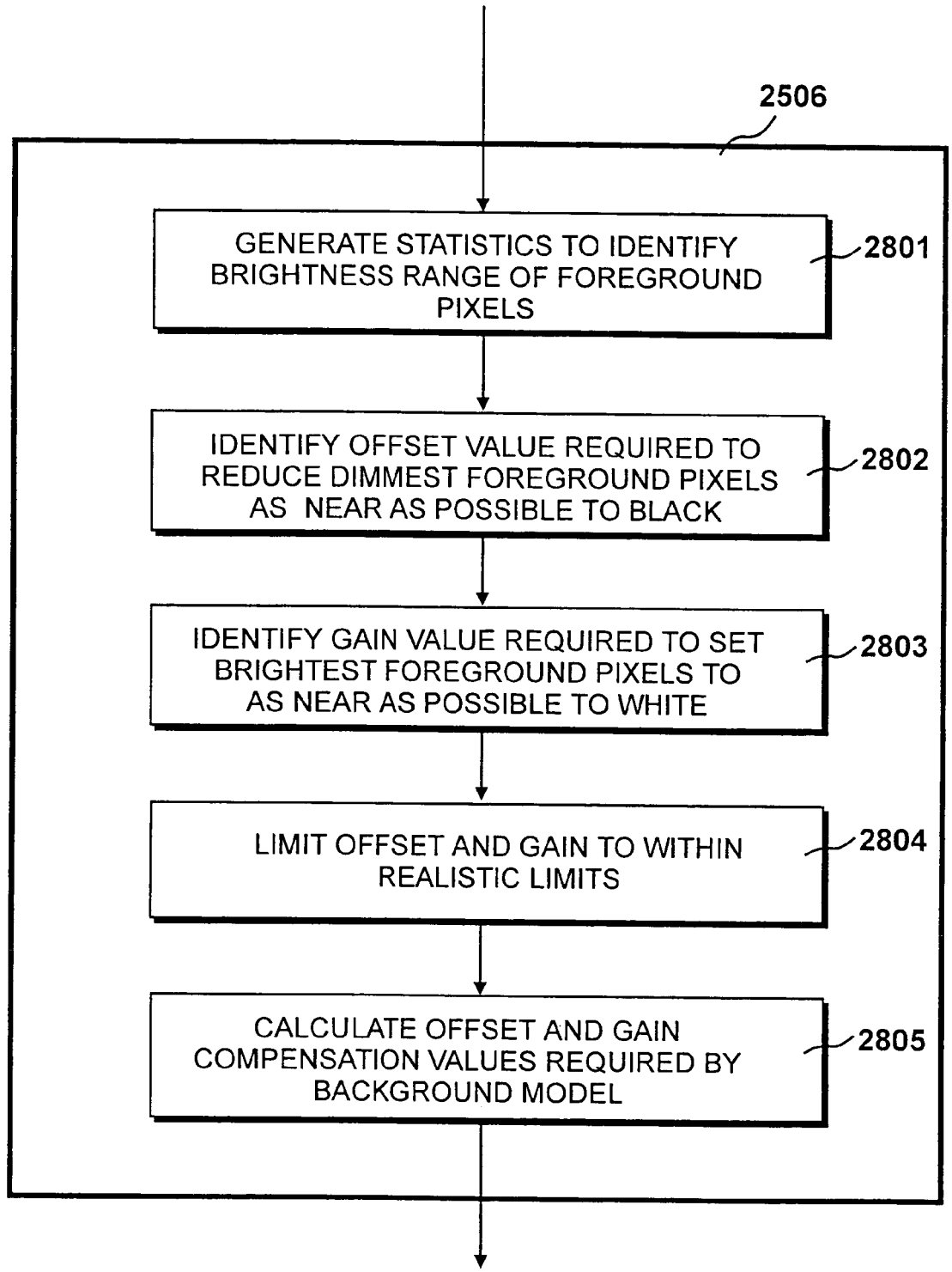
FIG. 28 details procedures for calculating optimised camera parameters as shown in FIG. 25.

Process 2506 for calculating enhanced camera parameters is detailed in FIG. 28. At step 2801 statistics are generated to identify the brightness range of the foreground pixels. At step 2802 an offset value is identified that is required to reduce the dimmest foreground pixel as near as possible to black. Thereafter, at step 2803 a gain value is identified which is required to set the brightness foreground pixels as near as possible to white; it is, however, appreciated that the image may already include white and that a degree of clipping may have occurred. Thus the combination of steps 2801 to 2803 concentrate on the region of pixels defining the detected object. Their purpose is to best modify the brightness and contrast of the identified pixels of the foreground image so as to enhance the visibility of this region of the image. Upon doing this, they are in a position to calculate the correction in terms of a gain and offset that, once applied to the camera in analogue form by circuit 1309, will result in image data of an improved quality, in terms of the level of visible detail (dynamic range) in the area of the object of potential interest.

It is appreciated that the values calculated by steps 2801 to 2803 may lie outside realistic limits therefore at step 2804 the values are considered so as to limit the offset gain values to within realistic limits.

At step 2805 corresponding offset and gain values are calculated as required for the background model so as to ensure that the background model calculation may carry on without seeing any significant change to the image as a whole.

FIG. 29

Step 2508 was identified in FIG. 25 as identifying the process of quality monitoring. Quality monitoring relates to the process of generating a servicing schedule for cameras used in the monitoring environment. Background images are analysed to produce a background model as previously described. It is then possible to process the background model in combination with new incoming data.

At step 2901 brightness and colour histograms for the background model are calculated. Thus, this results in a production of a histogram 2902 for brightness, a histogram 2903 for red, a histogram 2904 for green and a histogram 2905 for blue. Each histogram provides a probability density function that characterises the kind of data that is being captured.

Experimentation has shown that a dysfunctional camera, possibly due to dust on the lens for example, will result in a probability density function that peaks more than would be expected at a certain point. This suggests that pixels of the same value are being seen more frequently than normal and are therefore due to an artefact rather than captured image data. Other problems of this type also reveal themselves in probability density functions. Thus, for example, if a camera loses sensitivity with respect to a particular colour (red for example) the probability density function for red will become depressed and eventually will become a straight vertical line at zero. Similarly, large specks of foreign material present on the lens would also show up, as would numerous other sorts of problems associated with the processing circuit.

In order to provide something for the power density functions to be compared against, it is necessary to create and store histograms for a healthy camera, preferably shortly after a camera has been installed or serviced. Thus, at step 2906 the histograms produced at step 2901 are compared with the stored histograms. Thus, the histograms generated at step 2901 are derived from the background model 1601 that is effectively fed from a live camera, such as camera 407, for which a health check is to be performed. At step 2906 these histograms are compared with the stored histograms, effectively being similar to that produced when the camera was known to be healthy. Thus, the actual brightness histogram 2902 is compared against an ideal histogram for brightness 2907. The actual histogram for red 2903 is compared against an ideal histogram for red 2908. An actual histogram for green 2904 is compared against an ideal histogram for green 2909 and, similarly, the actual histogram for blue 2905 is compared against the ideal health histogram for blue 2910.

At step 2911 a camera health value between zero and one is quantified. This is achieved by combining the results of the linear correlations between the histogram pairs (2902/2907 etc) and taking the average. This provides a value between zero and one, where one would be obtained if the histograms of a live camera matched those of a healthy camera completely; with the value reducing below one as degradation takes place. In this sense, degradation should be understood to represent anything that results in quality reduction of the output image. Thus the degradation could be due to a misalignment of some sort, not necessarily due to camera ageing. Furthermore, other characteristics for detecting degradation could be used, such as defocus detection derived from performed edge detection upon observed objects.

A measurement of camera health provides an ingredient for measuring the overall system quality. Furthermore, camera health calculations also allow maintenance schedules to be defined such that maintenance and servicing is performed upon the cameras at optimal times, thereby ensuring that good-quality image capturing continues while at the same time reducing costs that would be incurred with unnecessary servicing activities. Similarly, it is possible to ensure that a plurality of cameras are serviced as part of a combined activity rather than having individual call out operations being performed that would be expensive. Thus, by maintaining the cameras on an ongoing basis, expensive one-off costs for repair and servicing are reduced.

In order to identify an optimised point in the future for servicing a camera, linear regression, linear extrapolation or other predicting techniques may be used to predict the future health of the camera related signals.

FIG. 30

Figure 30:
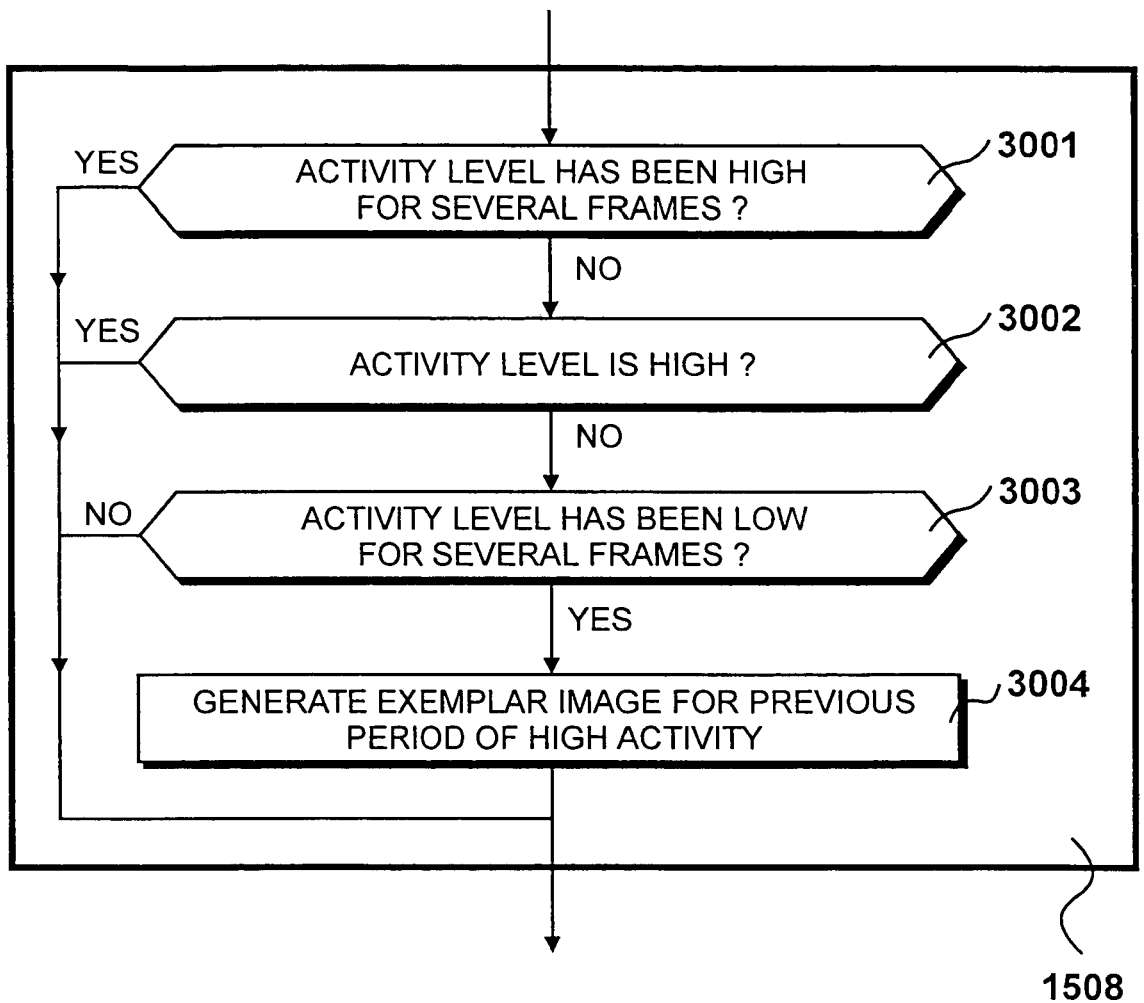
FIG. 30 details procedures for producing exemplar images as shown in FIG. 15.

Procedures 1508 for generating an exemplar image are detailed in FIG. 30. At step 3001 a question is asked as to whether there has been a high level of activity for several frames. If answered in the negative, a question is asked at step 3002 as to whether the activity level is presently high. If this is answered in the negative a question is asked at step 3003 as to whether the activity level has been low for several frames. If this question is answered in the affirmative an exemplar image for the previous period of high activity is generated at step 3004.

Each period of activity identified in this way is recorded uniquely. Thus, in this way, having generated an exemplar image for the period of activity, the system is effectively reset awaiting the next period of activity. Thus, the effect is to wait until a substantially continuous period of high activity has occurred, that is, a period of activity composed of a plurality of substantially consecutive images having a high level of activity is identified. If within this period a frame or two occur without activity these are effectively ignored. Likewise, if there is a single isolated frame of activity this is also ignored.

FIG. 31

Figure 31:
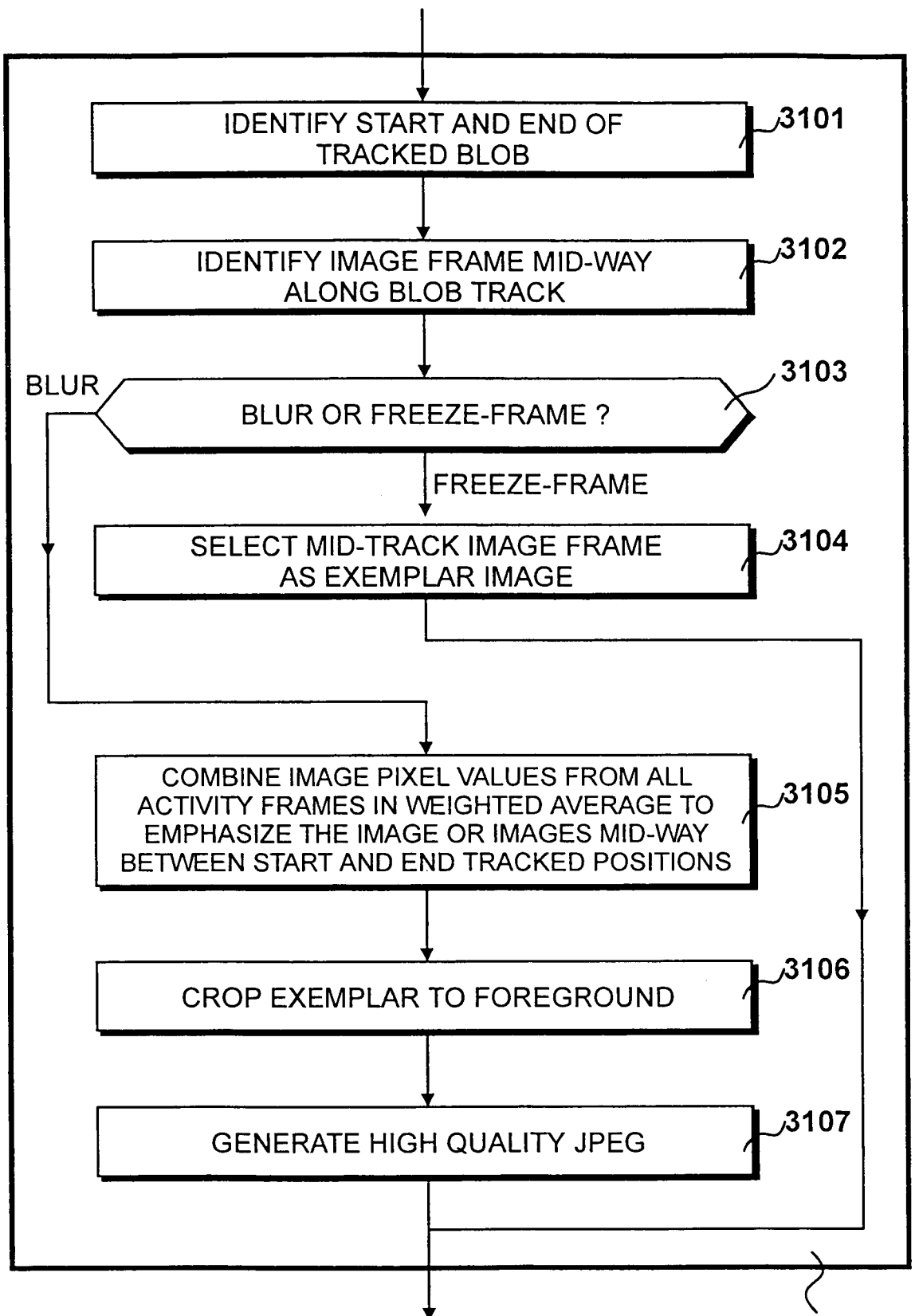
FIG. 31 details the generation of exemplar images as shown in FIG. 30.

Process 3004 for the generation of an exemplar image is detailed in FIG. 31. At step 3101 the start and end of an object track is identified. This represents a frame where the tracking process started and a frame where the tracking process ended, both of which may be considered as points in time.

At step 3102 the block or clip of frames recorded throughout the tracking process is considered. From this collection of frames, an image frame substantially half way along the collection may be identified. Alternatively, an image may be selected from the position of peak activity.

In terms of storing an exemplar image it is possible to select a single frame (a freeze frame) or it is possible to blur a plurality of selected frames. Consequently, at step 3103 a question is asked as to whether a blur or a freeze frame operation is to be selected. If freeze frame is selected the mid-track or peak image frame is selected as the exemplar image at step 3104.

Alternatively, if blur is selected at step 3103 image pixels from a plurality of images are combined, preferably with a weighted average, so as to emphasise the image or images that are substantially mid-way between the start and the end of the tracked positions, at step 3105.

At step 3106 the exemplar image frame is cropped so as to remove background pixels such that a rectangular box containing the foreground remains. Thereafter, at step 3107 a high quality compressed image (such as JPEG) is generated and stored as the exemplar image.

When a blurring operation is performed at step 3105 image pixels may be combined from all of the activity frames, in a weighted average, so as to emphasise the image or images mid-way between the start and end of the track positions. Other methods are possible for selecting an exemplar or the kernel image in the case of a blurring process for the generation of the exemplar. For example, it would be possible to find the single frame that has the most difference between the frames just before and just after the activity sequence.

When detecting activities of potential interest, a likely scenario is for a person to walk past a digital monitoring camera such that, at the start of the period of activity, only part of the person's body is in view. Similarly, at the end of the activity a similar position may exist to the effect that only part of the person's body is visible. Consequently, it is only around the middle of the activity that the person will tend to be fully in shot and this is why the exemplar image may be selected as described above. Experimentation has shown that many activities of interest exhibit a similar recordal signature, such as passing cars, criminal activities and disturbances of many types.

FIG. 32

The procedures described with respect to FIG. 31 allow a single image to be recorded during what should be the most important part of an activity. Thus, this results in a single snapshot frame that is an exemplar of the activity as a whole and may therefore be referred to as an activity snapshot.

Figure 32:
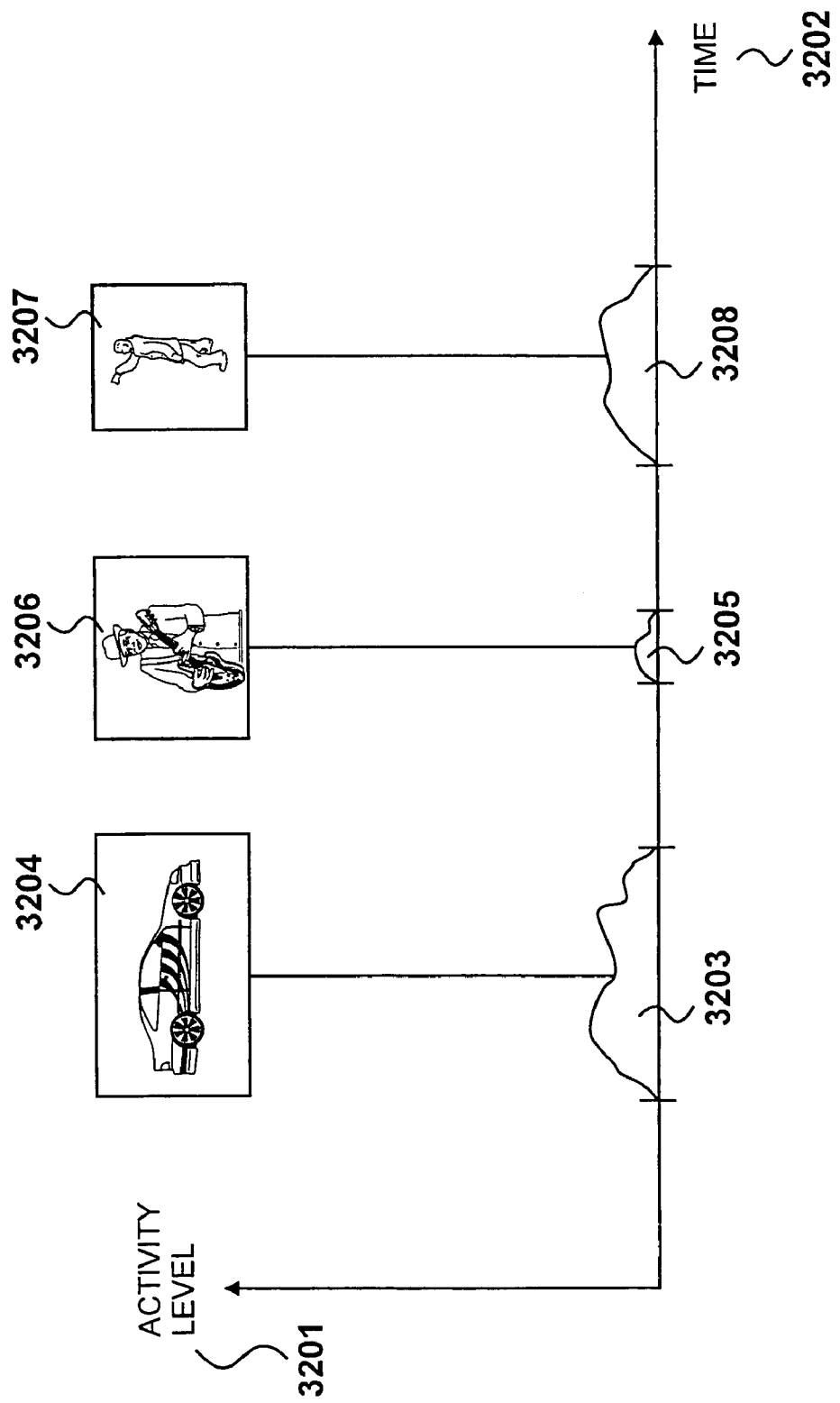
FIG. 32 shows a graph of activity against time in accordance with procedures shown in FIG. 31.

A graph is shown in FIG. 32 in which activity level 3201 is plotted against time 3202 for a plurality of cameras. A first camera has a period of activity 3203 resulting in a snapshot 3204 being recorded. Similarly, a second camera has a period of activity 3205 resulting in a second snapshot 3206 being recorded. A third snapshot 3207 is recorded in response to a period of activity 3208 being detected in signals processed from a third camera.

Selected (freeze frame) images or generated (blurred) images are established by different analysers at different times. Exemplar images can be shown without their surrounding low quality images because it is the foreground area that is of most interest. In a preferred embodiment, the full frame will have been recorded and the exemplar images are primarily intended for the identification and categorisation of stored image frames. Furthermore, when presenting exemplar images on a timeline, such as that presented on monitor 431, space is limited. Consequently, it is preferable for only the foreground regions to be displayed, preferably scaled so as to be presented with a fixed height in the available space for the presentation of the timeline. Consequently, with height values being adjusted so as to fit the available space, it is possible for the images to have varying widths.

FIG. 33

Figure 33:
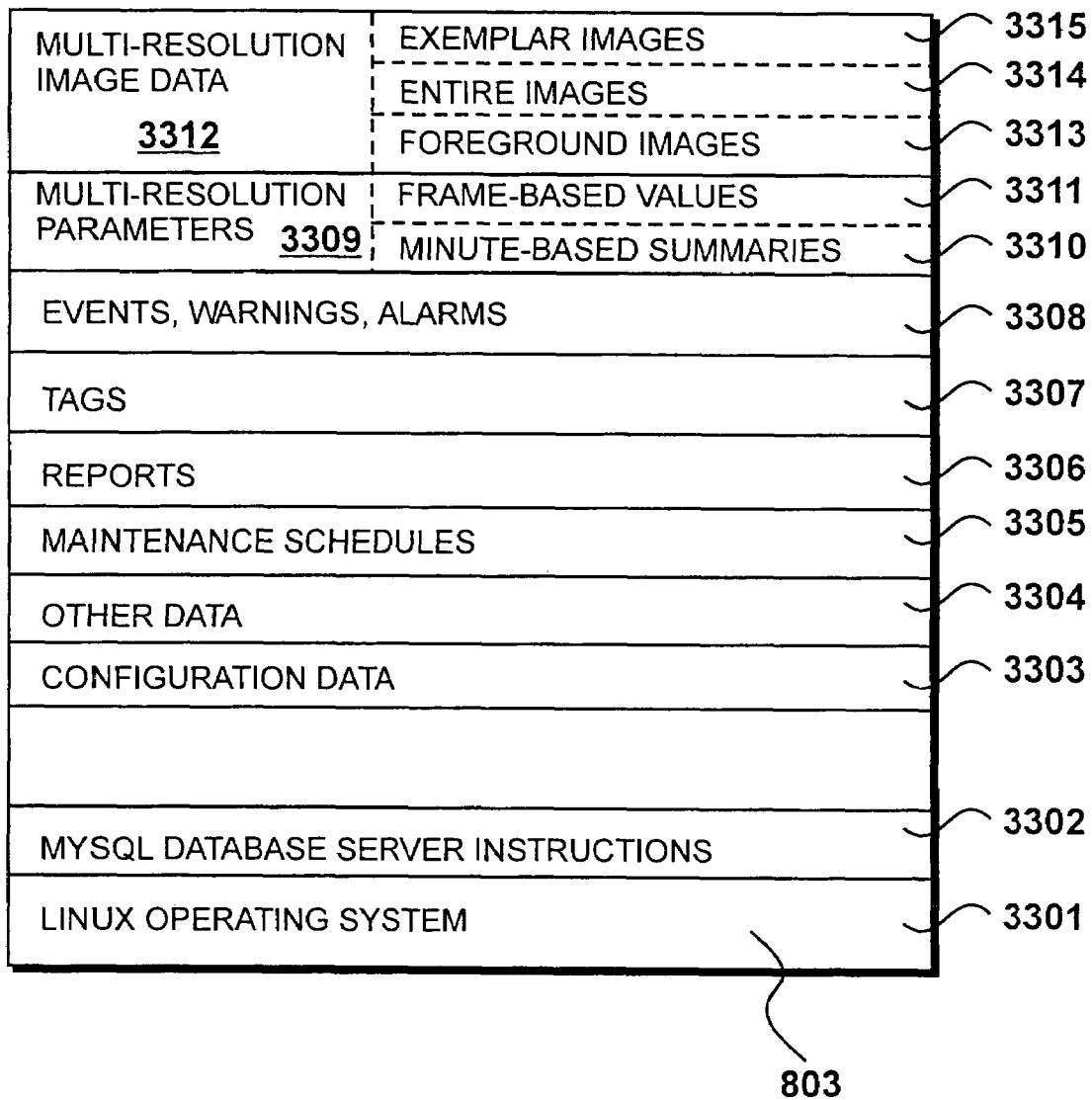
FIG. 33 details the redundant array of independent disks as shown in FIG. 8.

At the data store 705, the hard disk drive 804 takes the form of a redundant array of independent disks 803, as shown in FIG. 33. Many different types of data are stored on this data store, originating from many different sources within the system. A Linux operating system 3301 is stored in combination with instructions for a database server, thereby providing the main functionality of the data store system. The data store object 1117 shown in FIG. 11 exists as a result of executing the database instructions 3302 in combination with configuration data 3303. Other data includes various configuration and dynamic data that are stored on the array 803 by the instructions derived from 3301 and 3302.

Maintenance schedules 3305 are generated as a result of combining camera health parameters, as described below.

Reports 3306, tags 3307, events, warnings and alarms 3308 are generated in response to system operation. These collectively represent time-based data records describing the status of the camera sensors or the system as a whole at particular points in time.

Within the data store, sufficient storage is provided to enable the output from multiple cameras to be recorded over several months, particularly given that only significant activity is recorded. Furthermore, in a preferred embodiment, when significant activity is recorded only the foreground parts of each image frame are recorded at high quality.

Multi-resolution parameters 3309 include frame-based values 3311 generated at step 3502 and minute-based values 3310 generated at step 2504. The multi-resolution images themselves include foreground images 3313, entire images (at low quality) 3314, and exemplar images 3315.

FIG. 34

Figure 34:
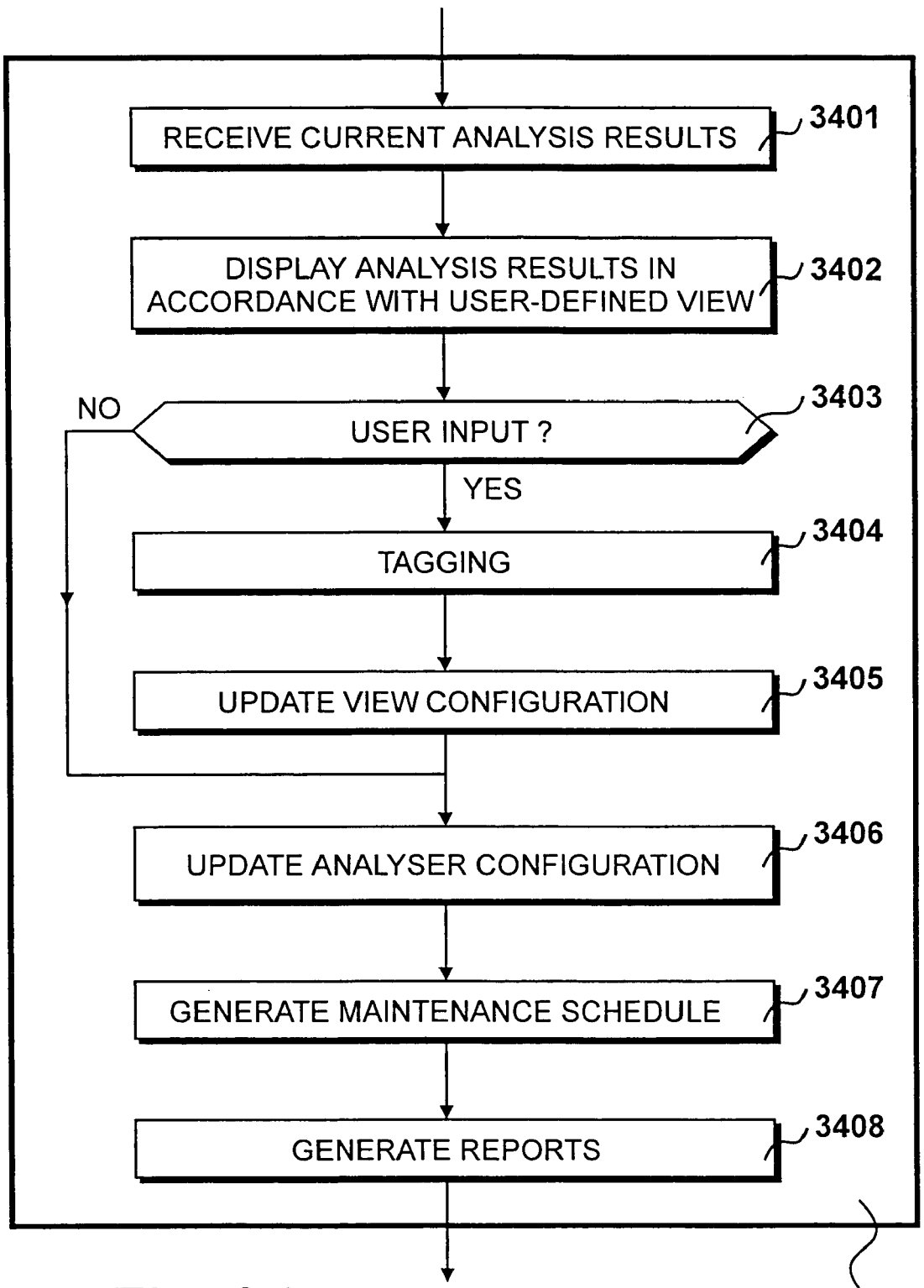
FIG. 34 details viewing, reporting and maintenance scheduling procedures shown in FIG. 12.

The viewing, reporting and maintenance scheduling procedures 1203 identified in FIG. 12 are detailed in FIG. 34. These procedures are performed at the local workstation systems 713 or, in the functional representation shown in FIG. 11, via the workstation object 1116.

At step 3401 current analysis results are received. It should be appreciated that the data store receives a large volume of data all of the time, creating a record of images captured by the digital monitoring cameras (at relatively low quality). However, whenever there is significant activity detected by a analyser, the monitoring workstation receives data that has been selected as representing an event that is likely to be of interest. Thus, the analyser objects 1107 etc are configured to request attention to be given by the monitoring workstation to their output, resulting in the images processed by the analyser being displayed automatically. Thus, the monitoring workstation object 1116 receives current analysis results on a selected basis as part of the overall monitoring process.

At step 3402 analysis results are displayed in accordance with user defined preferences. In the preferred embodiment, view configurations are possible, representing timelines using different styles, different numbers of priority images, different numbers of large images and so on, determined either exclusively in accordance with personal preferences or in accordance with a preferred configuration for a particular application. However, irrespective of the chosen layout, the processes involved for rendering the images in a viewable manner are substantially similar only with minor variations.

At step 3403 a question is asked as to whether user input has been received. If there is no user input, control is directed to step 3406. If user input has been received, tag processing is effected at step 3404 in response to the user entering a request to tag. At step 3405 a response is made to any updates to view the configuration and at step 3406 updates are processed in response to requests to change the analyser configuration.

It is possible that the user may have operated mouse 502 in order to, for example, zoom in on a displayed timeline or performed some other operation that changes the display in some way. Such an operation changes the view configurations accordingly and in a preferred embodiment these steps are multi-threaded and executed at least partially in parallel, rather than being executed in the sequential manner shown in FIG. 4 for illustrative purposes only.

Figure 29:
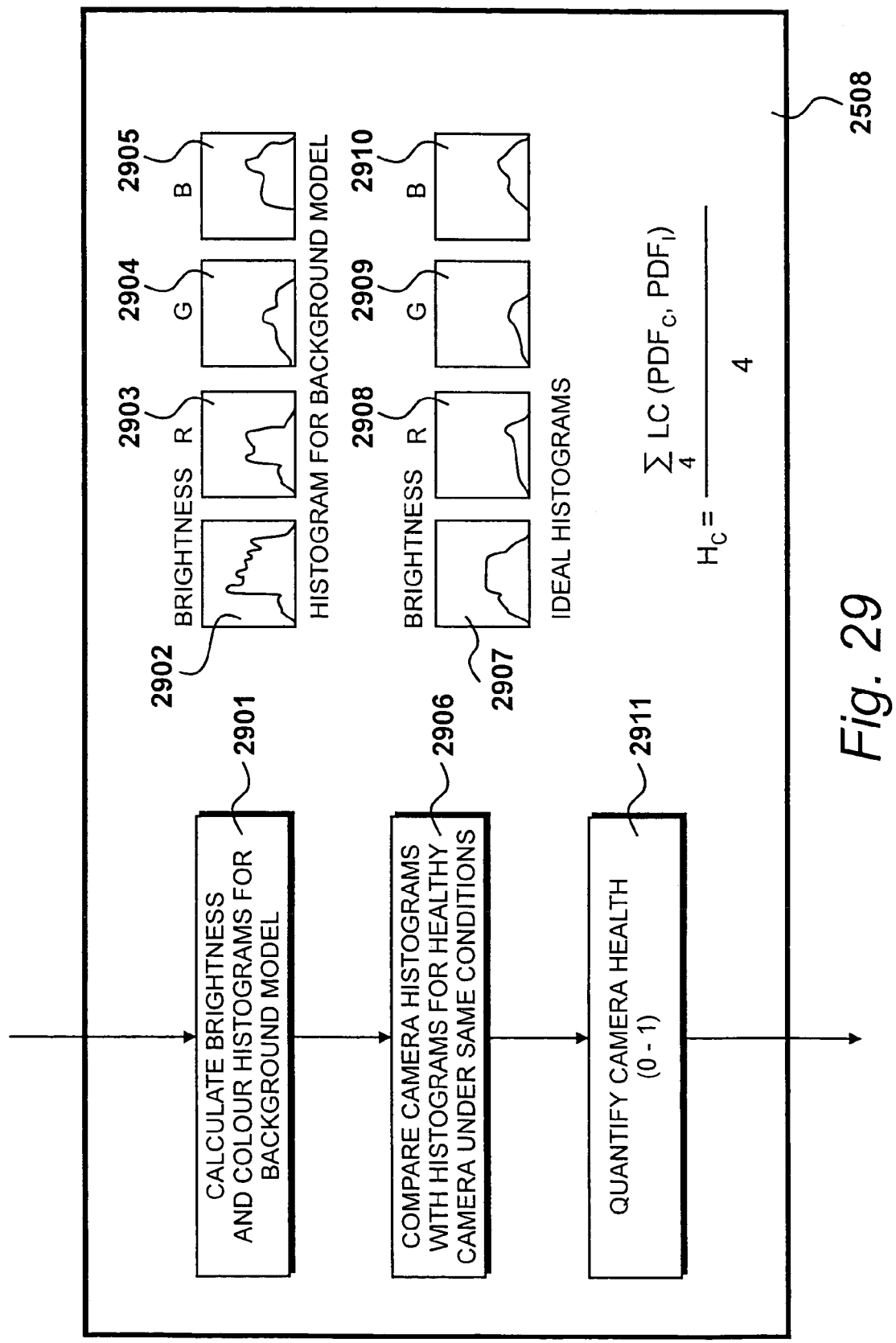
FIG. 29 details the process of quality monitoring as shown in FIG. 25.

Referring again to step 3406, user input or an automated process may result in analyser parameters being changed for one or more of the analyser objects present within the system. For example, a group of analysers may be instructed to send exemplar images to the monitoring workstation 1116 as and when they are created and the particular group that has been selected may be changed interactively by the user. At step 3407 a maintenance schedule is generated using camera health parameters (as described with respect to FIG. 29) to generate a maintenance schedule.

At step 3408 reports are generated, preferably from a plurality of different sources, including activity levels and tags, to generate various types of report. Thus, reports may be made available in electronic form or printed locally using printing device 715.

FIG. 35

Figure 35:
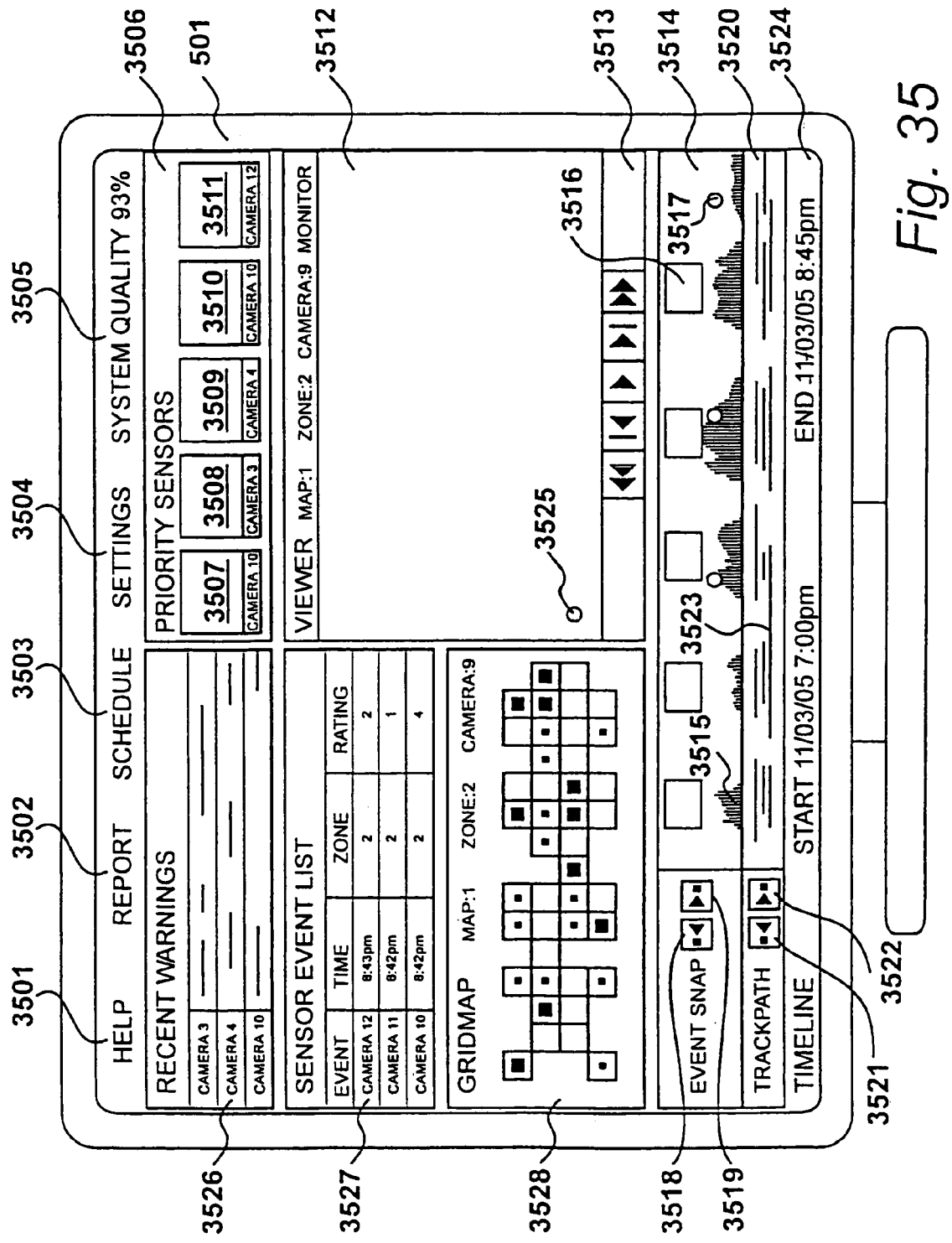
FIG. 35 shows an example of a graphical user interface in accordance with the present invention.

During monitoring operations, information is presented to the operator in the form of a graphical user interface displayed on monitor 431. A typical example of such an interface is illustrated in FIG. 35 although it should be appreciated that, as previously discussed, the actual layout of this interface may be modified to some extent in accordance with user preferences. An example of a graphical user interface displayed to an operator (via monitor 431) is shown in FIG. 35. It should be appreciated that this represents an example of a possible graphical user interface and many alternative arrangements will be possible while providing substantially similar functionality.

A menu bar is presented at the top of the interface and includes menu items "help" 3501, "reports" 3502, "schedule" 3503 and "settings" 2304. To the right of the top of the screen there is also a display region 3505 that displays the measure of system quality. This represents general operational quality of the monitoring system derived primarily from an accumulation of camera health values and possibly incorporating measures of any other devices that suffer degradation and require servicing.

As is well known in the art, the help menu 3501 opens a help system to guide the operator in an interactive way. Report menu 3502 is used to generate one of several types of report or to configure the system to generate reports automatically. Thus, in this way, it is possible to generate a daily report both in paper form and for distribution in electronic form, possibly as an HTML document.

Schedule menu 3503 is used to select operations associated with a generation of a maintenance schedule. Thus, enquiries may be made as to whether it would be appropriate to schedule maintenance or estimates may be provided as to when a maintenance operation would be appropriate. Furthermore, it is possible for maintenance schedules to be printed and thereafter acted upon by maintenance operatives. Similarly, the setting menu 3504 is used to modify various possible configurations of the monitoring workstation including amendments to the user interface itself.

The priority sensors area 3506 includes (in this example) five small image display areas 3507 to 3511. An output from any of the digital monitoring cameras may be directed towards any of the small image display areas and in each image display area 3507 to 3511 a reference is included at its lower portion identifying the source from which the images are taken. A scroll bar may be included to facilitate a selection of particular outputs for the small image display areas. It is usually intended that the selected images should be derived from camera outputs that are considered to be of a high priority, either selected by an operator or by processing procedures (possibly forms of artificial intelligence) included within the monitoring system itself. During operation, images captured in real time are supplied to the allocated small image display areas. It is also possible for an exemplar image to be shown in the priority sensors display panel.

A situation may arise in which there are more camera outputs that are considered to be of a high priority than there are small image areas available for these priority outputs to be displayed. Under these circumstances, it is possible to cycle through all of the priority outputs (at a selected speed) so that they may be periodically reviewed in the priority sensor area 3506. Furthermore, it is possible for procedures to be included that give weightings to the priority levels such that outputs considered to be of highest priority are shown to a greater extent within area 3506 compared to outputs that are considered to be of a lower priority. Thus, for example, cameras that have captured high degrees of activity (as determined by a respective analyser) may be considered as being of a high priority and are therefore given more prominence in the displayed interface.

A main viewer 3512 allows a single large image to be displayed, usually by coming from the camera considered to produce outputs of the highest priority or from the camera where the most recent event likely to be of interest has been detected through the monitoring process. This represents a first default mode operation in which images are being acquired directly as they are being captured. In a second mode of operation the main viewer presents the most recent events and only updates the display when a new event is added or detected. In a third mode of operation it is possible to review previously recorded images and control of the display is achieved using conventional video navigation controls 3513. Consequently, the navigation controls 3513 allow the video images that have been stored to be played forward and backward at any speed, were also allowing the user to select and go to a next or previous event. Furthermore, as an alternative to using control 3513, navigation of stored video may also be achieved by using gestural movements of a user-input device, such as mouse 502. Thus, in this way, forward play may be instructed by clicking and dragging to the right and backward play may be selected by clicking and dragging to the left. Replay speed may be adjusted by performing similar actions but by dragging repeatedly in the same direction. For example, if the current speed is four times normal play speed, dragging to the left may make it three times the current speed where dragging to the right may make it five times normal speed. Furthermore, a tapping action may allow a jogging operation to be affected, either one frame forwards or one frame backwards.

Facilities are also included for cropping and zooming so as to select specific regions while reducing the amount of data that is necessary to transport over the network 704.

A first timeline 3514 displays an activity graph 3515, of the type described with reference to FIG. 32.

Furthermore, in addition to elements 3515 showing analysed activity, the timeline 3514 also includes exemplar images 3516 and tag markers 3517.

An events snap control allows the user to navigate timeline 3514 by operation of a first button 3518 or a second button 3519. Operation of button 3518 enables the user to navigate to a previous exemplar image while operation of button 3519 allows the user to navigate to the next exemplar image.

A second timeline 3520 displays tracking information from several monitoring cameras. Track path control buttons

3521 and 3522 provide for navigation in a backward direction (3521) and in a forward direction (3522). The track patch includes a plurality of substantially horizontal lines 3523 each representing an object that has been tracked over the duration represented by the length of the line. In preferred embodiments, it is possible to provide further encoding to the nature of the line. Thus, on detecting certain conditions, a line 3523 may be displayed as a thicker line compared to lines for which this condition has not been detected. Alternative representations may also be included, such as colour coding. In a preferred embodiment, different colours are selected to represent other attributes of the tracking process, such as the velocity of the object being tracked. Thus, for example, relatively slow objects may be colour coded blue with relatively fast objects being colour coded red. Depending on the particular monitoring application, slow movement or fast movement may be considered as unusual and therefore may represent an event likely to be of interest.

A timeline navigation bar 3524 enables a user to define start and end times for the timeline and it is possible for a duration specified in this way to vary from, say, minutes to years etc. In this way, it is possible to identify an event if it is known that the event occurred within a particular period. Thus, for example, it may be known that an event occurred in a particular year or in a particular month. Having selected this duration, events are displayed in the first timeline 3514 which significantly assists in terms of identifying the specific event of interest. In this way, the system is made substantially more useful given that it should be possible to identify events of interest relatively rapidly without, for example, spooling through many hours of recorded video tape.

Main viewer area 3512 includes a tag icon 3525. Selection of this icon (by means of a mouse click for example) provides a record to the effect that a particular image has been tagged. Furthermore, the tag may also include information, including information generated automatically (such as an indication of an event likely to be of interest or an alarm condition) and may also include alpha-numeric text manually entered by the operator via keyboard 501. A user may also enter graphical information via a mouse a touch tablet or a hand held device.

A recent warning area 3526 provides a summary of recent warnings that have been generated. These will generally include alarm events and events of a serious nature that require immediate action to be taken. Similarly, a sensor events area 3527 provides a summary of events that have been detected by the monitoring system and considered to be likely to be of interest.

The interface also includes a grid map area 3528. The grid map 3528 provides an interface for viewing the status of monitoring cameras and other sensors connected to the system. It allows cameras to be grouped such that each group is shown in a grid lay out.

A configuration mode enables cameras to be assigned to a topological or logical group. Initially, the grid has all cells available and is therefore represented as a complete grid. The grid map may be used to create layouts by clicking on cells or dragging over a range of cells to either deselect them and turn them off or to map cameras to the cell, thereby creating a layout or map of a group of cameras.

When cameras are placed in a topological or logical group, they are considered to be mapped, where as unmapped cameras are shown below the selected map, being those that have not been assigned to a group. The mapped cameras are each illustrated positioned relative to the positions of other cameras in the group, by means of a square cell. An example of a topological grouping is "level 1, zone 2", which would be all of the cameras on the first floor in one section of a monitored environment. Logical groupings are also possible thus, for example, a map may display a logical grouping of exits, this being the group of all of the cameras (and possibly other sensors) that are in a position to record information about the exits of an environment.

In monitoring mode, the digital monitoring cameras may be selected within the map using an input device such as mouse 502. In a preferred embodiment, a selected sensor is displayed using a different colour, or by means of an alternative graphical representation (possibly where colour is not available).

The grid map may also include a camera list for sensor selection, thereby allowing the quick designation of the grouping being displayed and the camera output selected. The main viewer 3512 is preferably configured to display video images of a selected (in focus) camera output.

The state of cameras in the group may be quickly assessed from the grid map interface given that a white square within a sensor cell indicates activity based on the measurements determined by a respective analyser. Thus, for a high level of activity a large white square is displayed within the cell for the sensor. Similarly, when a significant event or an alarm condition occurs it is possible for its associated cell to flash red and white. In the configuration, a cell may or may not have a camera output associated there too and this condition is displayed by representing the cell using a brighter colour than a camera output has been allocated.

FIG. 36

Figure 36:
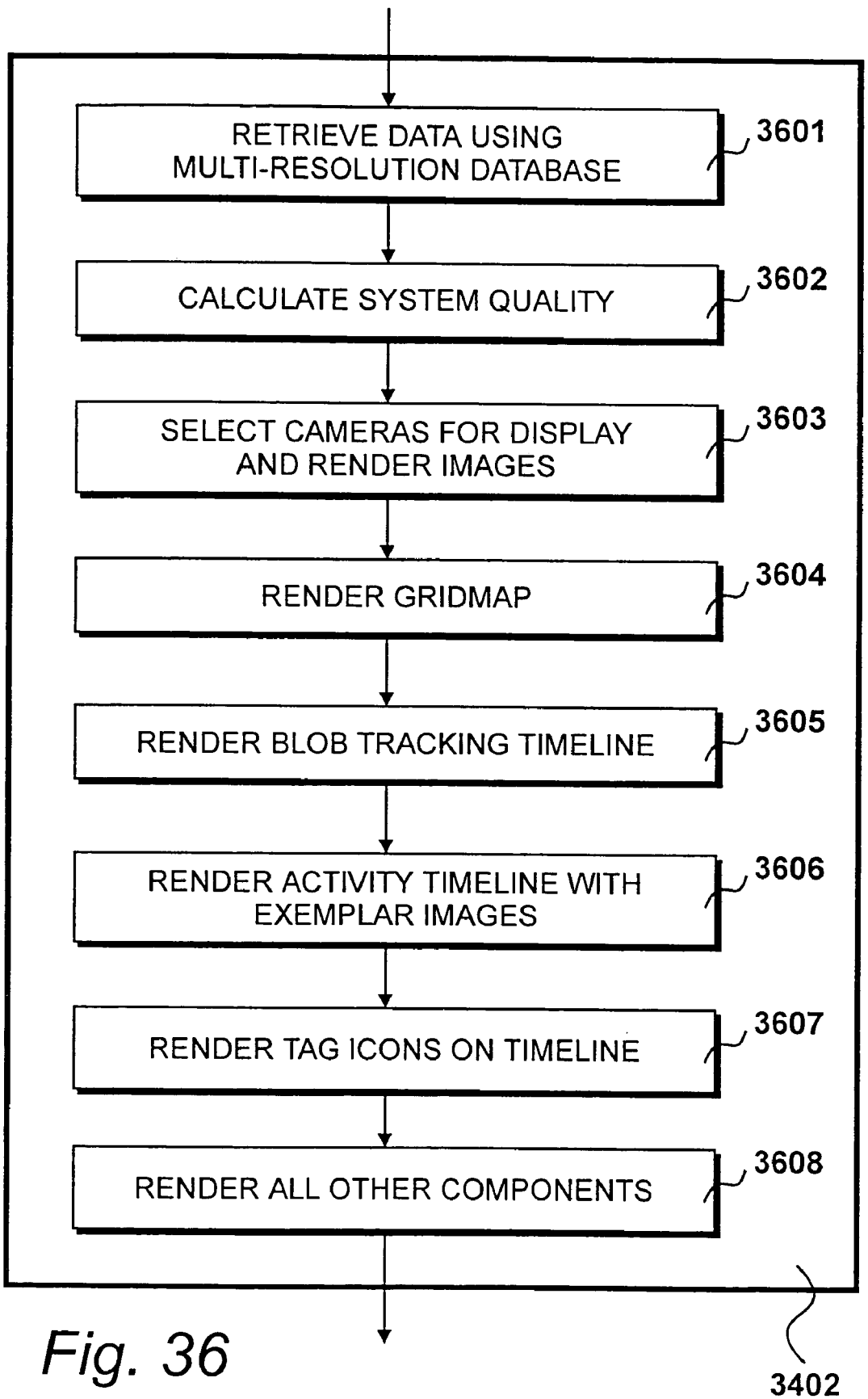
FIG. 36 details procedures for displaying analysis results as shown in FIG. 34.

Procedure 3402 for displaying analysis results is detailed in FIG. 36. At step 3601 data is retrieved using the multi-resolution database. The reading of data from the database involves the use of a hierarchical cache so as to retrieve the data necessary to construct the activity timeline 3514. A problem arises in that if the time window is too wide, the number of frames that need to be accessed in order to build up the timeline becomes very large.

At step 3602 a numerical value for system quality is calculated, so as to be displayed at 3505. At step 3603 camera outputs for display are selected, resulting in images being rendered for display. These operations are performed both for the priority areas 3507 to 3511 and for the main viewer 3512. At step 3604 the grid map 3528 is rendered for display.

At step 3605 the tracking timeline 3520 is rendered and at step 3606 the activity timeline 3514 with exemplar images is rendered.

At step 3607 tag icons 3517 are rendered where after, at step 3608, any other components required to complete the graphical user interface are rendered. This includes a rendering of the system quality value calculated at step 3602.

FIG. 37

Figure 37:
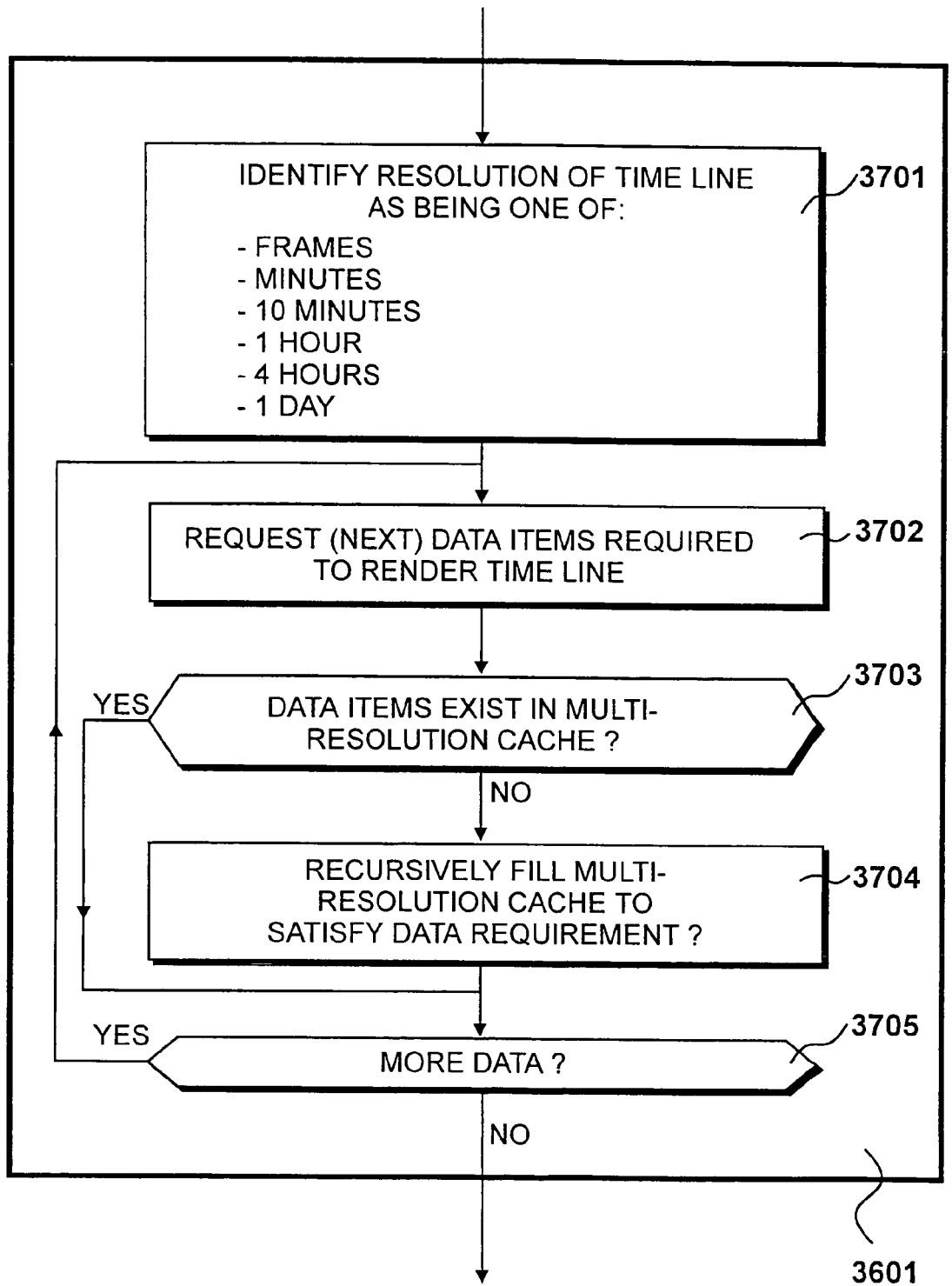
FIG. 37 details procedures for retrieving data using the multi-resolution database as shown in FIG. 36.

Procedures 3601 for retrieving data using the multi-resolution database are detailed in FIG. 37. At step 3701 the resolution of the timeline is identified as being representative of frames, minutes, ten minute intervals, one-hour intervals, four-hour intervals or days. The timeline is drawn in pixels and therefore in order to plot an activity graph 3514 there must be at least one frame value per pixel. If the timeline covers a substantial period of time, activity values generated from many frames will be represented at the single pixel position.

At step 3702 a first data item is requested for rendering on the timeline. Thereafter, at step 3703 a question is asked as to whether items exist in a multi-resolution cache.

If the question asked at step 3703 is answered in the negative, the multi-resolution cache is recursively filled at step 3704 in order to satisfy the data requirement. Thereafter, at step 3705 a question is asked as to whether more data is required in the cache and if answered in the affirmative control is returned to step 3702. Thus, upon executing step 3702 again, the next data items are requested resulting in further data being written to the cache at step 3704. If requested data items are already in cache, resulting in the question asked at step 3703 being answered in the affirmative, step 3704 is by passed. Eventually, sufficient data will have been written to cache resulting in the question asked at step 3705 being answered in the negative.

FIG. 38

Figure 38:
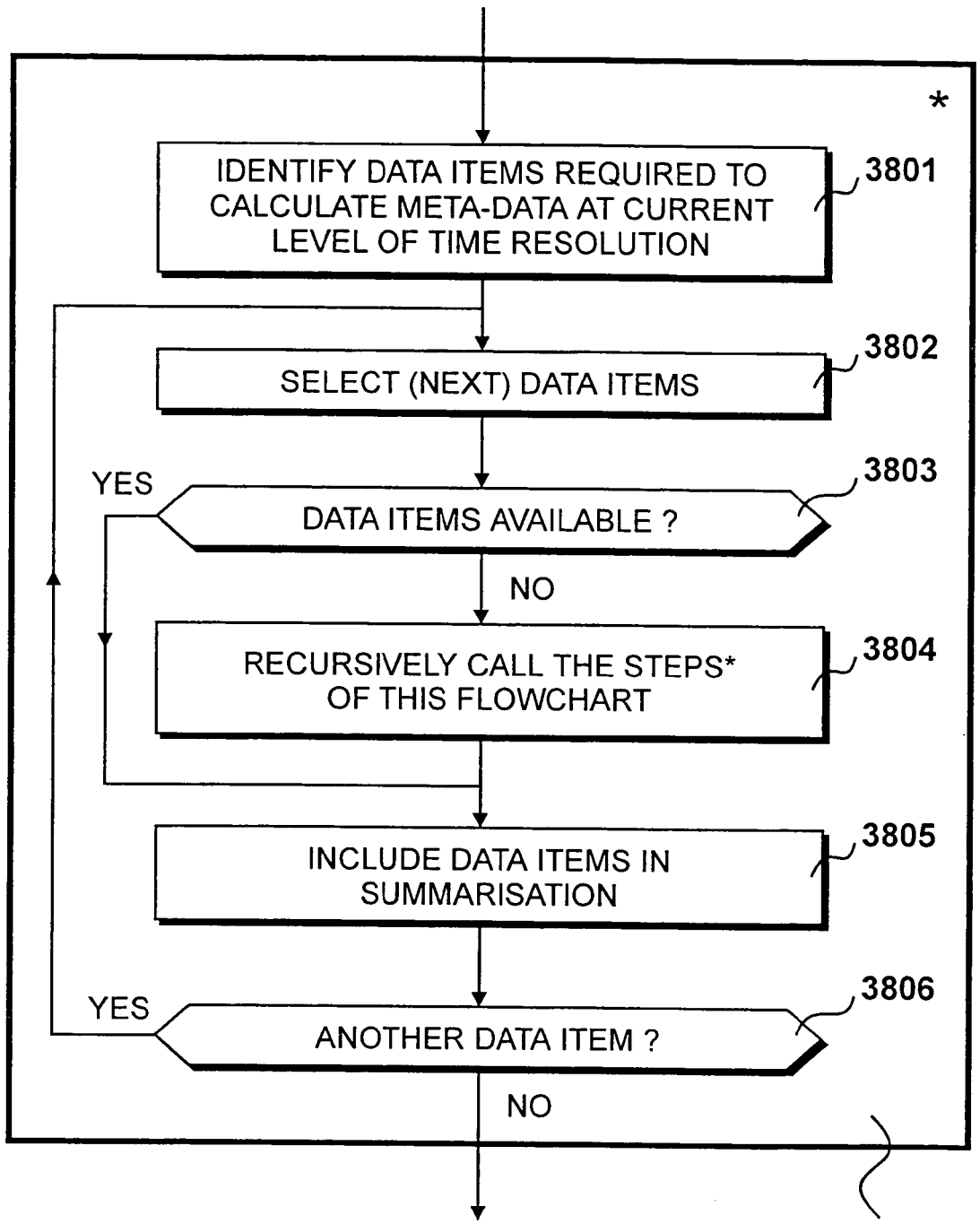
FIG. 38 details the recursive nature of filling the multi-resolution cache, as shown in FIG. 37.

The recursive nature of step 3704 is detailed in FIG. 38. In step 3801 data items are identified that are required to calculate metadata at a current level of time resolution.

At step 3802 a data item is selected and at step 3803 a question is asked as to whether the data items are available. If this question is answered in the negative, the whole process illustrated in FIG. 38 is recursively repeated. If the question asked at step 3803 is answered in the affirmative, then upon the completion of step 3804 data items are included in the summarisation of step 3805. Thereafter, at step 3806 a question is asked as to whether another data item is to be selected.

Step 3805 invokes a summarisation method from the list of methods shown in FIG. 26. In the present example, activity level is being graphed therefore the summarisation method selected is that of "choose maximum". Previously, this was done for the minute summaries but now a similar process is performed at every level of resolution, thereby filling the hierarchical cache up to the level where a value is required.

FIG. 39

Figure 39:
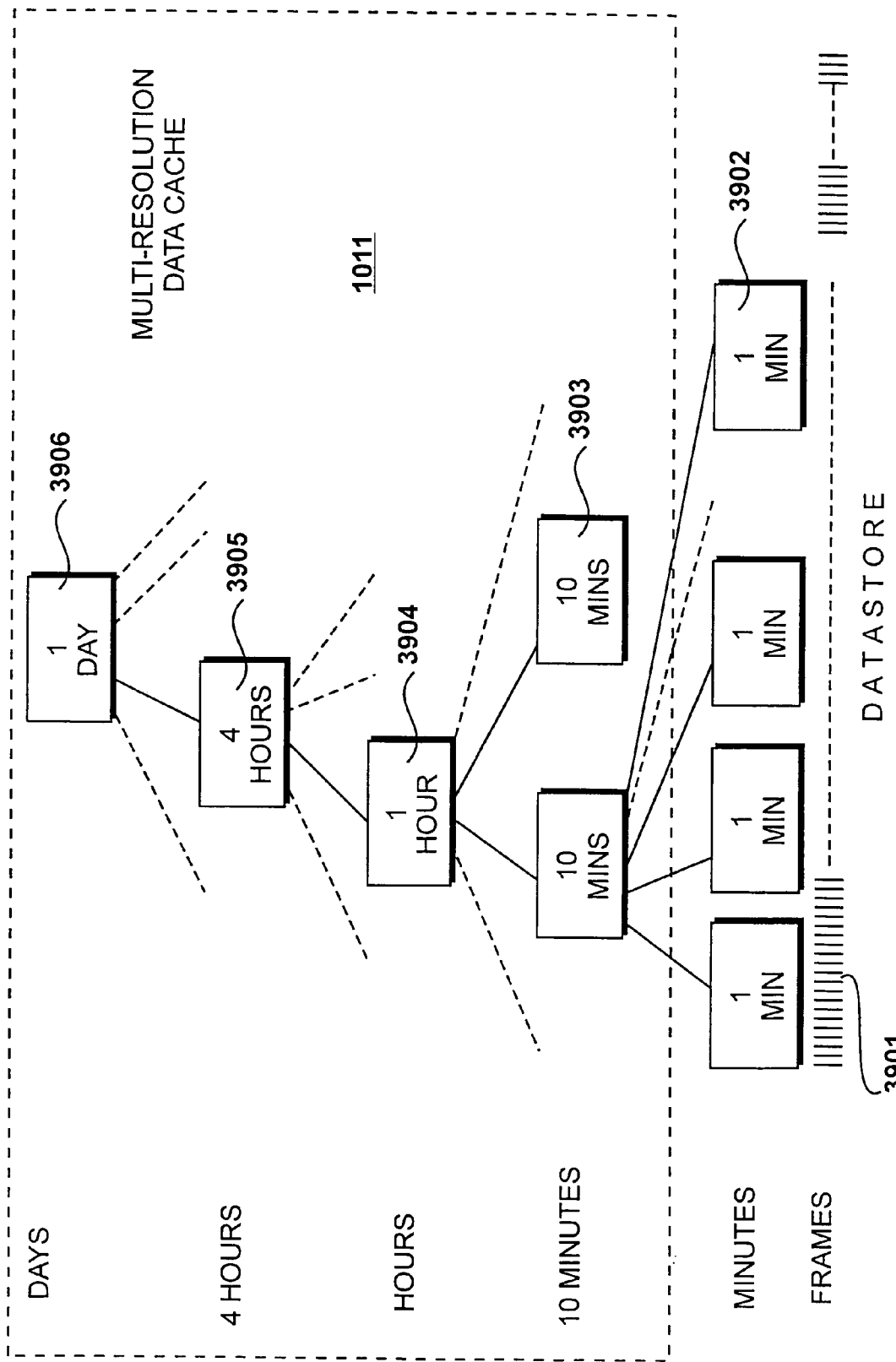
FIG. 39 shows the storage of summary data at multi-resolution levels.

An illustration of the way in which the summarisation data is stored at multi-resolution levels is illustrated in FIG. 39. At its lowest level, individual frames 3901 are stored each consisting of actual compressed image data and possibly having descriptive data associated therewith as previously described. Thus, the frame 3901 effectively divides the recorded time into a plurality of intervals (frames) that are stored in the database over the period of time under consideration.

The period of time is divided into a set of sub periods which, at its lowest level, consists of dividing the period of time into one-minute intervals 3902. The data recorded on an interval-by-interval (frame-by-frame) basis is analysed to produce first level metadata for each of these individual one-minute frame groups 3902. Furthermore, a plurality of the first level groups (minutes) are combined to produce second level groups (representing ten minute intervals in the example) 3903. Consequently, the metadata of the first level one-minute intervals is then combined to produce second level metadata. Thus, each ten-minute group 3903 includes the metadata derived from each of its ten one-minute components 3902.

This process is repeated for a one-hour interval 3904, clearly containing data derived from six ten-minute intervals 3903. Again, this process is repeated to produce a four-hour interval 3905 by grouping the metadata derived from four one-hour intervals 3904. Finally, in this example, at its highest level, a one-day interval 3906 is considered in which metadata is combined from four-hour groups 3905.

FIG. 40

Figure 40:
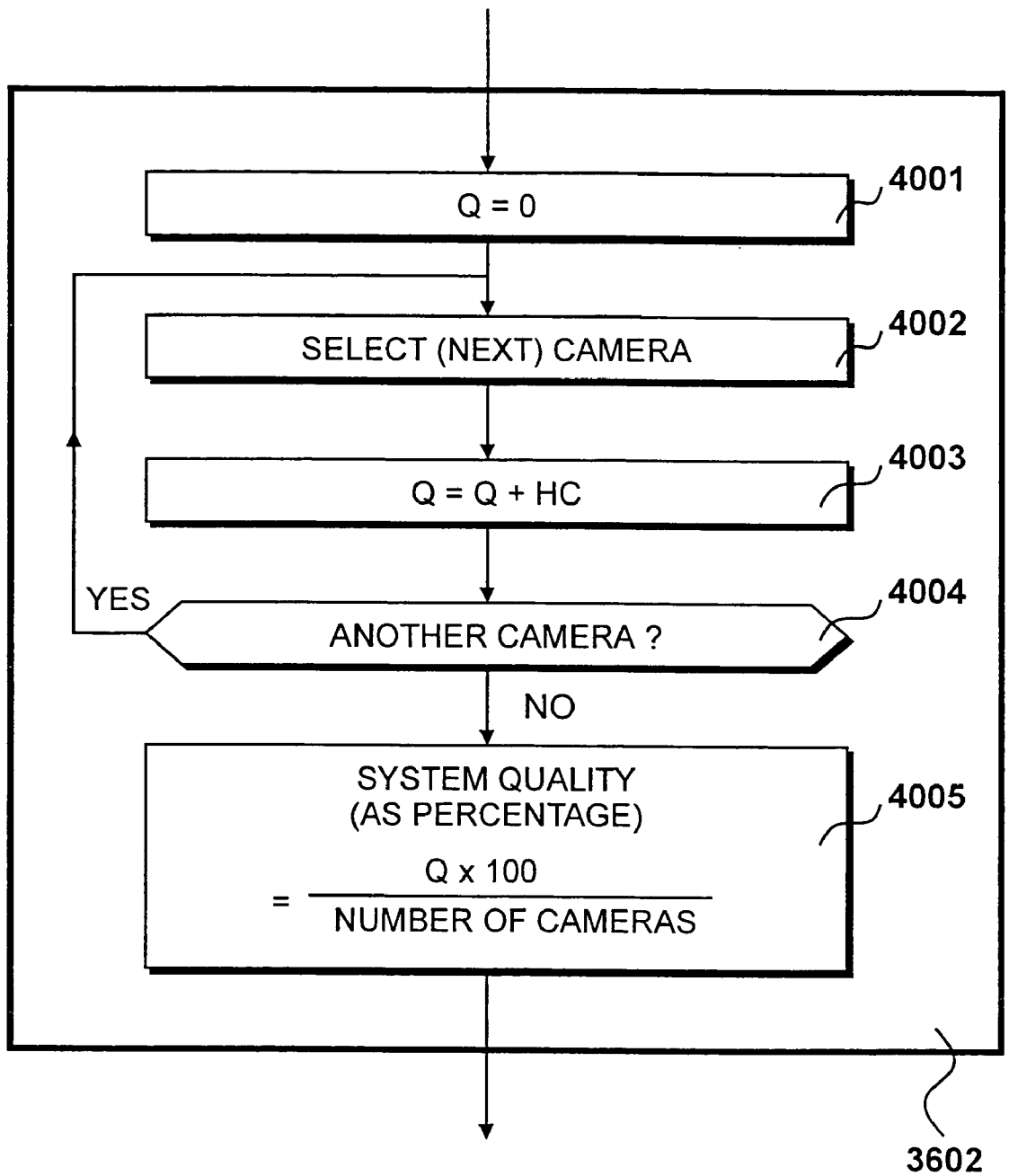
FIG. 40 details procedures for calculating system quality as shown in FIG. 36.

Procedures 3602 for calculating system quality are detailed in FIG. 40. At step 4001 a quality parameter is initially set to zero whereafter, at step 4002, a first camera is selected.

At step 4003 the health value HC (in the range zero to one) for the camera selected at step 4002 is added to the quality parameter.

At step 4004 a question is asked as to whether another camera is to be considered and when answered in the affirmative the next camera is selected at step 4002. Thus, the health value for the next selected camera is added to the running total for Q and so on until all off the cameras have been considered.

Step 4005 calculates system quality (as a percentage) by multiplying the accumulated Q value by 100 and then dividing by the number of cameras considered.

As previously stated, more sophisticated procedures may be adopted for calculating system quality and other types of devices may be included. It is also likely that system health functions may change to accommodate other constraints, such as giving more weighting to very sick cameras.

FIG. 41

Figure 41:
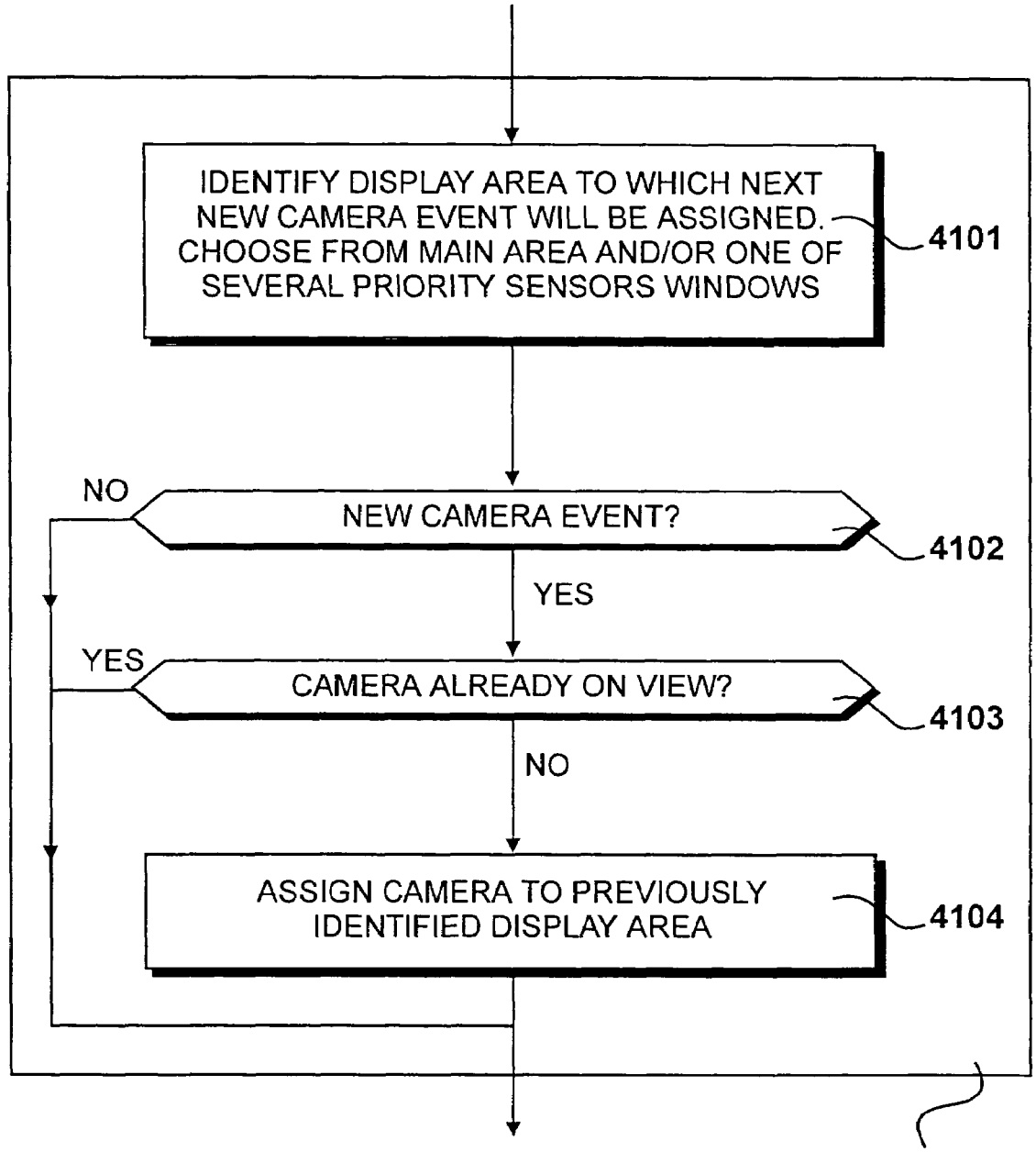
FIG. 41 details procedures for selecting cameras for display as shown in FIG. 36.

Process 3603 for selecting cameras for display is detailed in FIG. 41. As previously described, the outputs from a plurality of cameras are displayable to an operator, and therefore it is not usually possible for all of the outputs to be displayed at the same time and a degree of prioritisation is required. Consequently, the data received from the cameras is processed in order to identify events of interest. Thereafter the output from a selected camera or cameras is displayed to an operator prominently after detecting an event of interest by the processing of data received from that selected camera. Thus, having captured video data and performed an analysis upon it (as part of the overall monitoring procedures) images will be displayed prominently if an event of interest has been detected.

At step 4101 a display area is identified to which the next new camera event will be assigned. This may be identified as the main area 3512 or one of the smaller priority areas 3507 to 3511.

At step 4102 a question is asked as to whether a new event likely to be of interest has been detected. In response to an affirmative answer, a question is asked at step 4103 as to whether the output from the camera is already on view. In response to this question being answered in the negative, the camera output is assigned to the display area identified at step 4101, at step 4104. In response to the question at step 4102 being answered in the negative or in response to the question asked at 4103 being answered in the affirmative, step 4104 is bypassed.

FIG. 42

Figure 42:
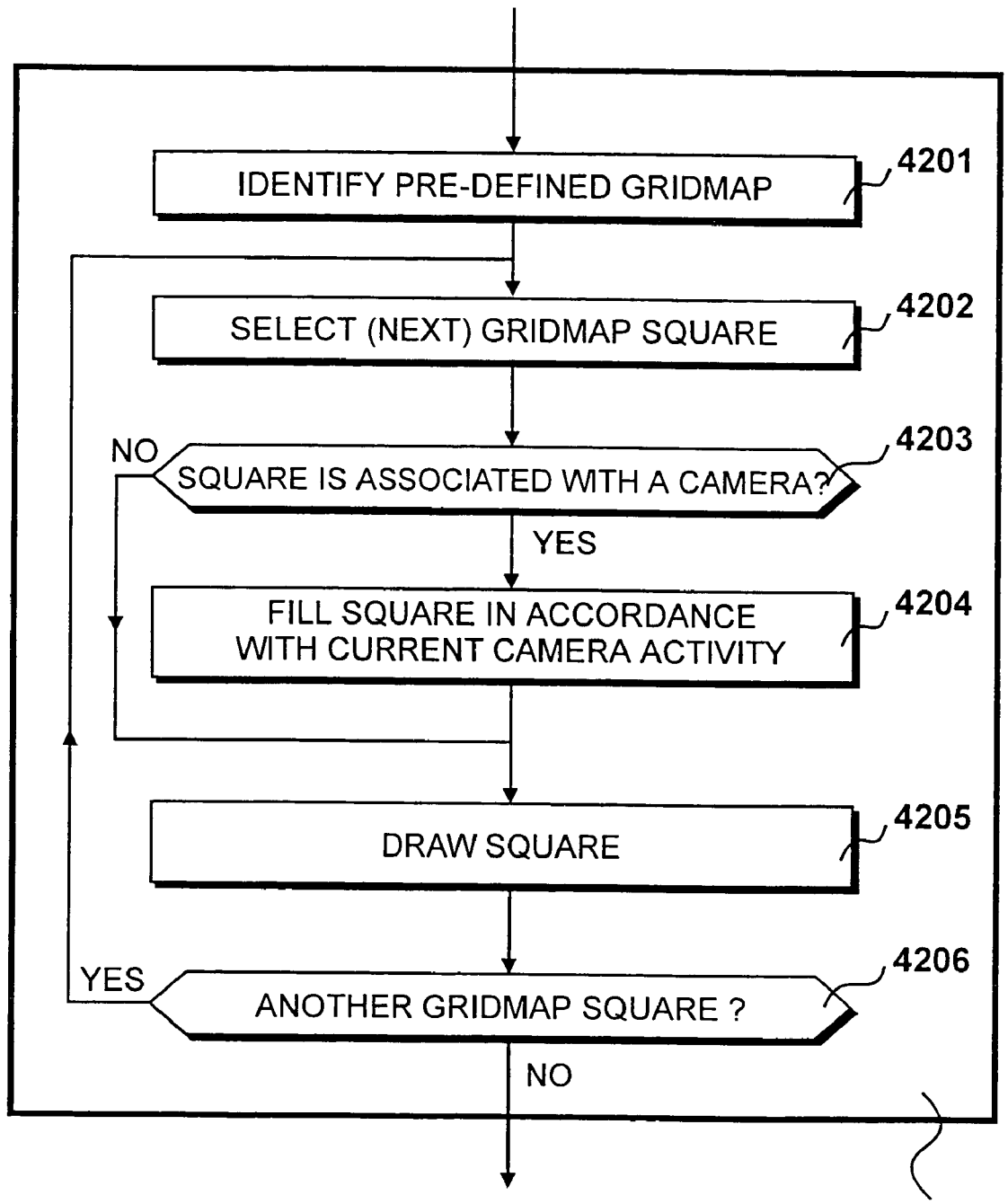
FIG. 42 details procedures for rendering the grid map as shown in FIG. 36.

Procedures 3604 for rendering the grid map 3528 are detailed in FIG. 42. At step 4201 a predefined grid map is identified and at step 4202 a first square of the identified grid map is selected.

At step 4203 a question is asked as to whether the square selected at step 4202 is associated with an active monitoring camera. If the question asked at step 4203 is answered in the affirmative, the square selected at step 4202 is filled in accordance with the activity analysed from the selected camera.

At step 4205 the activity square is drawn and at step 4206 a question is asked as to whether another grid map square is to be considered. Thus, when the question asked at step 4206 is answered in the affirmative control is returned to step 4202 and the next grid map square is selected.

If a selected square is not associated with a camera, resulting in the question asked at step 4203 being answered in the negative, step 4204 is bypassed and the selected square is drawn without an activity related infill. Eventually, all of the squares in the grid map will have been considered and the question asked at step 4206 will be answered in the negative.

FIG. 43

Figure 43:
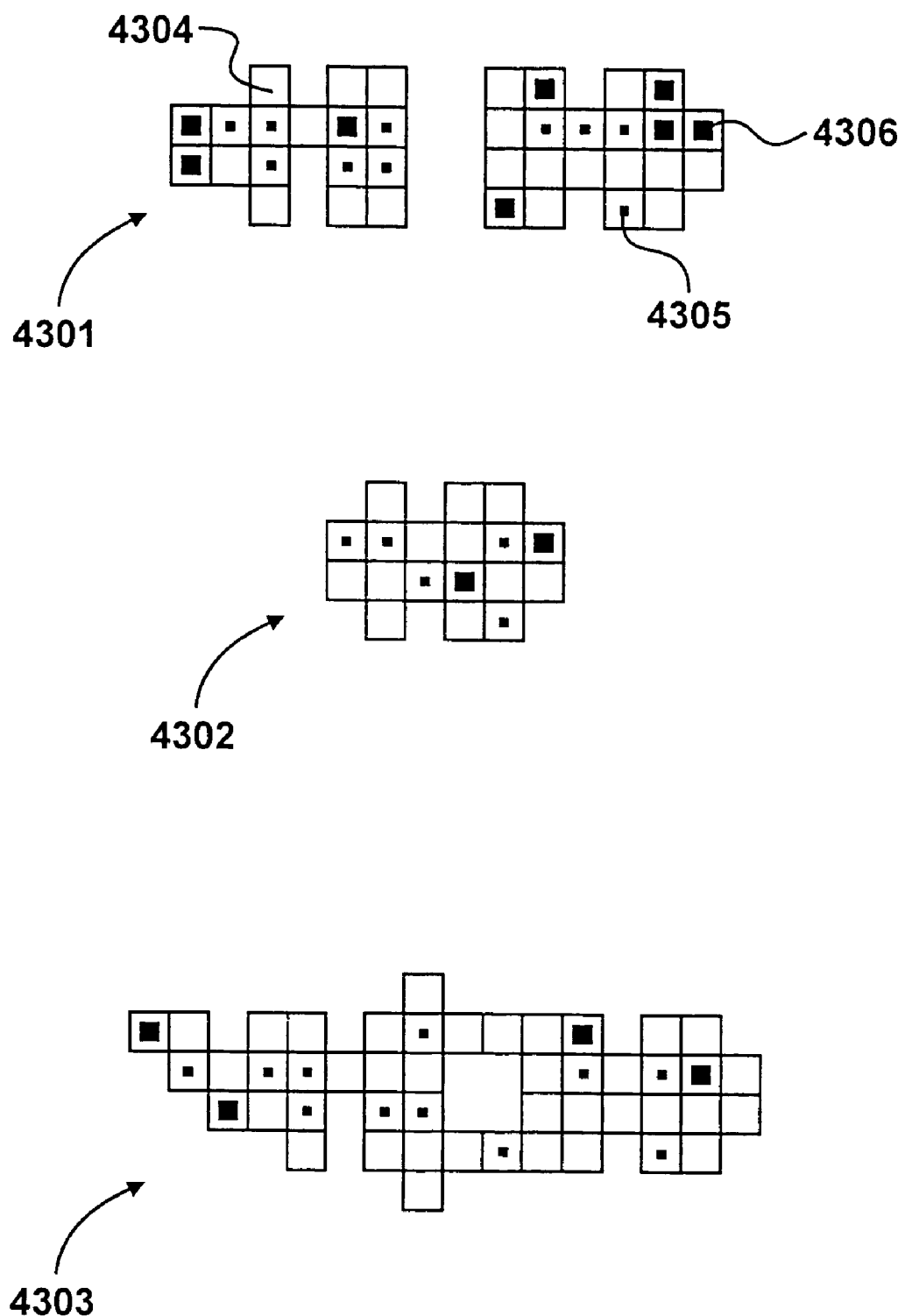
FIG. 43 shows a plurality of grid maps which may be associated with a monitored installation.

A monitored installation may have a plurality of grid maps associated therewith, as illustrated in FIG. 43. In this example, grid map 4301 represents a first floor of a gallery, grid map 4302 represents a main entrance with exit areas and grid map 4303 represents the basement area, where it is possible that access is limited.

In this example, square 4304 represents a situation where a camera has not been assigned. Square 4305 represents an area where a camera has been assigned but very little activity is occurring. Square 4306 represents a situation where a camera has been assigned and there is substantial activity being detected by an analysis process of the monitoring system.

FIG. 44

Figure 44:
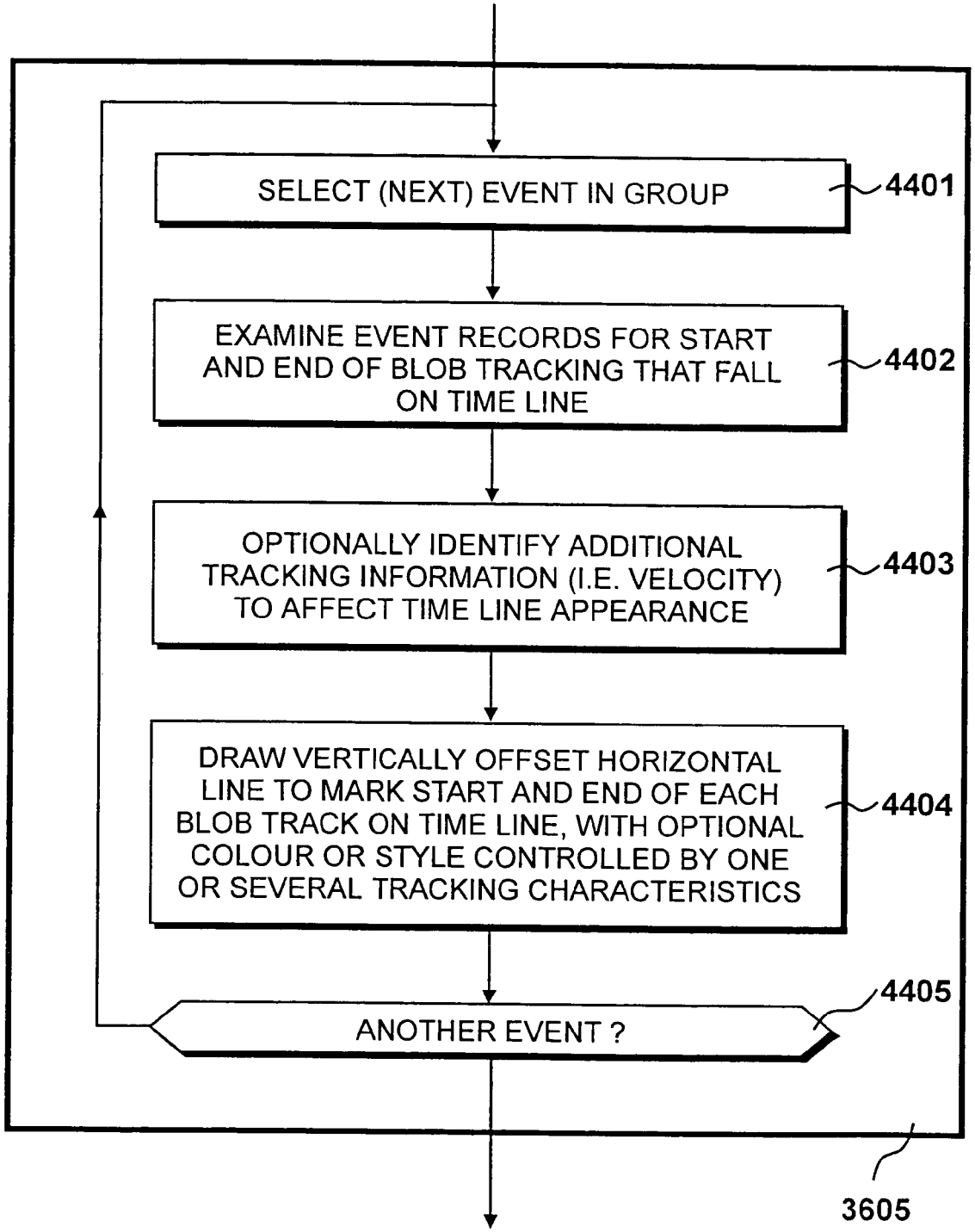
FIG. 44 details procedures for rendering the track path timeline as shown in FIG. 36.

The procedure 3605 for rendering the track path timeline 3520, and in particular the individual tracks 3523, is detailed in FIG. 44.

At step 4401 a first event is selected and at step 4402 event records are examined from tracks that fall within the timeline 3520 (FIG. 35).

At step 4403 it is possible to identify additional tracking information such as velocity so that this may have an effect on the appearance of the timeline. Thus, as previously described, it is possible for slow velocities to be shown in a first colour (such as blue) with velocities that exceed a predetermined threshold being displayed in an alternative colour such as red.

At step 4404 a vertically offset horizontal line 3523 is drawn to mark the start and end of each track on the timeline. Thus, each horizontal line (offset from its neighbours in a vertical direction) represents the duration over which an individual binary large object has been tracked.

At step 4405 a question is asked as to whether another event is to be considered and when answered in the affirmative control is returned to step 4401 whereupon the next camera is selected.

Thus, the processes repeat for each track until all of the cameras have been considered and the question asked at step 4405 is answered in the negative.

Each track start point and end point is stored in the data store as an event itself. Consequently, it is not necessary to access all of the records at the frame level in order to generate the horizontal track 3523 (FIG. 35).

FIG. 45

Figure 45:
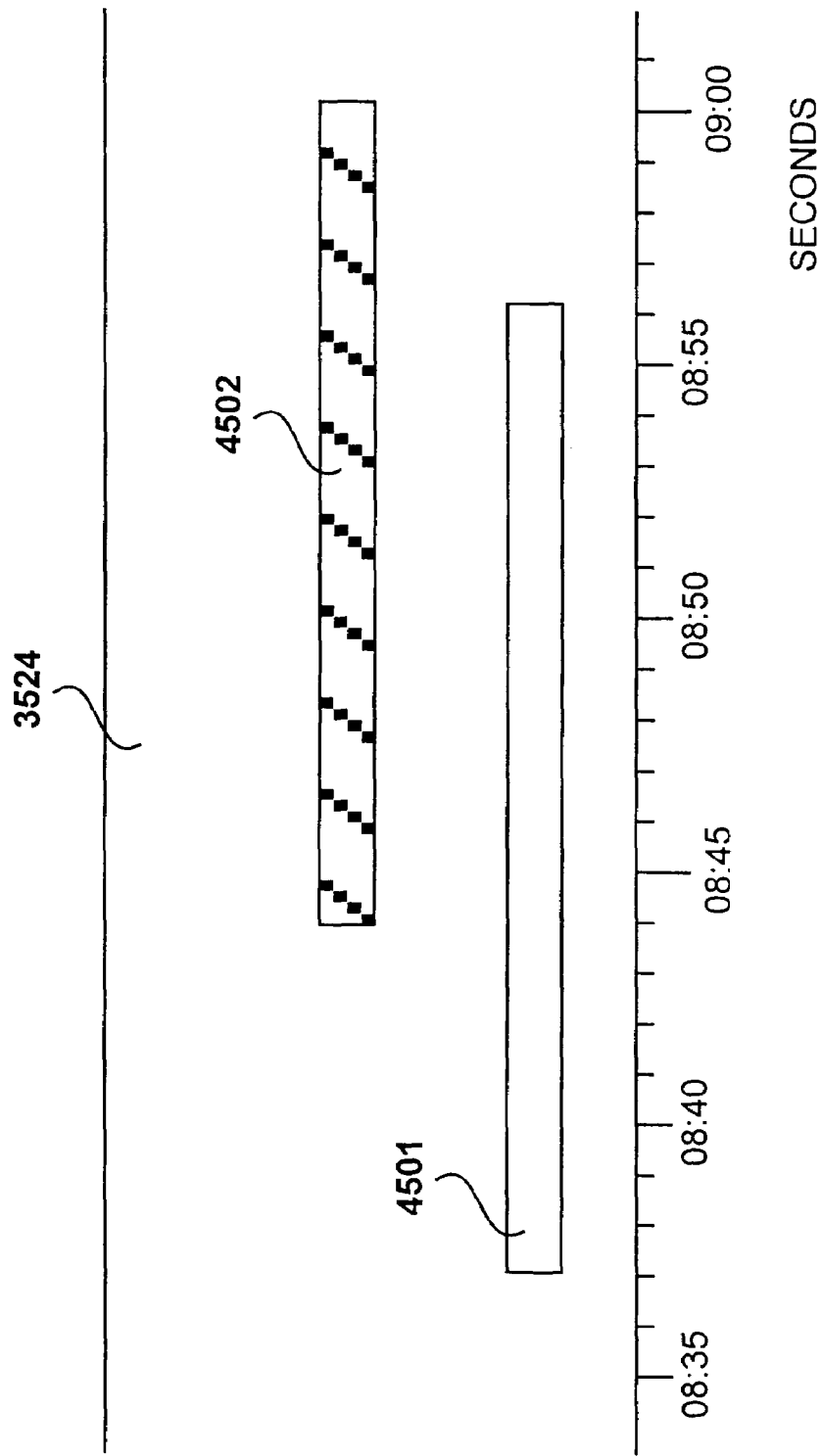
FIG. 45 shows an expanded view of the track path shown in FIG. 35.

An expanded view of track path 3524 generated by the procedures shown in FIG. 44 is illustrated in FIG. 45.

The portion of the track path shown represents a period from 8 minutes 35 seconds to 9 seconds. An event has been detected that started at 8.37 and terminated at 8.56. These start and end points have been identified resulting in a tracked line 4501 being displayed. Similarly, a second event has been recorded as starting at 8.44 and then finishing at 9.00. This has resulted in a second track line 4502 being displayed. In this example, the first event occurred at a lower velocity with the second event occurring at a higher velocity. Consequently, track line 4501 is displayed in blue (represented as being without shading) where as track line 4502 is displayed in red, represented by the shading.

FIG. 46

Figure 46:
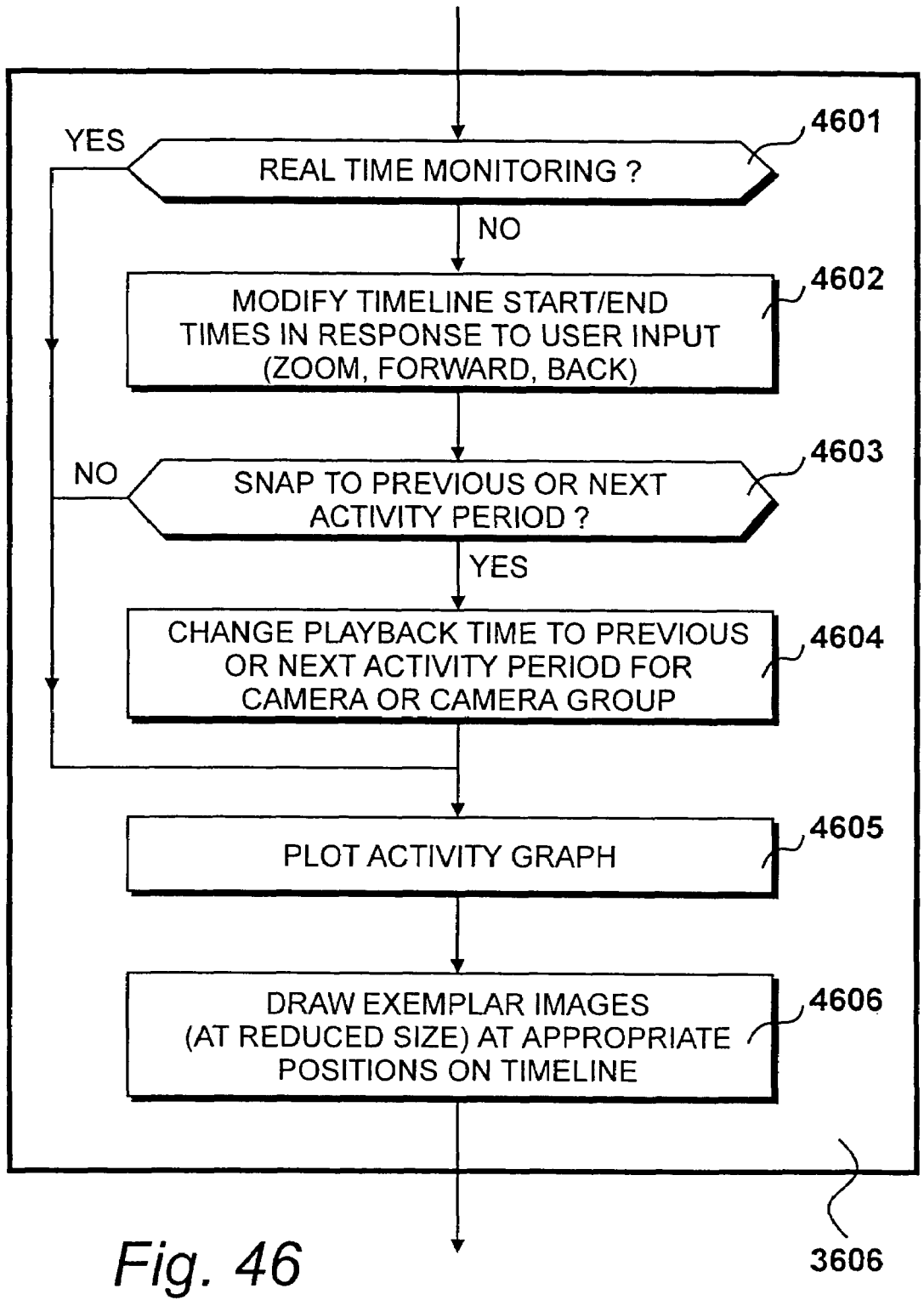
FIG. 46 details procedures for rendering the activity timeline with exemplar images as shown in FIG. 36.

Procedures for rendering the activity timeline with exemplar images 3606 are detailed in FIG. 46.

At step 4601 a question is asked as to whether real time monitoring is occurring or whether images are being viewed from storage. Here it can be appreciated that when receiving images from storage, when in playback mode, there are more options for controlling the timeline. Thus, if the question asked at step 4601 is answered in the negative, (to the effect that a play-back is occurring) the timeline start and end points are modified in response to user input, such as forward or backward scrolling or zooming at step 4602.

At step 4603 a question is asked as to whether a snap event has occurred to the previous or next activity period, by operation of buttons 3518/3519. If this question is answered in the affirmative, the playback time is changed to the previous or next activity period at step 4604.

At completion of step 4604 or after the question at step 4601 has been answered in the affirmative, results in the activity graph being plotted at step 4605.

At step 4606 exemplar images are drawn at reduced size at appropriate positions along the timeline.

FIG. 47

Figure 47:
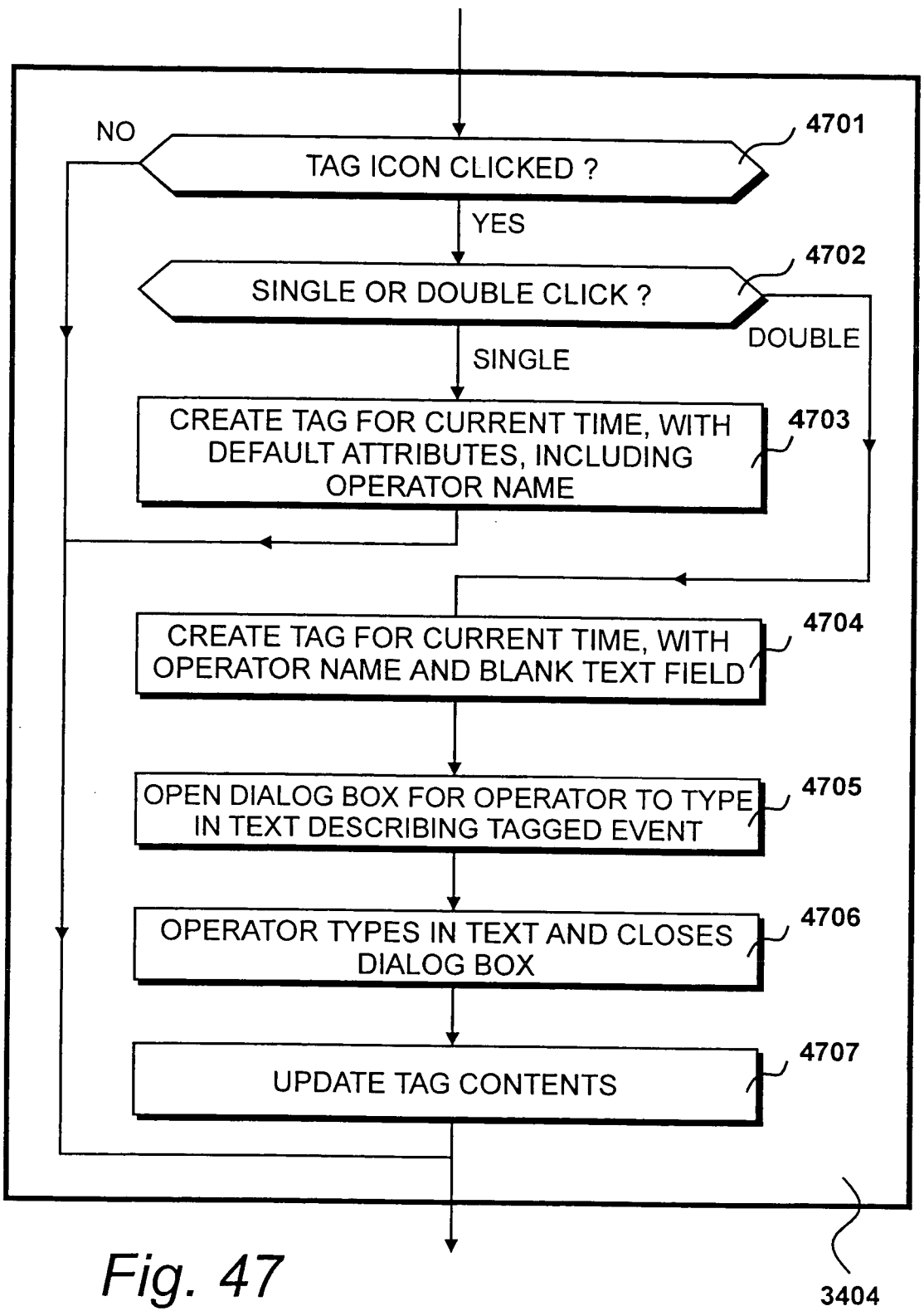
FIG. 47 details procedures for tagging as shown in FIG. 34.

Procedures 3404 for tagging are detailed in FIG. 47. In an embodiment, an operator uses mouse 502 to activate tag icon 3525. Thus, at step 4701 a question is asked as to whether the tag icon 3525 has been clicked.

Upon detecting a click (the question at step 4701 being answered in the affirmative) a question is asked at step 4702 as to whether a single click has occurred or whether a double click has occurred.

In response to detecting a single click at step 4702 a tag is created at step 4703. A tag of this type contains details of the current time with a default attribute including the name of the operator. Thus, the creation of a tag of this type is straightforward and no further measures are taken within process 3404.

In response to a double click being detected at step 4702 a tag is created at step 4704 identifying the current time, the operator's name and creating a blank text field.

At step 4705 a dialog box is opened for the operator thereby inviting the operator to type via keyboard 501, text describing the tagged event.

At step 4706 text is received via user input and the dialog box is then closed. Subsequently, at step 4707 the contents of the tag are updated.

Once a tag has been created using the 3407 processes, it will be rendered at step 3607 the next time a rendering operation is performed, usually initiated by the next frame synchronisation pulse for the monitor 431.

FIG. 48

Figure 48:
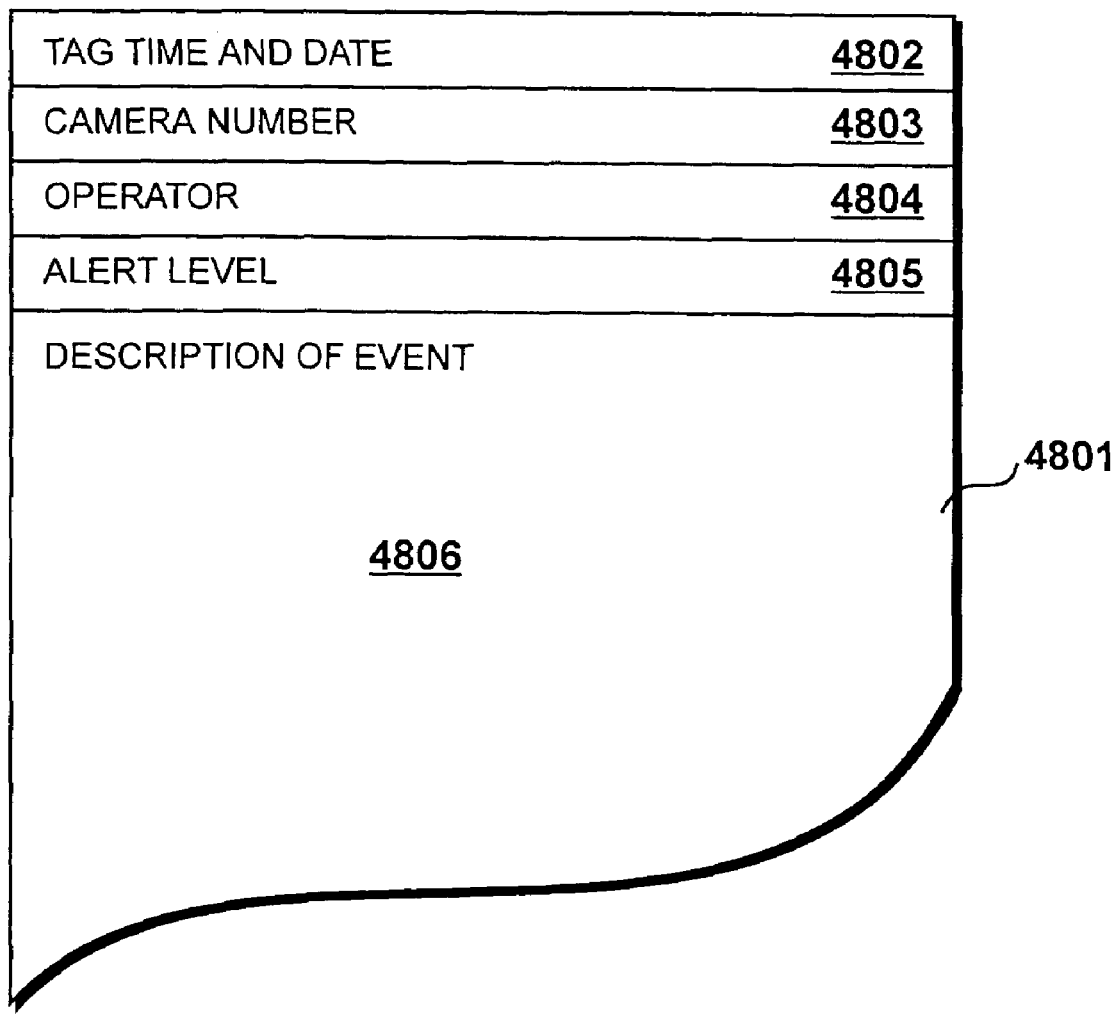
FIG. 48 shows an example of a tag.

An example of a tag created by step 4707 is shown in FIG. 48. The tag is stored at the data store as a file 4801 associated with an image frame.

The tag includes a tag time and date 4802 and a camera number 4803. The tag also identifies the operator 4804 who has created the tag and an alert level 4805. The description of the event, entered via keyboard 501 is recorded at 4806.

FIG. 49

Figure 49:
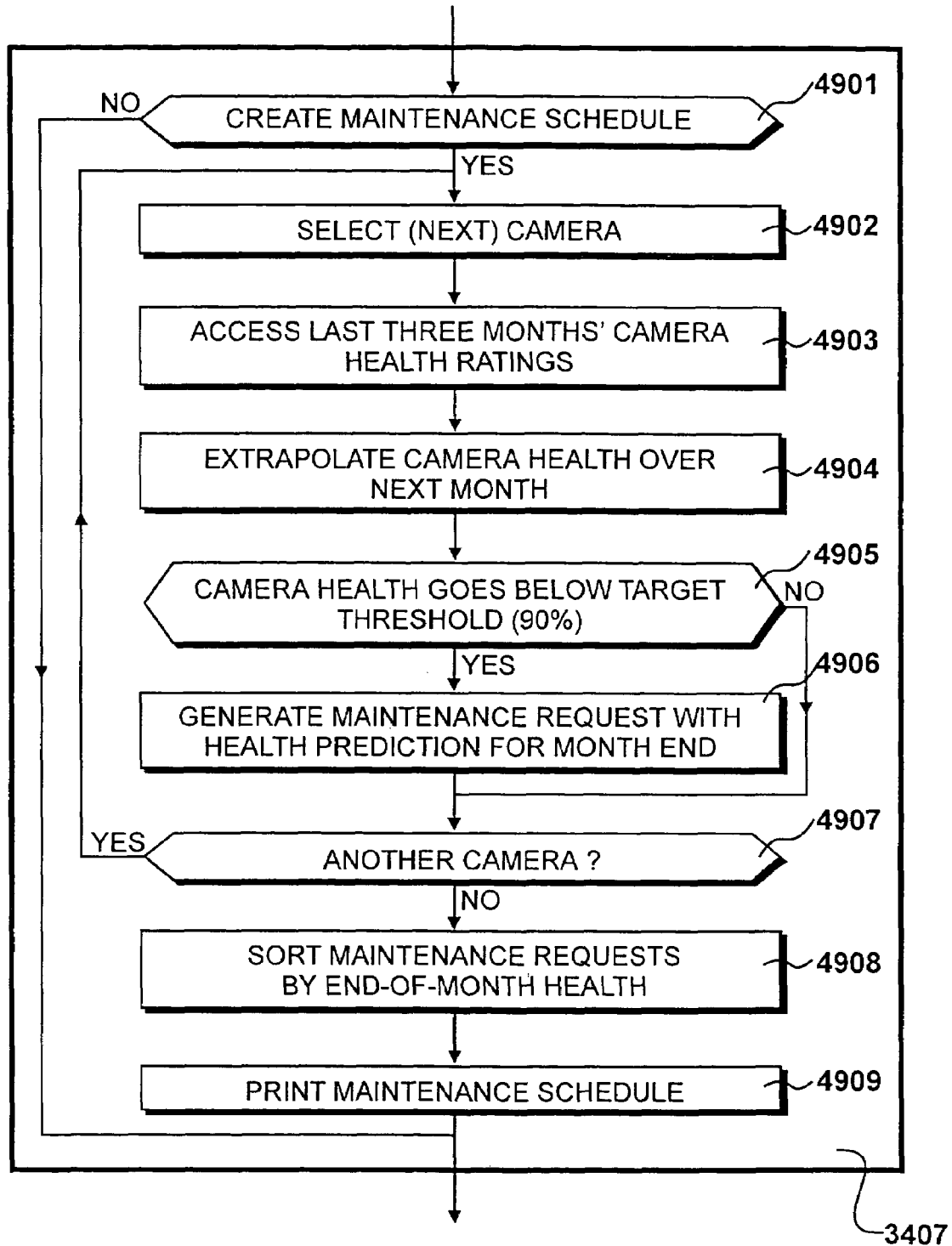
FIG. 49 details procedures for generating a maintenance schedule as shown in FIG. 34.

Procedures 3407 for generating a maintenance schedule are detailed in FIG. 49. Each camera's health records HC are extrapolated thereby enabling a prediction to be made as to whether the camera will fall below a health threshold of, say, ninety percent in the next month. Where the prediction is made to the effect that the health of the camera will fall below the ninety percent threshold, the camera is considered to be unhealthy and is therefore scheduled for maintenance to be carried out.

At step 4901 a question is asked as to whether a maintenance schedule is to be created and when answered in the affirmative a first camera is selected at step 4902.

At step 4903 the last three months of camera health ratings are accessed and at step 4904 camera health is extrapolated for the next month.

At step 4905 a question is asked as to whether it is expected that the camera health will go below the target threshold of ninety percent and when answered in the affirmative, a maintenance request is generated for that camera at step 4906.

At step 4907 a question is asked as to whether another camera is to be considered and when answered in the affirmative control is returned to step 4902 resulting in the next camera being selected.

When all of the cameras have been considered, maintenance requests are sorted so as to produce a list of cameras that require maintenance by the end of the month at step 4908. Thereafter, the schedule is printed at step 4909.

The maintenance schedule may identify degrees of urgency for the cameras or give specific dates by which it is expected that their health values are predicted to fall below ninety percent. This could also be extended to include predictions for eighty percent (very important) and even seventy-percent (urgent) etc.

FIG. 50

Figure 50:
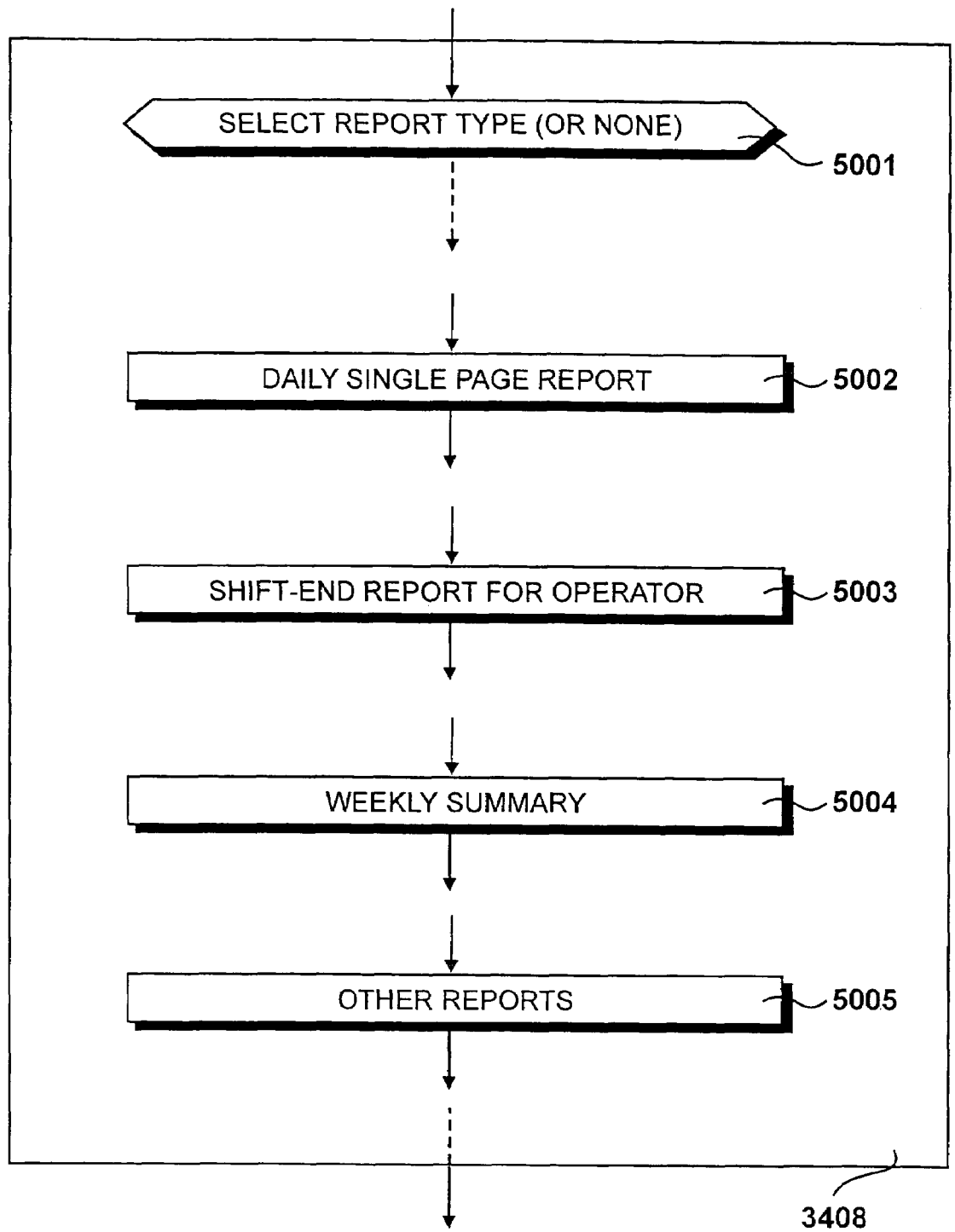
FIG. 50 details procedures for generating reports as shown in FIG. 34.

Process 3408 for generating reports is detailed in FIG. 50.

At step 5001 a selection is made as to whether a report is required and, if so, it is possible to select a report type.

As illustrated at 5002 it is possible to produce a daily single page report showing, on a single page, the most important events that have occurred that day.

Similarly, as indicated at 5003, it is possible to produce a shift end report for a particular operator. In this way, it is possible for the operator to make a quick check to the effect that the day as recorded is consistent with his recollection of it. In particular, the report would indicate that tags have been recorded thereby providing confirmation to the effect that the operator's actions had been responded to as desired.

As indicated at step 5004 it is possible to produce a weekly summary and as indicated at 5005 other types of report may be produced in response to specific demands.

FIG. 51

Figure 51:
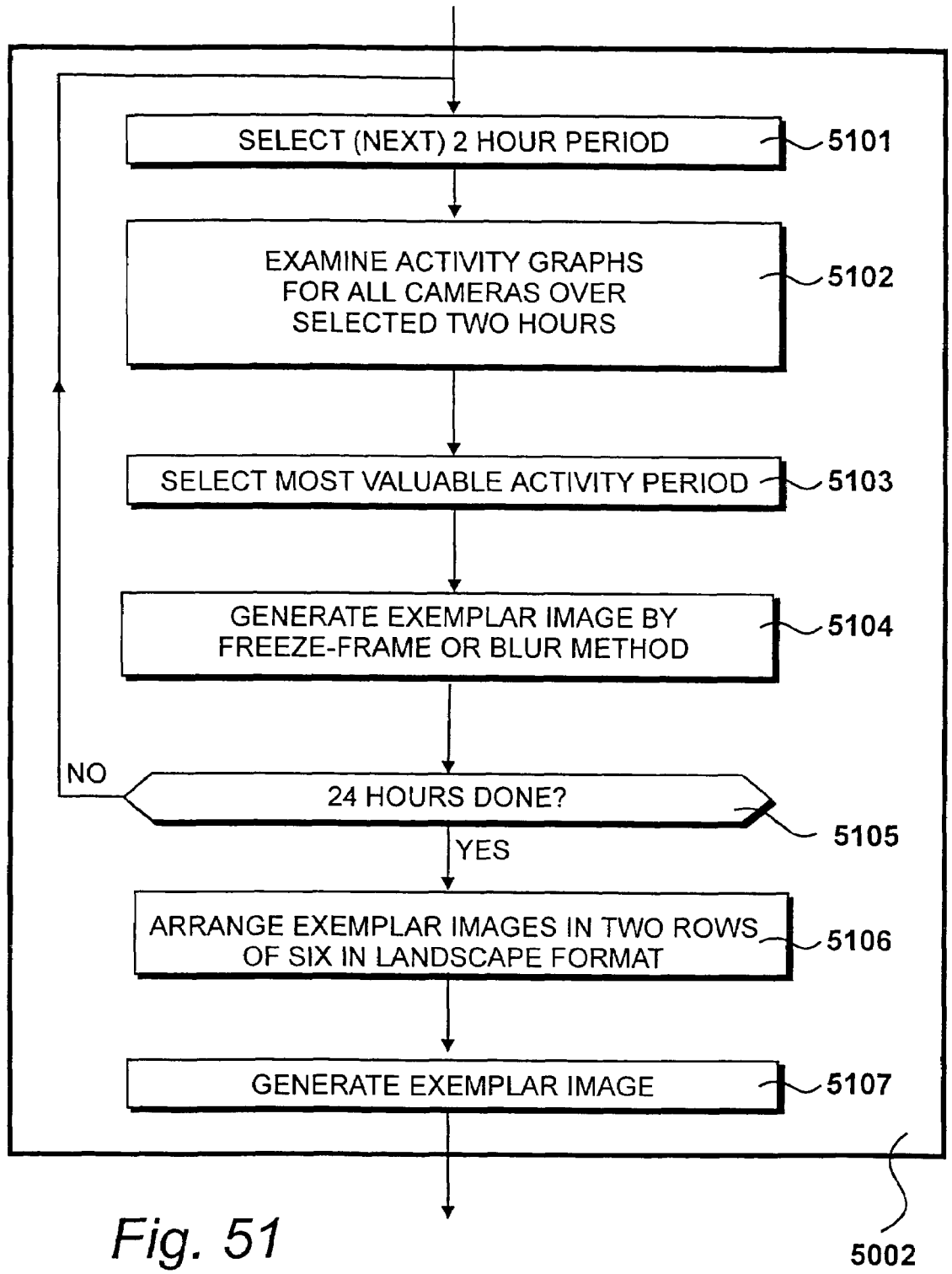
FIG. 51 details procedures for producing a daily single page report as shown in FIG. 50.

Procedures 5002 for producing a daily single page report are detailed in FIG. 51. The day of interest is split up into twelve two-hour periods that are printed out on a single sheet of preferably A4 paper in landscape mode. Each period is represented by a block and an exemplar image is placed in each block, resulting in six exemplar images in each of two rows being printed.

At step 5101 the first two-hour period is selected and at step 5102 activity graphs are examined for all cameras over the period selected at step 5101.

At step 5103 a most valuable activity period is selected, possibly determined by an identification of the highest level of activity detected by a camera of highest priority.

At step 5104 an exemplar image is generated by the freeze frame process or the blur process previously described. Thereafter, at step 5105 a question is asked as to whether all of the two-hour periods have been considered. When answered in the negative, control is returned to step 5101 and the next two hour period is selected.

When all of the periods have been considered, the question asked at step 5105 is answered in the affirmative and at step 5106 the exemplar images are arranged in two rows of six in landscape format. Thereafter, at step 5107 the exemplar images are generated.

It will be appreciated that, for this process, all of the cameras are used as input so there is a significant degree of activity to choose from. This contrasts with the activity snap shot described previously that is generated by analysers individually. In terms of generating the report, a selection is made from all of the stored outputs of all of the analysers available within the monitoring system. Preferably, the printing process is automated and produced at a selected time during each day.

FIG. 52

An example of a daily report produced by this process shown in FIG. 51 is detailed in FIG. 52. Images 5201 to 5206 are presented in a first row of six two-hour periods. Thus, an exemplar image 5201 is selected for the period of midnight to 2 am. Similarly, exemplar image 5202 is selected for the period 2 am to 4 am.

A second row of exemplar images 5207 to 5212 represents the second twelve-hour period. Thus, image 5207 is an exemplar image derived from the period 12 midday to 2 pm and so on. Consequently, twelve exemplar images are printed selected from their respective two-hour slots. In addition, the date of the report is also printed at 5213.

FIG. 53

Figure 53:
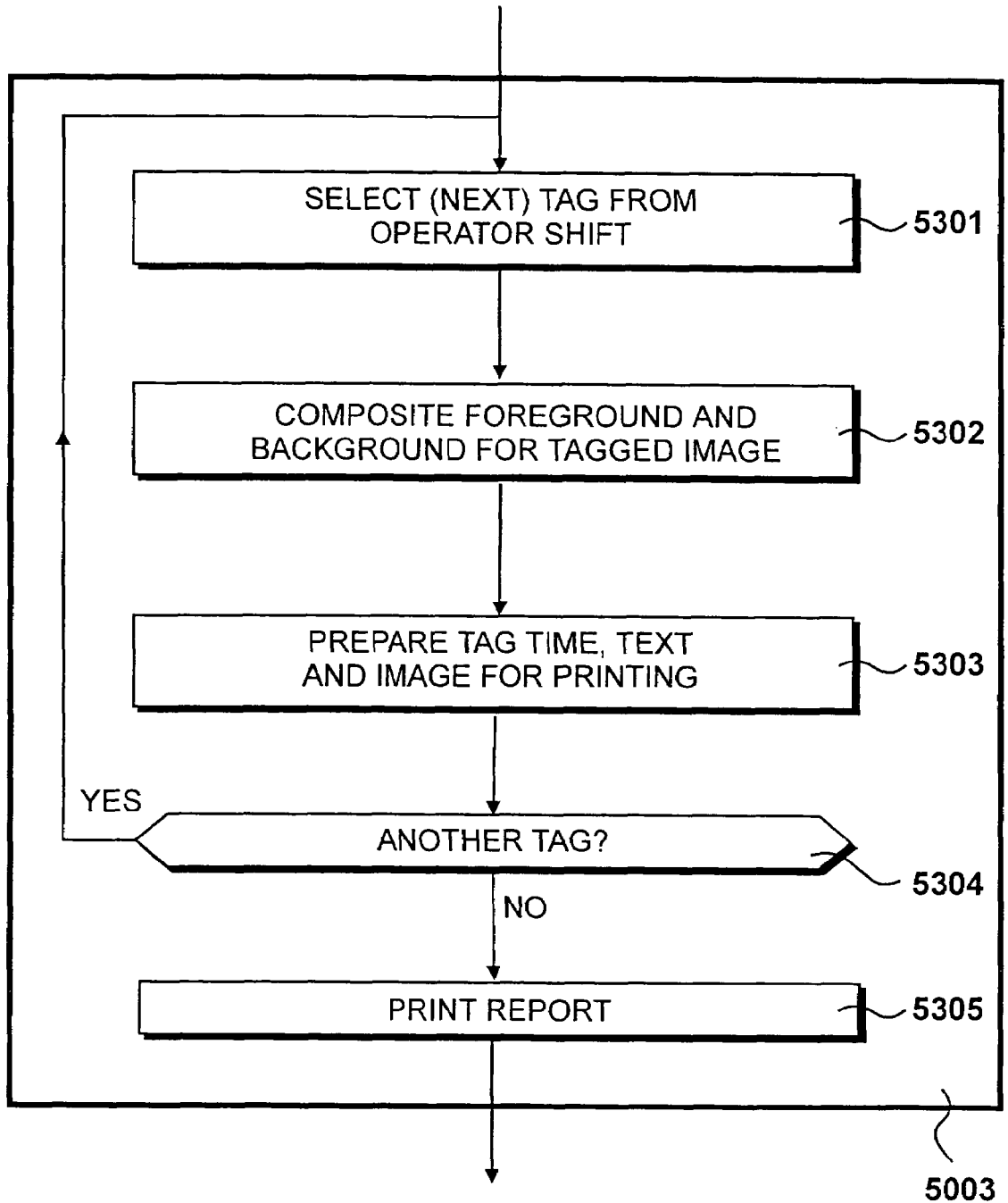
FIG. 53 details procedures for producing a shift end report as shown in FIG. 50.

Procedures 5003 for producing a shift end report are detailed in FIG. 53. It is suggested that each operator would work for a shift consisting of a few, say three, hours during which it is expected that several tags will have been created. Each operator logs onto the monitoring system at the start of their shift such that the tags generated by a particular operator over their shift are uniquely identifiable. Thus, from this information, it is possible to produce a useful report consisting of the list of tags (some with comments and some without). In particular, this provides a useful mechanism for showing what has been going on during a shift when one operator hands over to the next operator.

As shown in FIG. 48, the time and date 4802 when a tag is created is stored within the tag. Thus, from this information, it is possible to look up the image at that time and date so that the image itself can be included in the report.

At step 5301 a first tag is selected from the operators shift. From the time and date data as previously described, image data is selected. As previously described, it is possible that the foreground and background part of the image will be recorded at different definitions therefore the high quality foreground is composited against the poor quality background at step 5302.

At step 5303 the tag time and text is prepared for printing with the selected image.

At step 5304 a question is asked as to whether another tag is to be processed and when answered in the affirmative control is returned to step 5301 whereupon the next tag is selected for the operators shift.

Eventually, all of the tags will have been considered resulting in the question asked at step 5304 being answered in the negative. Subsequently, a report is printed at step 5305.

FIG. 54

Figure 54:
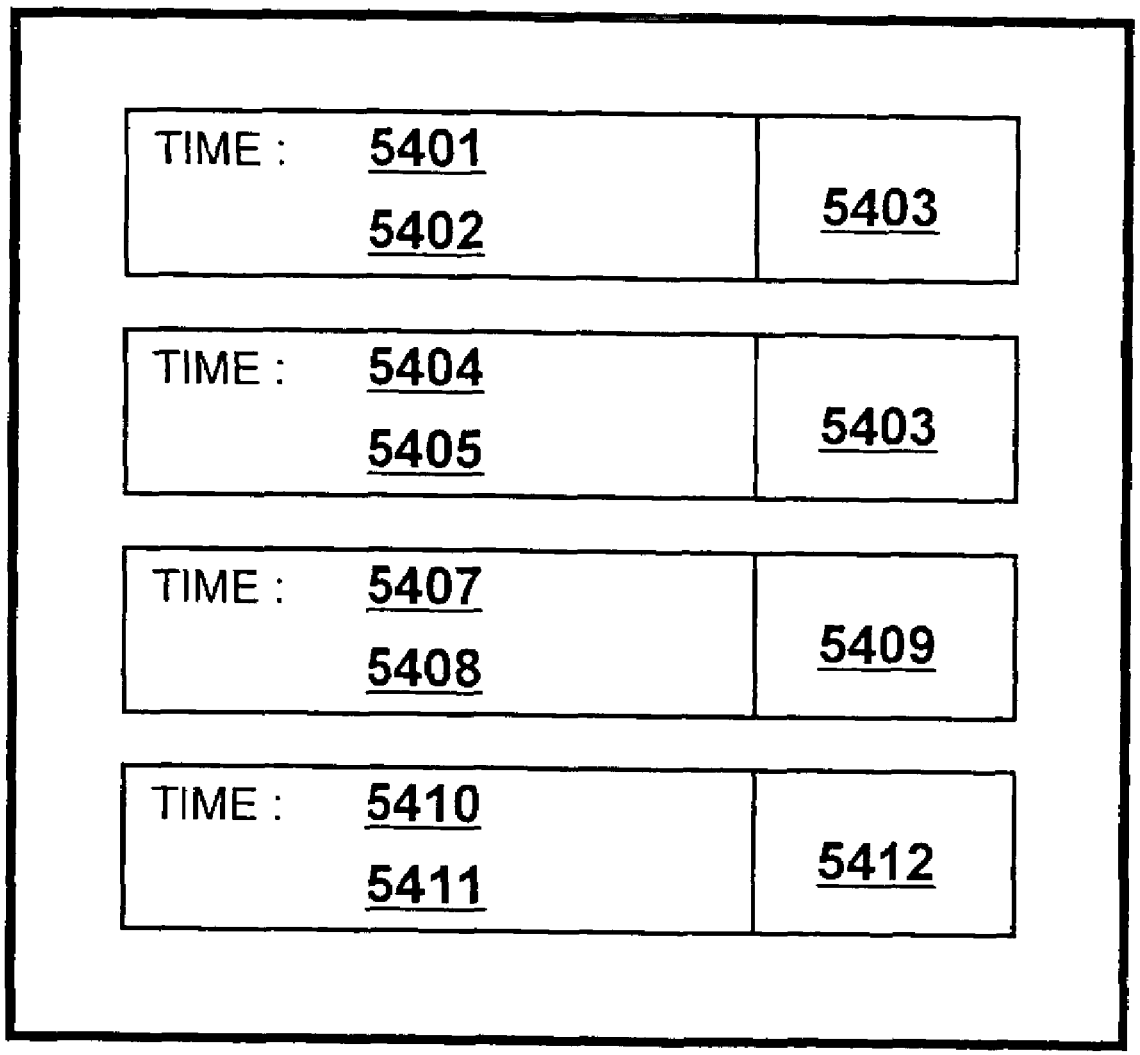
FIG. 54 shows an example of a report.

An example of a report printed at step 5305 is illustrated in FIG. 54. Each tagged event is recorded in a specific block and, in this example, it is possible to contain four blocks within a single page. Consequently, sufficient pages are printed in order to represent all of the tags recorded for a particular shift, one such page being shown in FIG. 54.

For each entry (representing a tag) a time is shown at 5401. In addition, if present, textual matter is shown at 5402 and the composited image is shown at 5403.

Thus, this arrangement is repeated for a second tag at time 5404, with text 5405 and an image 5406. The next tag is displayed at time 5407 with text 5408 and an image 5409. Finally, at time 5410 a tag is displayed with text 5411 and image 5412.

What we claim is:

1. A method of monitoring output data from a video camera, comprising the steps of:
   analyzing input data to produce a model of a background image;
   comparing incoming image data against said model of a background image to determine pixels within incoming images that define a foreground object;
   for each incoming image, deriving a level of activity by measuring the proportion of pixels in the image that belong to a foreground object;
   comparing the level of activity of each incoming image with a threshold value to identify images having a high level of activity created by the introduction of a foreground object;
   identifying periods of activity, each said period of activity being composed of a plurality of consecutive images having a high level of activity; and
   generating an exemplar image from each said period of activity,
   such that said step of generating said exemplar image comprises for each period of activity
   (i) selecting an exemplar image from a peak level of activity occurring within the period of activity;
   (ii) selecting an exemplar image from substantially the center of the period of activity, or
   (iii) combining a plurality of images from the period of activity.

2. A method according to claim 1, wherein said step of generating said exemplar image comprises combining a plurality of images from the period of activity, and said exemplar image is generated by combining a weighted average of said plurality of images from said period of activity.

3. A method according to claim 1, wherein each said exemplar image is cropped so as to remove the background image and retain an image of the foreground activity.

4. Apparatus for displaying graphical output to an operator comprising:
   a plurality of detection devices for monitoring a region;
   a processor configured to analyze data from said detection devices to identify periods of activity; and
   display means arranged to display an exemplar image from said periods of activity,
   wherein said processor is configured to perform the steps of:
   analyzing input data to produce a model of a background image;
   comparing incoming image data against said model of a background image to determine pixels within incoming images that define a foreground object;
   for each incoming image, deriving a level of activity by measuring the proportion of pixels in the image that belong to a foreground object;
   comparing the level of activity of each incoming image with a threshold value to identifying images having a high level of activity created by the introduction of a foreground object;
   identifying periods of activity, each of said periods of activity composed of a plurality of consecutive images having a high level of activity; and
   generating an exemplar image from each of said periods of activity, such that said step of generating said exemplar image comprises, for each period of activity,
   (i) selecting an exemplar image from an activity peak occurring within the period of activity, or
   (ii) selecting an exemplar image from substantially the center of said period of activity.

5. Apparatus according to claim 4, wherein said display means is configured to display a plurality of said exemplar images from a plurality of periods of activity over a timeline.

6. Apparatus according to claim 4, wherein said processor is configured to create a report after a predetermined period, and at least one of said exemplar images is included in said report.

7. Apparatus according to claim 6, wherein all of said exemplar images are included in said report.

8. Apparatus according to claim 6, wherein said report is displayed on said display means.

9. Apparatus according to claim 6, further comprising a printing device configured to print said report.

10. Apparatus according to claim 6, further comprising an input device configured to allow an operator to manually add text to said report.

11. Apparatus according to claim 6, further comprising a network configured to allow other users to access said report.

12. A computer-readable medium having computer-readable instructions executable by a computer or by a network of computers such that when executing said instructions and computer(s) will perform the steps of:
   analyzing input data to produce a model of a background image;
   comparing incoming image data against said model of a background image to determine pixels within incoming images that define a foreground object;
   for each incoming image, deriving a level of activity by measuring the proportion of pixels in the image that belong to a foreground object;
   comparing the level of activity of each incoming image with a threshold value to identify images having a high level of activity created by the introduction of a foreground object;
   identifying periods of activity, each of said periods of activity composed of a plurality of consecutive images having a high level of activity; and
   generating an exemplar image from each of said periods of activity,
   such that said step of generating an exemplar image comprises, for each period of activity,
   (i) selecting an exemplar image from an activity peak occurring within the period of activity,
   (ii) selecting an exemplar image from substantially the center of the period of activity, or
   (iii) combining a plurality of images from the period of activity.

13. A computer-readable medium having computer-readable instructions according to claim 12, such that said step of generating said exemplar image comprises combining a plurality of images from the period of activity, and when executing said instructions a computer will generate said exemplar image by combining a weighted average of said plurality of images from said period of activity.

14. A computer-readable medium having computer-readable instructions according to claim 12, such that when executing said instructions a computer will crop each said exemplar image so as to remove the background image and retain an image of the foreground activity.

* * * * *

UNITED STATES PATENT AND TRADEMARK OFFICE
CERTIFICATE OF CORRECTION

PATENT NO. : 7,664,292 B2
APPLICATION NO. : 11/002446
DATED : February 16, 2010
INVENTOR(S) : Mark Adrian van den Bergen et al.

It is certified that error appears in the above-identified patent and that said Letters Patent is hereby corrected as shown below:

On the title page, under item (30), Foreign Application Priority Data, insert the following:
-- Dec. 3, 2003   (AU)   ............................... 2003906681 --

Signed and Sealed this

Twenty-eighth Day of September, 2010

David J. Kappos
*Director of the United States Patent and Trademark Office*

UNITED STATES PATENT AND TRADEMARK OFFICE
CERTIFICATE OF CORRECTION

PATENT NO. : 7,664,292 B2  Page 1 of 1
APPLICATION NO. : 11/002446
DATED : February 16, 2010
INVENTOR(S) : van den Bergen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1045 days.

Signed and Sealed this

Thirtieth Day of November, 2010

David J. Kappos
*Director of the United States Patent and Trademark Office*